United States Patent
Snow et al.

(10) Patent No.: US 11,164,250 B2
(45) Date of Patent: Nov. 2, 2021

(54) STABLE CRYPTOCURRENCY COINAGE

(71) Applicant: Factom, Inc., Austin, TX (US)

(72) Inventors: Paul Snow, Austin, TX (US); Brian Deery, Austin, TX (US); Gavin Gillas, Austin, TX (US)

(73) Assignee: Inveniam Capital Partners, Inc., New York, NY (US)

(*) Notice: Subject to any disclaimer, the term of this patent is extended or adjusted under 35 U.S.C. 154(b) by 135 days.

(21) Appl. No.: 16/351,592

(22) Filed: Mar. 13, 2019

(65) Prior Publication Data

US 2020/0042995 A1    Feb. 6, 2020

Related U.S. Application Data

(60) Provisional application No. 62/774,357, filed on Dec. 3, 2018, provisional application No. 62/723,595, filed on (Continued)

(51) Int. Cl.
*G06Q 20/36* (2012.01)
*G06Q 40/04* (2012.01)
(Continued)

(52) U.S. Cl.
CPC ........... *G06Q 40/04* (2013.01); *G06Q 20/065* (2013.01); *G06Q 20/3678* (2013.01); *G06Q 20/381* (2013.01); *G06Q 2220/00* (2013.01)

(58) Field of Classification Search
None
See application file for complete search history.

(56) References Cited

U.S. PATENT DOCUMENTS

| 4,309,569 A | 6/1982 | Merkel |
| 5,499,294 A | 3/1996 | Friedman |

(Continued)

FOREIGN PATENT DOCUMENTS

| DE | 10128728 | 1/2003 |
| JP | 5383297 | 1/2014 |

(Continued)

OTHER PUBLICATIONS

ValueWalk: Do We Need A "Fedcoin" Cryptocurrency?, Newstex Global Business Blogs, Dec. 30, 2015 (Year: 2015).*

(Continued)

*Primary Examiner* — John W Hayes
*Assistant Examiner* — Dennis G Keritsis
(74) *Attorney, Agent, or Firm* — Scott P. Zimmerman, PLLC

(57) ABSTRACT

A multi-coin mechanism for maintaining a stable value of cryptographic coinage traded in a decentralized market exchange without requiring a reserve. Multiple, pegged cryptographic tokens are traded in the reserveless decentralized market exchange. Each of the multiple, pegged cryptographic tokens may be pegged to a different asset (such as different currencies and/or commodities). The multiple, pegged cryptographic tokens are value related based on cryptographic exchange rates. Whenever a market transaction is processed (such as a buy or sell order), at least one of a destruction operation and a creation operation are performed. The destruction operation destroys at least one of the pegged cryptographic tokens, while the creation operation creates new ones of the pegged cryptographic tokens n. The multi-coin mechanism thus implements a decentralized and algorithmic monetary policy that removes and/or deposits cryptographic tokens to/from the reserveless decentral- (Continued)

US 11,164,250 B2

Page 2 ized market exchange to alter supply and to maintain stable coinage values.

6 Claims, 39 Drawing Sheets

Related U.S. Application Data on Aug. 28, 2018, provisional application No. 62/714,909, filed on Aug. 6, 2018, provisional application No. 62/714,911, filed on Aug. 6, 2018.

(51) Int. Cl.
*G06Q 20/38* (2012.01)
*G06Q 20/06* (2012.01)

(56) References Cited

U.S. PATENT DOCUMENTS

| | | | |
|---|---|---|---|
| 5,862,218 A | 1/1999 | Steinberg | |
| 5,920,629 A * | 7/1999 | Rosen | G06Q 20/02 705/69 |
| 5,966,446 A | 10/1999 | Davis | |
| 7,572,179 B2 | 8/2009 | Choi et al. | |
| 7,729,950 B2 | 6/2010 | Mendizabal et al. | |
| 8,245,038 B2 | 8/2012 | Golle et al. | |
| 8,266,439 B2 | 9/2012 | Haber et al. | |
| 8,442,903 B2 | 5/2013 | Zadoorian et al. | |
| 8,560,722 B2 | 10/2013 | Gates et al. | |
| 8,706,616 B1 | 4/2014 | Flynn | |
| 8,712,887 B2 | 4/2014 | DeGroeve et al. | |
| 8,867,741 B2 | 10/2014 | McCorkindale et al. | |
| 8,943,332 B2 | 1/2015 | Horne et al. | |
| 9,124,423 B2 | 9/2015 | Jennas, II et al. | |
| 9,396,006 B2 | 7/2016 | Kundu et al. | |
| 9,398,018 B2 * | 7/2016 | MacGregor | H04L 67/1097 |
| 9,407,431 B2 | 8/2016 | Bellare et al. | |
| 9,411,524 B2 | 8/2016 | O'Hare et al. | |
| 9,411,976 B2 | 8/2016 | Irvine | |
| 9,411,982 B1 | 8/2016 | Dippenaar et al. | |
| 9,424,576 B2 | 8/2016 | Vandervort | |
| 9,436,935 B2 | 9/2016 | Hudon | |
| 9,472,069 B2 | 10/2016 | Roskowski | |
| 9,489,827 B2 | 11/2016 | Quinn et al. | |
| 9,584,493 B1 | 2/2017 | Leavy | |
| 9,722,790 B2 | 8/2017 | Ebrahimi | |
| 9,818,109 B2 * | 11/2017 | Loh | G06Q 20/382 |
| 9,830,580 B2 * | 11/2017 | MacGregor | G06Q 20/10 |
| 9,875,510 B1 * | 1/2018 | Kasper | H04L 67/104 |
| 9,876,646 B2 | 1/2018 | Ebrahimi | |
| 9,882,918 B1 | 1/2018 | Ford et al. | |
| 10,346,815 B2 * | 7/2019 | Glover | G06Q 20/405 |
| 10,929,842 B1 * | 2/2021 | Arvanaghi | G06Q 20/389 |
| 10,958,418 B2 * | 3/2021 | Ajoy | H04L 9/0643 |
| 2003/0018563 A1 | 1/2003 | Kilgour et al. | |
| 2004/0085445 A1 | 5/2004 | Park | |
| 2005/0206741 A1 | 9/2005 | Raber | |
| 2006/0075228 A1 | 4/2006 | Black et al. | |
| 2006/0184443 A1 | 8/2006 | Erez et al. | |
| 2007/0027787 A1 * | 2/2007 | Tripp | G06Q 40/06 705/36 R |
| 2007/0094272 A1 | 4/2007 | Yeh | |
| 2007/0296817 A1 | 12/2007 | Ebrahimi | |
| 2008/0010466 A1 | 1/2008 | Hopper | |
| 2009/0025063 A1 | 1/2009 | Thomas | |
| 2009/0287597 A1 | 11/2009 | Bahar | |
| 2010/0049966 A1 | 2/2010 | Kato | |
| 2010/0058476 A1 | 3/2010 | Isoda | |
| 2010/0161459 A1 | 6/2010 | Kass et al. | |
| 2010/0241537 A1 | 9/2010 | Kass et al. | |
| 2013/0222587 A1 | 8/2013 | Roskowski | |
| 2014/0229738 A1 | 8/2014 | Sato | |
| 2014/0344015 A1 | 11/2014 | Puertolas-Montasnes et al. | |
| 2015/0332256 A1 * | 11/2015 | Minor | G06Q 20/381 705/69 |
| 2016/0071096 A1 | 3/2016 | Rosca | |
| 2016/0119134 A1 | 4/2016 | Hakoda et al. | |
| 2016/0148198 A1 | 5/2016 | Kelley | |
| 2016/0162897 A1 | 6/2016 | Feeney | |
| 2016/0217436 A1 | 7/2016 | Brama | |
| 2016/0253663 A1 | 9/2016 | Clark et al. | |
| 2016/0260091 A1 | 9/2016 | Tobias | |
| 2016/0267472 A1 | 9/2016 | Lingham et al. | |
| 2016/0267558 A1 | 9/2016 | Bonnell et al. | |
| 2016/0275294 A1 | 9/2016 | Irvine | |
| 2016/0283920 A1 | 9/2016 | Fisher et al. | |
| 2016/0292396 A1 | 10/2016 | Akerwall | |
| 2016/0292672 A1 | 10/2016 | Fay et al. | |
| 2016/0292680 A1 | 10/2016 | Wilson, Jr. et al. | |
| 2016/0300200 A1 | 10/2016 | Brown et al. | |
| 2016/0300234 A1 | 10/2016 | Moss-Pultz et al. | |
| 2016/0321675 A1 | 11/2016 | McCoy et al. | |
| 2016/0321751 A1 | 11/2016 | Creighton, IV et al. | |
| 2016/0328791 A1 | 11/2016 | Parsells et al. | |
| 2016/0330031 A1 | 11/2016 | Drego et al. | |
| 2016/0330244 A1 | 11/2016 | Denton | |
| 2016/0337119 A1 | 11/2016 | Hosaka et al. | |
| 2016/0342977 A1 | 11/2016 | Lam | |
| 2016/0342989 A1 | 11/2016 | Davis | |
| 2016/0344737 A1 | 11/2016 | Anton et al. | |
| 2017/0005797 A1 | 1/2017 | Lanc et al. | |
| 2017/0053249 A1 | 2/2017 | Tunnell et al. | |
| 2017/0061396 A1 | 3/2017 | Melika et al. | |
| 2017/0124534 A1 | 5/2017 | Savolainen | |
| 2017/0124535 A1 | 5/2017 | Juels et al. | |
| 2017/0177898 A1 | 6/2017 | Dillenberger | |
| 2017/0213287 A1 | 7/2017 | Bruno | |
| 2017/0243208 A1 | 8/2017 | Kurian et al. | |
| 2017/0243289 A1 | 8/2017 | Rufo | |
| 2017/0244757 A1 | 8/2017 | Castinado et al. | |
| 2017/0330279 A1 | 11/2017 | Ponzone | |
| 2017/0344983 A1 * | 11/2017 | Muftic | G06Q 20/3829 |
| 2017/0352031 A1 | 12/2017 | Collin | |
| 2017/0373859 A1 | 12/2017 | Shors et al. | |
| 2018/0075527 A1 | 3/2018 | Nagla et al. | |
| 2018/0091524 A1 | 3/2018 | Setty | |
| 2018/0097779 A1 | 4/2018 | Karame et al. | |
| 2018/0157700 A1 | 6/2018 | Roberts | |
| 2018/0365764 A1 * | 12/2018 | Nelson | G06Q 40/025 |

FOREIGN PATENT DOCUMENTS

| | | |
|---|---|---|
| KR | 100653512 | 12/2006 |
| KR | 101747221 | 6/2017 |
| WO | WO 0049797 | 8/2000 |
| WO | WO 2007069176 | 6/2007 |
| WO | WO 2015077378 | 5/2015 |
| WO | WO 2018013898 A1 | 1/2018 |
| WO | WO 2018109010 | 6/2018 |

OTHER PUBLICATIONS

Iddo Bentov, Bitcoin and Secure Computation with Money, May 2016 (Year: 2016).*
United States: New Generation cryptocurrency, USDX Protocol, Offers Crypto Advantages and Fiat Pegging, Apr. 2, 2018 (Year: 2018).*
Watanabe, Hiroki, et al. "Blockchain contract: Securing a blockchain applied to smart contracts." *2016 IEEE International Conference on Consumer Electronics (ICCE)*. IEEE, 2016.
Crosby, Michael et al., "BlockChain Technology, Beyond Bitcoin", Sutardja Center for Entrepreneurship & Technology, Berkeley Engineering, Oct. 16, 2015, 35 pages.
Alsolami, Fahad, and Terrance E. Boult. "CloudStash: using secret-sharing scheme to secure data, not keys, in multi-clouds." *Information Technology: New Generations (ITNG), 2014 11th International Conference on.* IEEE, 2014.
Unknown, "Midex", https://promo.midex.com/Midex_EN.pdf, 25 pages.
Unknown, Xtrade White Paper, https://xtrade1-9649.kxcdn.com/wp-content/uploads/2017/09/xtrade-whitepaper.pdf Feb. 7, 2018, 37 pages.

(56) References Cited

OTHER PUBLICATIONS

Haarmann, et al., "DMN Decision Execution on the Ethereum Blockchain," Hasso Plattner Institute, University of Potsdam, 15 pages.
Kim et al., "A Perspective on Blockchain Smart Contracts," Schulich School of Business, York University, Toronto, Canada, 6 pages.
Chakravorty, Antorweep, and Chunming Rong, "Ushare: user controlled social media based on blockchain." *Proceedings of the 11th International Conference on Ubiquitous Information Management and Communication.* ACM, 2017.
Chen, Zhixong, and Yixuan Zhu. "Personal Archive Service System using Blockchain Technology: Case Study, Promising and Challenging." AI & Mobile Services (AIMS), 2017 IEEE International Conference on. IEEE, 2017.
Al-Naji, Nader et al., "Basis: A Price-Stable Cryptocurrency with an Algorithmic Central Bank" www.basis.io Jun. 20, 2017, 27 pages.
Unkown, "Federated Learning: Collaborative Machine Learning without Centralized Training Data" Apr. 6, 2017, 11 pages.
Casey, "BitBeat: Factom Touts Blockchain Tool for Keeping Record Keepers Honest", Wall Street Journal, Nov. 5, 2014.

\* cited by examiner

STABLE CRYPTOCURRENCY COINAGE

CROSS-REFERENCE TO RELATED APPLICATIONS

This application claims domestic benefit of U.S. Provisional Application No. 62/774,357 filed Dec. 3, 2018 and incorporated herein by reference in its entirety. This application also claims domestic benefit of U.S. Provisional Application No. 62/723,595 filed Aug. 28, 2018 and incorporated herein by reference in its entirety. This application also claims domestic benefit of U.S. Provisional Application No. 62/714,909 filed Aug. 6, 2018 and incorporated herein by reference in its entirety. This application also claims domestic benefit of U.S. Provisional Application No. 62/714,911 filed Aug. 6, 2018 and incorporated herein by reference in its entirety.

BACKGROUND

Cryptographic coinage and blockchains are growing in usage. As usage grows, however, volatility has become a problem. The markets for cryptographic coinage have become highly speculative and extreme price variations are hindering mainstream adoption.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein:

FIGS. 7-10 are more detailed illustrations of an operating environment, according to exemplary embodiments;

DETAILED DESCRIPTION

Figure 1:
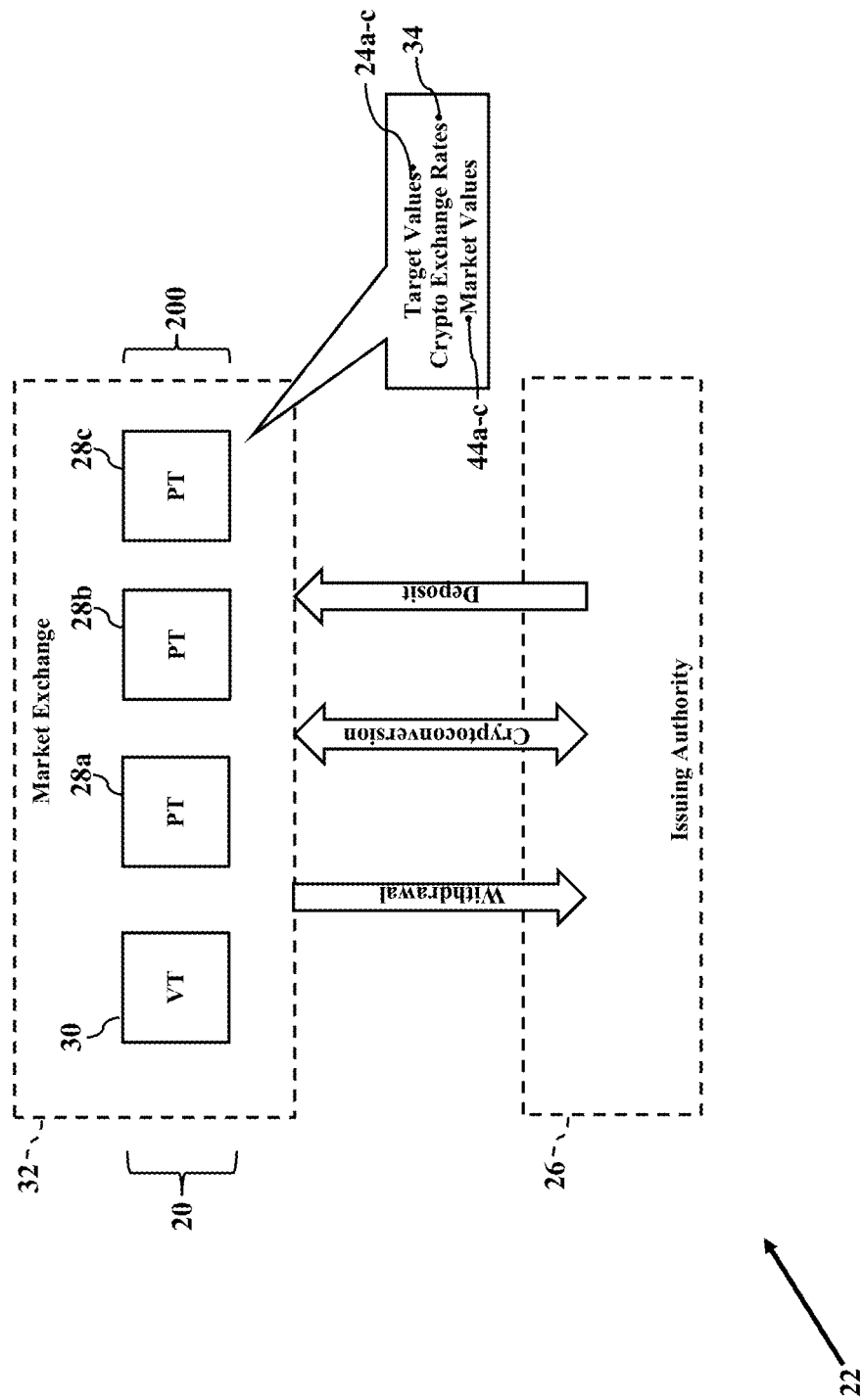
FIGS. 1-7 are simplified illustrations of stability mechanisms for cryptographic coinage in a blockchain environment.

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

FIGS. 1-7 are simplified illustrations of stability mechanisms for cryptographic coinage 20 in a blockchain environment 22, according to exemplary embodiments. Here exemplary embodiments may create, and/or destroy, the cryptographic coinage 20 to maintain a stable price or value as to a target value 24. For example, an issuing authority 26 may create or issue one or more pegged cryptographic tokens (or "PT") 28 and/or one or more variable-priced cryptographic tokens (or "VT") 30. Each pegged cryptographic token 28 and each variable-priced cryptographic token 30 is preferably freely and independently traded in a market exchange 32, but the market exchange 32 is not necessary. Regardless, cryptographic exchange rates 34 define or establish relative values between the pegged cryptographic token(s) 28 and the variable-priced cryptographic token(s) 30. That is, the cryptographic exchange rates 34 allow the value of any pegged cryptographic token 28 to be determined, converted, and/or exchanged into another one of the pegged cryptographic tokens 28 and/or into the variable-priced cryptographic token 30 and vice versa.

FIG. 1 also illustrates a network 220 of the cryptographic pegged tokens 28. While there may be many different pegged cryptographic tokens (such as any numeral N), FIG. 1 only illustrates a simple example of three (3) cryptographic pegged tokens (illustrated as reference numerals 28*a*-*c*). Each pegged cryptographic token 28*a*-*c* may be tied, or pegged, to any tradeable asset, such as any currency (e.g., the US Dollar, the Chinese Yen, the Euro), a commodity (e.g., oil, gold, silver), or property (e.g., real estate, intellectual, jewelry, antiques). Each pegged cryptographic token 28*a*-*c* may thus have its corresponding current market value 44*a*-*c* in the market exchange 32. Each pegged cryptographic token 28*a*-*c* may also have its corresponding target value 24*a*-*c*.

The network 220 of the cryptographic pegged tokens 28 may be traded. That is, any of the pegged cryptographic token 28*a*-*c* may be bought, sold, traded, and/or converted. Any one of the cryptographic pegged tokens 28 may be exchanged between any other, and/or to any other, according to their relative cryptographic exchange rates 34, within the issuing authority 26 (e.g., the protocol or central authority of the market exchange 32). Because the cryptographic pegged tokens 28*a*-*c* may fluctuate in value, there may be multiple cryptographic exchange rates 34 when valuing/trading/converting between any of the cryptographic pegged tokens 28*a*-*c* and/or the variable-priced cryptographic token 30 (as earlier explained). Even though the current market value 44 of the variable-priced cryptographic token 30 may fluctuate, the variable-priced cryptographic token 30 may have zero arbitrage opportunities. That is, its current market value 44 of the variable-priced cryptographic token 30 is whatever its market value is. The current market values 44*a*-*c* of the cryptographic pegged tokens 28*a*-*c*, however, may vary, especially when compared to each other. For example, suppose the current market value 44*a* of the cryptographic pegged token 28*a* exceeds its target value 24*a*, but the current market value 44*b* of the cryptographic pegged token 28*b* is less than its target value 24*b*. Traders in the market exchange 32 thus see an arbitrage advantage to trade/convert/sell the cryptographic pegged token 28*a* to reap a profit, and the traders see a buy opportunity to acquire the cryptographic pegged token 28*b*. The traders, in other words, may see the arbitrage opportunity is greater between the pegged tokens 28*a* and 28*b* as opposed to the variable-priced cryptographic token 30, which means that the whole network 220 has a more enhanced stability to leverage the differences between the pegged tokens 28*a* and 28*b* against each other instead of being restricted to just the variable-priced cryptographic token 30.

The network 220 of the cryptographic pegged tokens 28 increases arbitrage opportunities. Any one of the cryptographic pegged tokens 28 may be exchanged between any other, and/or to any other, according to their relative cryptographic exchange rates 34, within the issuing authority 26 (e.g., the protocol or central authority of the market exchange 32). Indeed, the issuing authority 26 may permit exchange/conversion as long as there is no difference in their market values 44. If those cryptographic pegged tokens 28 are available on the protocol (e.g., the market exchange 32) and one token 28*a* is high and a different token 28*b* is low, an exchange (such as the high token 28*a* for the low token 28*b* on the market exchange 32) may be permitted. Indeed, the same conversion may be made inside of a user's electronic wallet. For example, suppose the cryptographic pegged token 28*a* is 5% high and the cryptographic pegged token 28*b* is 2% low. An arbitrage opportunity of 7% exists between the cryptographic pegged tokens 28*a* and 28*b*. The variable-priced cryptographic token 30 would always be spot on, so the user/trader only has an arbitrage opportunity of either 5% or 2%. The 2% low cryptographic pegged token 28*b*, however, may not really be adjusted because there is not enough room there to get a good return on the trades because there are other costs in trading. But if an arbitrage opportunity of 7% exists, then an acceptable (perhaps minimum) return is present, even including trading costs/fees. That acceptable arbitrage opportunity of 7% helps to adjust the 2% low cryptographic pegged token 28*b* up and decrease the market value 44 of the 5% high cryptographic pegged token 28*a*. The acceptable arbitrage opportunity also takes stress off of the variable-priced cryptographic token 30. The acceptable, minimum return has a lot of variables (e.g., some may accept a profit at 1%, whereas other users may need 15% or 20% profit). If any cryptographic pegged token 28 is extremely, extremely volatile, then a particular margin may be required to protect from the idea that it might either fall or increase in value before cashing out, in which case the advantages may not be realized.

The issuing authority 26 may perform synthetic pairing. Because the values of the pegged cryptographic tokens 28 and/or the variable-priced cryptographic token 30 may be related (perhaps via the cryptographic exchange rate 34), any of the pegged cryptographic tokens 28 and/or the variable-priced cryptographic token 30 may be termed a synthetic pair 36 and their supply may be managed using a creation operation 38 and/or a destruction operation 40. For example, any user or holder of the variable-priced cryptographic token(s) 30 may request that the issuing authority 26 covert a certain number of her variable-priced cryptographic tokens 30 to any of the pegged cryptographic token(s) 28, perhaps on demand, at the current cryptographic exchange rate 34. Here, though, exemplary embodiments may perform the destruction operation 40 to destroy the user's requested number of her variable-priced cryptographic token(s) 30 and also perform the creation operation 38 to create an equivalent number of the pegged cryptographic tokens 28, as determined by the current cryptographic exchange rate 34. In plain words, exemplary embodiments destroy the user's requested number of her variable-priced cryptographic tokens 30 and create the equivalent number of the pegged cryptographic tokens 28.

Figure 2:
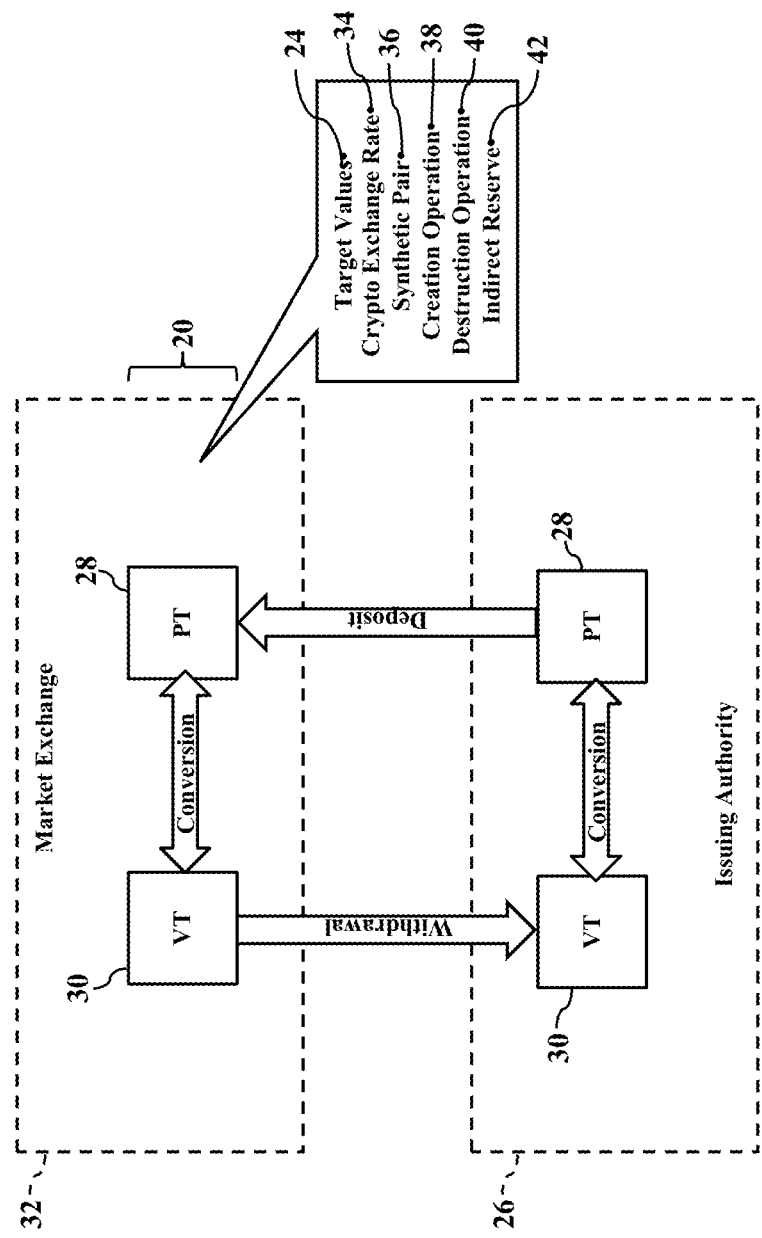

FIG. 2 illustrates additional synthetic pairing. Here the user or holder may request that the issuing authority 26 covert a certain number of her pegged cryptographic tokens 28 to the equivalent number of the variable-priced cryptographic tokens 30, perhaps on demand, again at the current cryptographic exchange rate 34. The issuing authority 26 may thus perform the destruction operation 40 to destroy the user's requested number of her pegged cryptographic tokens 28 and also perform the creation operation 38 to create the equivalent number of the variable-priced cryptographic tokens, as determined by the current cryptographic exchange rate 34.

Additional arbitrage opportunities are available. As any of the pegged cryptographic tokens 28*a*-*c* are bought/sold/traded/exchanged, their supply may be managed using the creation operation 38 and/or the destruction operation 40. For example, the issuing authority 26 may convert a certain number of the pegged cryptographic token 28*a* into the pegged cryptographic token 28*b*, perhaps on demand, at the current cryptographic exchange rate 34. That is, the issuing authority 26 may perform the destruction operation 40 to destroy a certain number the pegged cryptographic tokens 28*a* and also perform the creation operation 38 to create an equivalent number of the pegged cryptographic token 28*b*, as determined by the current cryptographic exchange rate 34. The issuing authority 26, vice versa, may perform the destruction operation 40 to destroy a certain number the pegged cryptographic token 28*b* and also perform the creation operation 38 to create an equivalent number of the pegged cryptographic tokens 28*a*. The issuing authority 26 may thus use the creation operation 38 and/or the destruction operation 40 to maintain a supply of the pegged cryptographic tokens 28*a* and/or 28*b* as stability mechanisms. The creation operation 38 and/or the destruction operation 40 may also be implemented between the pegged cryptographic tokens 28*a* and 28*c* and between 28*b* and 28*c*.

Exemplary embodiments thus eliminate reserves. Conventional stablecoin mechanisms are backed by fiat reserves or traditional assets. Exemplary embodiments, in contradistinction, eliminate any reserve requirement by leveraging the ability to create, issue, and destroy the pegged cryptographic tokens 28 and/or the variable-priced cryptographic tokens 30, according to the cryptographic exchange rate 34 as determined by the free market exchange 32. Simply put, the issuing authority 26 financially or reputationally backs the pegged cryptographic tokens 28, perhaps using the variable-priced cryptographic tokens as an indirect reserve 42.

Exemplary embodiments thus present a simple and elegant solution for stable values of the cryptographic coinage 20. The indirect reserve 42 has the advantage of seigniorage shares, without the complexity. That is, exemplary embodiments elastically manage the supply of the pegged cryptographic tokens 28 and the variable-priced cryptographic tokens 30 in a decentralized fashion, without large and cumbersome collateral requirements and complex algorithmic regulations. Seigniorage shares act like a central bank to issue stable tokens, but seigniorage shares assumes that the basis of the issuance is a token outside the control of a smart contract. Here, the indirect reserve 42 assumes the issuing authority 26 has control of both the pegged cryptographic token 28 and the variable-priced cryptographic token 30. By playing off the volatility of the variable-priced cryptographic token 30 against the pegged cryptographic token 28, the indirect reserve 42 is able to leverage game theory and arbitrage to get the free market exchange 32 to force the pegged cryptographic token 28 to match its target value 24.

Exemplary embodiments satisfy the goals for a stablecoin mechanism. The pegged cryptographic token 28 should be secure against crashes, decentralized, and collaterally efficient. The indirect reserve 42 is always able to meet its obligations, because the issuing authority 26, by definition, has the management power and authority to create and to destroy the supply of the variable-priced cryptographic tokens 30 and the pegged cryptographic tokens 28. There are no reserves to run out, and the issuing authority 26 may also match any obligation. The mechanisms for conversion between the variable-priced cryptographic tokens 30 and the pegged cryptographic tokens 28 are completely distributed and autonomous, thus satisfying the goal of decentralization. Moreover, the pegged cryptographic tokens 28 are created as collateral in the variable-priced cryptographic tokens 30 and destroyed in one direction, while the variable-priced cryptographic tokens 30 are created as collateral in the pegged cryptographic tokens 28 and destroyed in the other direction, so no collateral is actually held or required by the issuing authority 26. Simply put, the issuing authority 26 never runs out of, or exhausts, or overleverages, its collateral, so the issuing authority 26 may always respond to and execute buy/sell/trade orders from clients. Exemplary embodiments eliminate any need for auctioned bonds.

Figure 3:
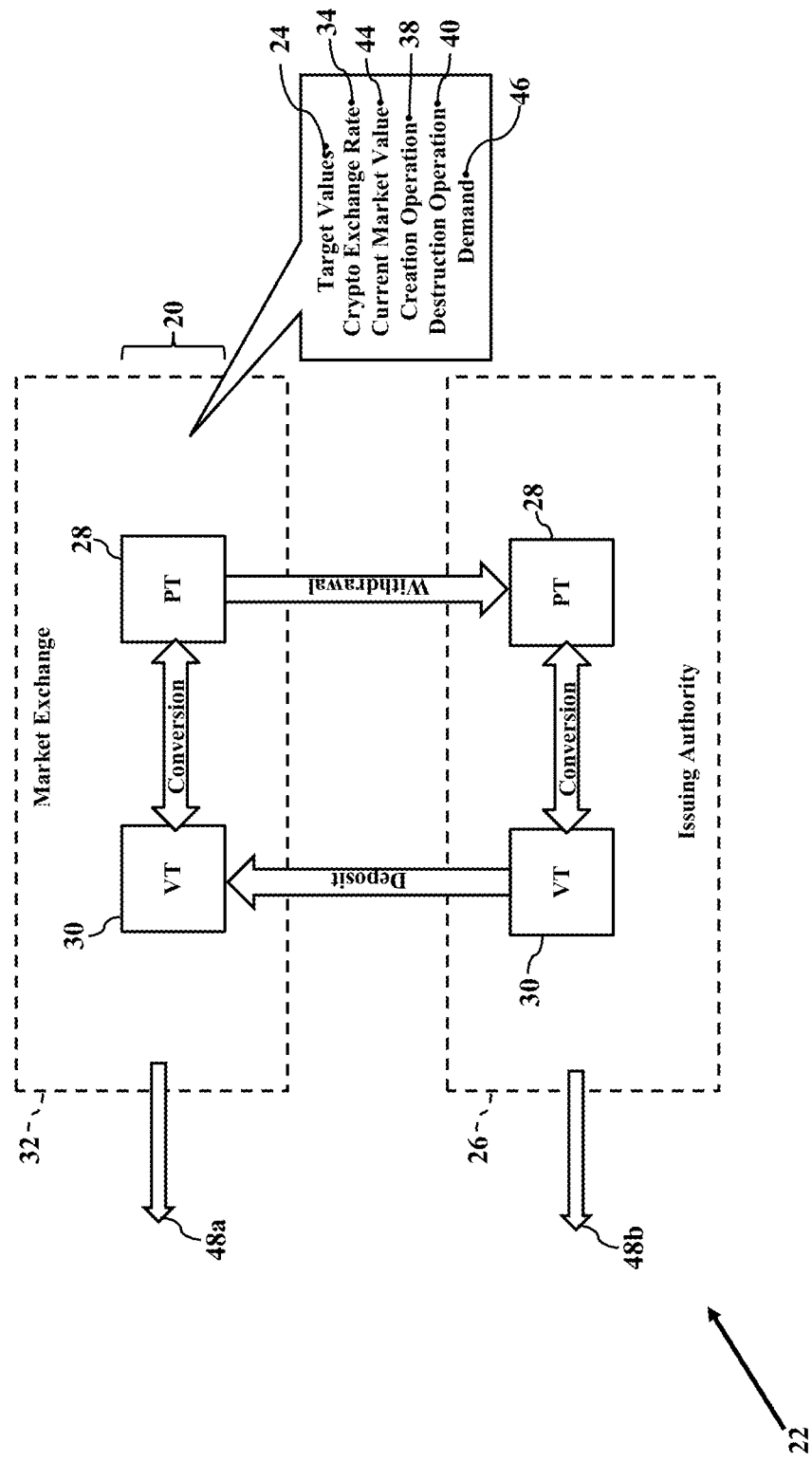

FIG. 3 illustrates a below-target scenario. Here a current market value 44 of the pegged cryptographic token 28 lags, or trails, the desired target value 24. Put another way, if the pegged cryptographic token 28 is trading low, then a demand 46 for the pegged cryptographic token 28 is low and devalued (perhaps relative to a different one of the pegged cryptographic tokens 28 and/or to the variable-priced cryptographic token 30). Traders see a buy opportunity in the pegged cryptographic token 28, while holders of the different one of the pegged cryptographic tokens 28 and/or the variable-priced cryptographic token 30 see a sell opportunity to reap a profit. The holders will sell or exchange a quantity of their different one of the pegged cryptographic tokens 28 and/or the variable-priced cryptographic token 30 for an equivalent number of the pegged cryptographic tokens 28 (according to the cryptographic exchange rate 34), thus realizing the profit. The issuing authority 26, acting in concert with the free market exchange 32, jointly operate as a powerful stabilizing force for the pegged cryptographic token 28. Exemplary embodiments may thus enforce independent trading platforms like exchanges through arbitrage to create a Schelling point at the target value 24 of the pegged cryptographic token 28.

Stabilization may occur. Because a profit opportunity exists, holders sell or exchange any of the cryptographic tokens 28 or 30 for an equivalent number of the pegged cryptographic tokens 28 (according to the cryptographic exchange rate 34), thus realizing the profit. As the sales/exchanges are processed, the population pool or quantity of the variable-priced cryptographic tokens 30 in the market exchange 32 is reduced (perhaps due to the destruction operation 40) and the population quantity or pool of the pegged cryptographic tokens 28 (e.g., a total number in usage or issuance) increases in the market exchange 32 (perhaps due to the creation operation 38). As the crypto-coinage exchange proceeds, the issuing authority 26 and/or the market exchange 32 may monitor the population supplies of the variable-priced cryptographic tokens 30, the pegged cryptographic tokens 28, their current market values 44, and their target values 24. If too many variable-priced cryptographic tokens 30 are sold or exchanged and destroyed, there may be a greater number of the pegged cryptographic tokens 28 than desired (due to the creation operation 38 and/or the destruction operation 40) and an oversupply condition may exist. Simultaneously, or nearly simultaneously, the issuing authority 26 and/or the market exchange 32 may cooperate to reduce, or withdraw, the pegged cryptographic tokens 28 from the market exchange 32. The issuing authority 26, in other words, performs the destruction operation 40 to withdraw and destroy a desired quantity of the pegged cryptographic tokens 28 from the market exchange 32 to stabilize its current market value 44 to the target value 24. At nearly the same time, the issuing authority 26 may also perform the creation operation 38 to create a desired quantity of the variable-priced cryptographic tokens 30 and injects, or deposits, the newly-created variable-priced cryptographic tokens 30 into the market exchange 32, thus replenishing its population supply. These trades/exchanges may happen without delays imposed by deposits and withdraws as long as balances are setup ahead of time by the trader. Trades on the market exchange 32 and with the issuing authority 26 may be executed in parallel. Once the trades are executed and recorded (perhaps to blockchains 48*a* and/or 48*b*, as later paragraphs will explain), the issuing authority 26 deposits or replenishes the population supply or balance of the variable-priced cryptographic tokens 30 into the market exchange 32 to set the market exchange 32 up for the next arbitrage opportunity.

Exemplary embodiments thus stabilize the pegged cryptographic token 28. Because the exchange of the pegged cryptographic token 28 for the variable-priced cryptographic token 30 could vary greatly over time, the issuing authority 26 ensures enough variable-priced cryptographic tokens 30 are injected/provided for any transaction. These variable-priced cryptographic tokens 30 are created and the pegged cryptographic tokens 28 are destroyed. Moreover, the issuing authority 26 may also create any amount of the variable-priced cryptographic tokens 30 that are needed to maintain an equilibrium between the current market value 44 and the target value 24 of the pegged cryptographic token 28.

Exemplary embodiments use market forces. If the pegged cryptographic token 28 is trading low, then traders/holders in the market exchange 32 consider the pegged cryptographic token 28 to be devalued relative to the variable-priced cryptographic token 30. The market exchange 32 may have a pool of the pegged cryptographic tokens 28 and another pool of the variable-priced cryptographic tokens 30. The issuing authority 26 (e.g., a protocol or central authority off the market exchange 32) also has additional pools of the pegged cryptographic tokens 28 and the variable-priced cryptographic tokens 30. When the pegged cryptographic token 28 is devalued by the market exchange 32, its demand 46 is low and traders/holders will have a profit incentive to buy the pegged cryptographic token 28 at its low current market price or value 44, thus converting the pegged cryptographic token 28 to its equivalent number of variable-priced cryptographic tokens 30 (according to the cryptographic exchange rate 34). Because the issuing authority 26 may monitor the total number of the variable-priced cryptographic tokens 30, the issuing authority 26 may also, nearly simultaneously, buy an excess number of the variable-priced cryptographic tokens 30 to maintain a consistent supply or pool of the variable-priced cryptographic tokens 30. Recall that a buy order destroys the variable-priced cryptographic tokens 30 and creates or gains more pegged cryptographic tokens 28. Simply put, anytime a trader/holder and/or the issuing authority 26 can make money, market forces will push the current market price or value 44 up. An increasing market value 44 concomitantly increases the demand 46 of the pegged cryptographic token 28, thus bringing the current market value 44 toward the target value 24.

Figure 4:
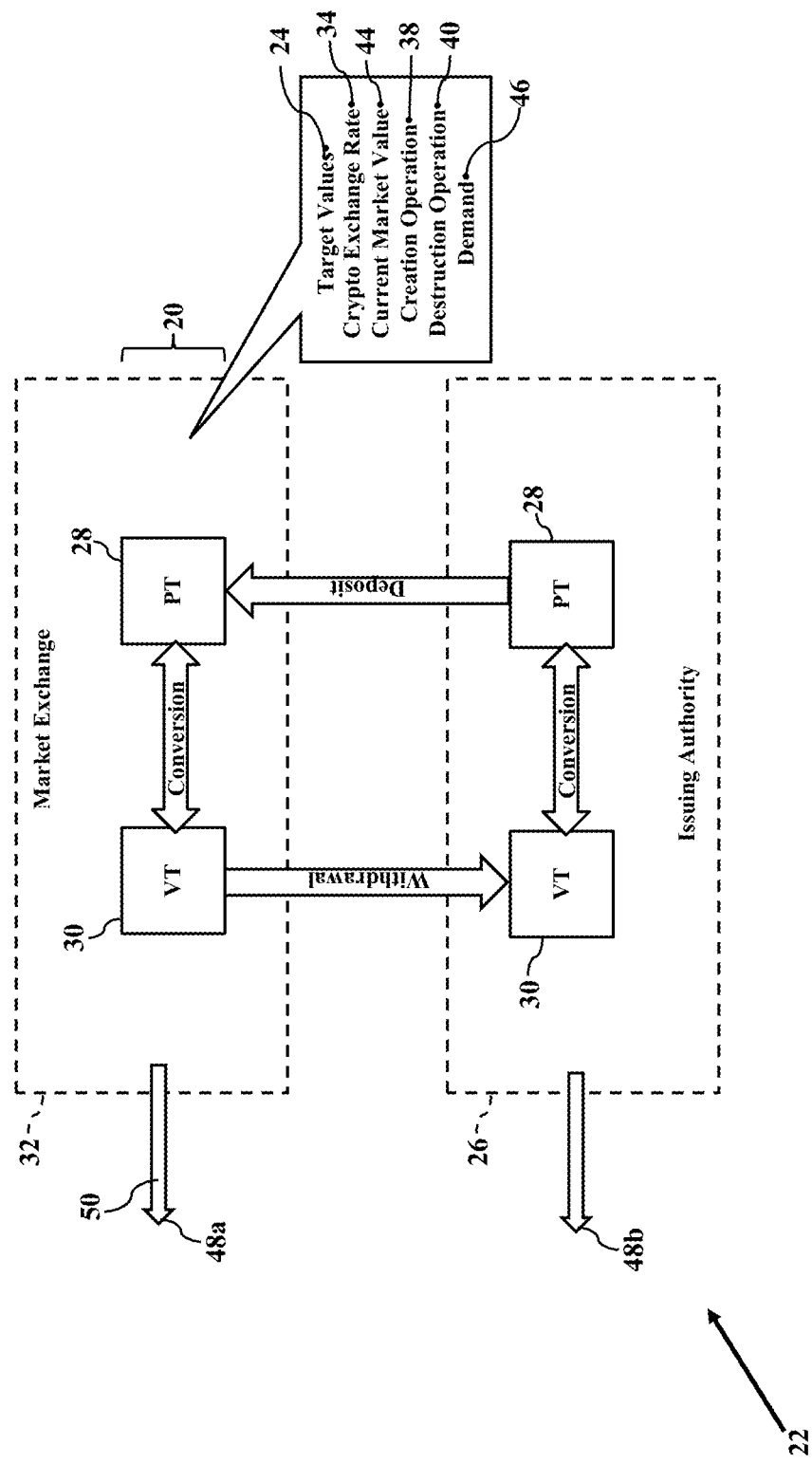

FIG. 4 illustrates an above-target scenario. Here the current, market value 44 of the pegged cryptographic token 28 is greater or higher than its desired target value 24. The demand 46 for the pegged cryptographic token 28 is increasing, so the pegged cryptographic token 28 may eventually be overvalued relative to the variable-priced cryptographic token 30 and/or to its target price or value 24. Holders of the pegged cryptographic token 28 have the sell opportunity to reap a profit, while traders see the buy opportunity in the variable-priced cryptographic token 30. The holders sell or exchange their pegged cryptographic tokens 28 for an equivalent number of the variable-priced cryptographic tokens 30 (according to the cryptographic exchange rate 34), thus realizing the profit. As the sales/exchanges are processed, the demand 46 for the pegged cryptographic token 28 decreases, thus reducing its current market value 44 toward its target value 24. Moreover, the demand 46 for the variable-priced cryptographic token 30 increases, thus increasing its current market value 44.

Population control may also be implemented. As the holders of the pegged cryptographic token 28 sell, the population pool or quantity of the pegged cryptographic tokens 28 in the market exchange 32 decreases. As the coinage trades proceed, the issuing authority 26 and/or the market exchange 32 may monitor the population supplies of the variable-priced cryptographic tokens 30, the pegged cryptographic tokens 28, their current market values 24, and their target values 24. If too many pegged cryptographic tokens 28 are sold or exchanged and destroyed, there may be a greater number of the variable-priced cryptographic tokens 30 than desired (due to the creation operation 38 and/or the destruction operation 40) and the oversupply condition may exist. Simultaneously, or nearly simultaneously, the issuing authority 26 and/or the market exchange 32 may cooperate to reduce, or withdraw, the variable-priced cryptographic tokens 30 from the market exchange 32. The issuing authority 26, in other words, performs the destruction operation 40 to destroy a desired quantity of the variable-priced cryptographic tokens 30 from the market exchange 32 to stabilize its current market value 44 to the target value 24. At nearly the same time, the issuing authority 26 performs the creation operation 38 to create a desired quantity of the pegged cryptographic tokens 28 and injects, or deposits, the newly-created pegged cryptographic tokens 28 into the market exchange 32, thus replenishing its population supply. These trades may then be recorded to the blockchain 48 (as later paragraphs will explain).

Market forces again prevail. If the value of the pegged cryptographic token 28 is high compared to its target value 24 and/or the variable-priced cryptographic token 30, then the pegged cryptographic token 28 may be sold on the market exchange 32 for the variable-priced cryptographic token 30. This sell operation results in a greater amount of the variable-priced cryptographic tokens 30 than the pegged cryptographic token 28 should allow. At the same time, a lesser amount of the variable-priced cryptographic tokens 30 can be exchanged for the same pegged cryptographic tokens 28 by the issuing authority 26, thus replenishing the supply of the pegged cryptographic tokens 28 in the market exchange 32.

The issuing authority 26 may thus be a market participant. However, the issuing authority 26 may participate for opposite market effects. When the issuing authority 26 trades between the pegged cryptographic tokens 28 and the variable-priced cryptographic tokens 30, the market effect of these trades is opposite to the trades on the market exchange 32. Suppose, for example, that a large number of the variable-priced cryptographic tokens 30 were sold for between the pegged cryptographic tokens 28 on the market exchange 32. The price of the variable-priced cryptographic token 30 necessarily goes down as the trade(s) consumes the order book for the variable-priced cryptographic token 30. On the other hand, a large number of the variable-priced cryptographic tokens 30 exchanged for the pegged cryptographic tokens 28 using the issuing authority 26 reduces the supply of the variable-priced cryptographic tokens 30 by that amount. Lowering the supply of the variable-priced cryptographic tokens 30 eventually increases the current market price 44 of the variable-priced cryptographic tokens 30. So, as the pegged cryptographic token 28 becomes popular as a stable value, the demand 46 for the pegged cryptographic token 28 is likely to rise, but the only way to create a bigger supply of the pegged cryptographic token 28 is through the conversation of the variable-priced cryptographic token 30 to the pegged cryptographic token 28, which lowers the supply of the variable-priced cryptographic token 30. On the other hand, if the value of the variable-priced cryptographic token 30 is in question and falls in the market exchange 32, conversion to the pegged cryptographic token 28 becomes attractive. All of these operations (e.g., the creation operation 38 and the destruction operation 40) increase the value of the variable-priced cryptographic token 30. As the value of the variable-priced cryptographic token 30 goes up, market participants will purchase the variable-priced cryptographic token 30 and thus further increase its value. But the demand 46 may also trigger the conversion of the pegged cryptographic token 28 to the variable-priced cryptographic token 30, and that conversion may dampen the growth in value of the variable-priced cryptographic token 30 by increasing the supply.

Market arbitrage may be autonomous. The blockchain 48*a* may include so-called smart or digital contracts 50 that self-execute buy/sell trades according to predefined contractual parameters. The blockchain 48 may thus monitor the current market values 44 and/or the target values 24 for the variable-priced cryptographic token 30 and the pegged cryptographic token 28 and execute pre-defined buy and sell orders. Digital contracts 50 may thus be automated traders that buy and sell the cryptographic tokens 28 and 30. An entity or party may thus acquire more of the cryptographic tokens 28 and 30 than desired, while at the same time selling/destroying the cryptographic tokens 28 and 30 for a profit. The entity or party may thus configure their smart or digital contracts 50 to achieve financial goals, yet exemplary embodiments ensure that the current market value 44 and the target value 24 are stable and less likely to vary.

Exemplary embodiments are bondless. Neither the buyer, seller, nor the issuing authority 26 is required to post or provide a financial or coin bond, security, or other asset. Simply put, any party or entity, whether company, corporation, or individual person, may participate in the market exchange 32 and buy or sell the variable-priced cryptographic token 30 and the pegged cryptographic token 28. Indeed, exemplary embodiments may be applied to the market exchange 32 having a small number of only two (2) players or hundreds, thousands, or millions of participants.

Figure 5:
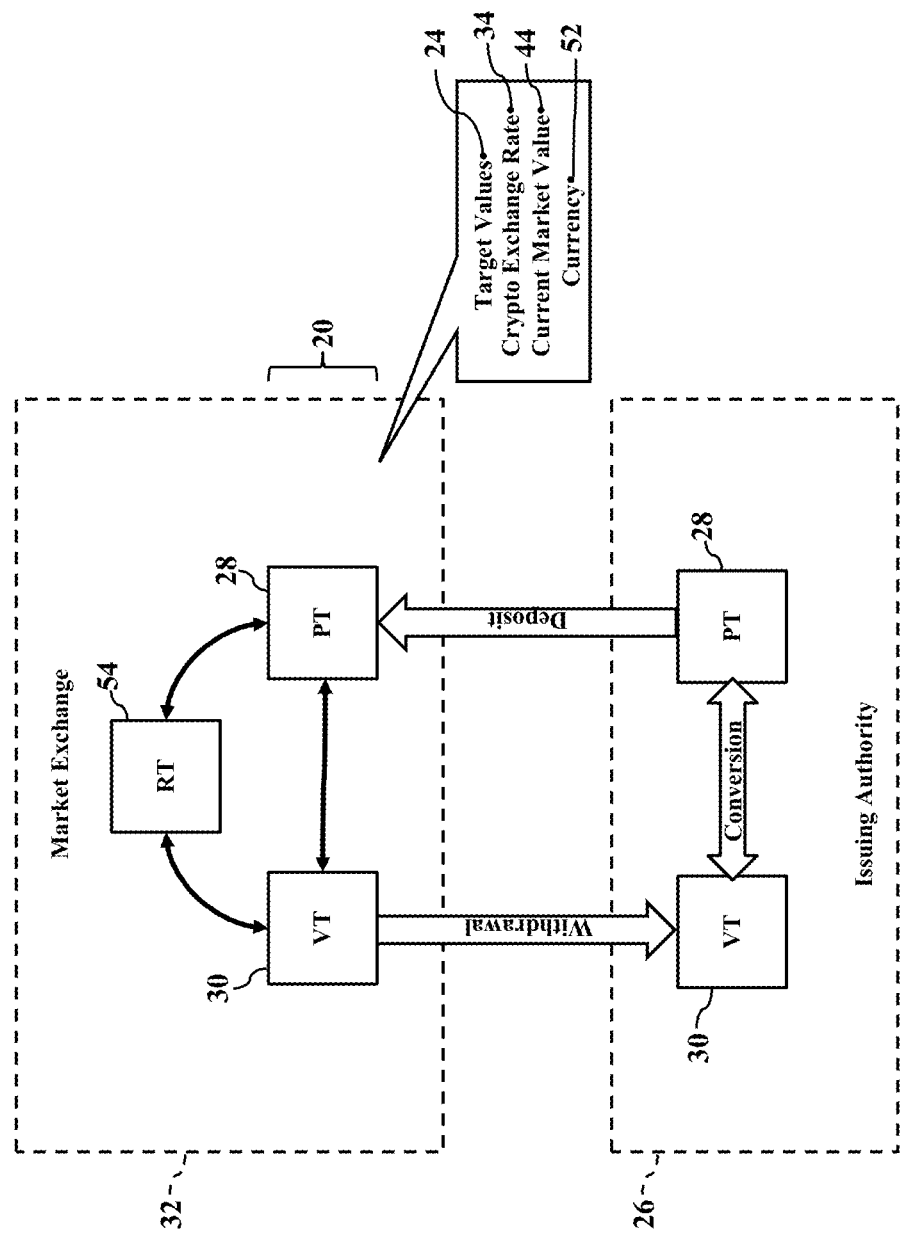

FIG. 5 further illustrates the pegged cryptographic token 28. As this disclosure above explained, the pegged cryptographic token 28 and the variable-priced cryptographic token 30 may have related values. The pegged cryptographic token 28, in other words, may be an encryption-secured digital medium of exchange whose value (e.g., the target value 24) is tied to some other asset or medium of exchange. The pegged cryptographic token 28, in particular, may be linked to any nation's currency 52 (such as the United States Dollar). The pegged cryptographic token 28, however, may be based on other assets, such as gold and other precious metals or even one or more other cryptographic coins. FIG. 5, for example, illustrates a reference cryptographic token (or "RT") 54 which may also be freely traded on the market exchange 32. The market exchange 32 may thus establish or set the values of the variable-priced cryptographic token 30 and the pegged cryptographic token 28 in relative terms to the reference cryptographic token 54. The cryptographic exchange rate 34, in other words, may be defined based on the relative values between the pegged cryptographic token 28, the variable-priced cryptographic token 30, and the reference cryptographic token 54. The reference cryptographic token 54 may thus only be used as a reference point. The pegged cryptographic token 28 may be valued in relation to the Consumer Price Index ("CPI") adjusted to the United States Dollar. The issuing authority 26 may thus manage the cryptographic exchange rate 34 between the pegged cryptographic token 28 and the variable-priced cryptographic token 30, and the cryptographic exchange rate 34 drives the arbitrage that stabilizes the pegged cryptographic token 28.

Figure 6:
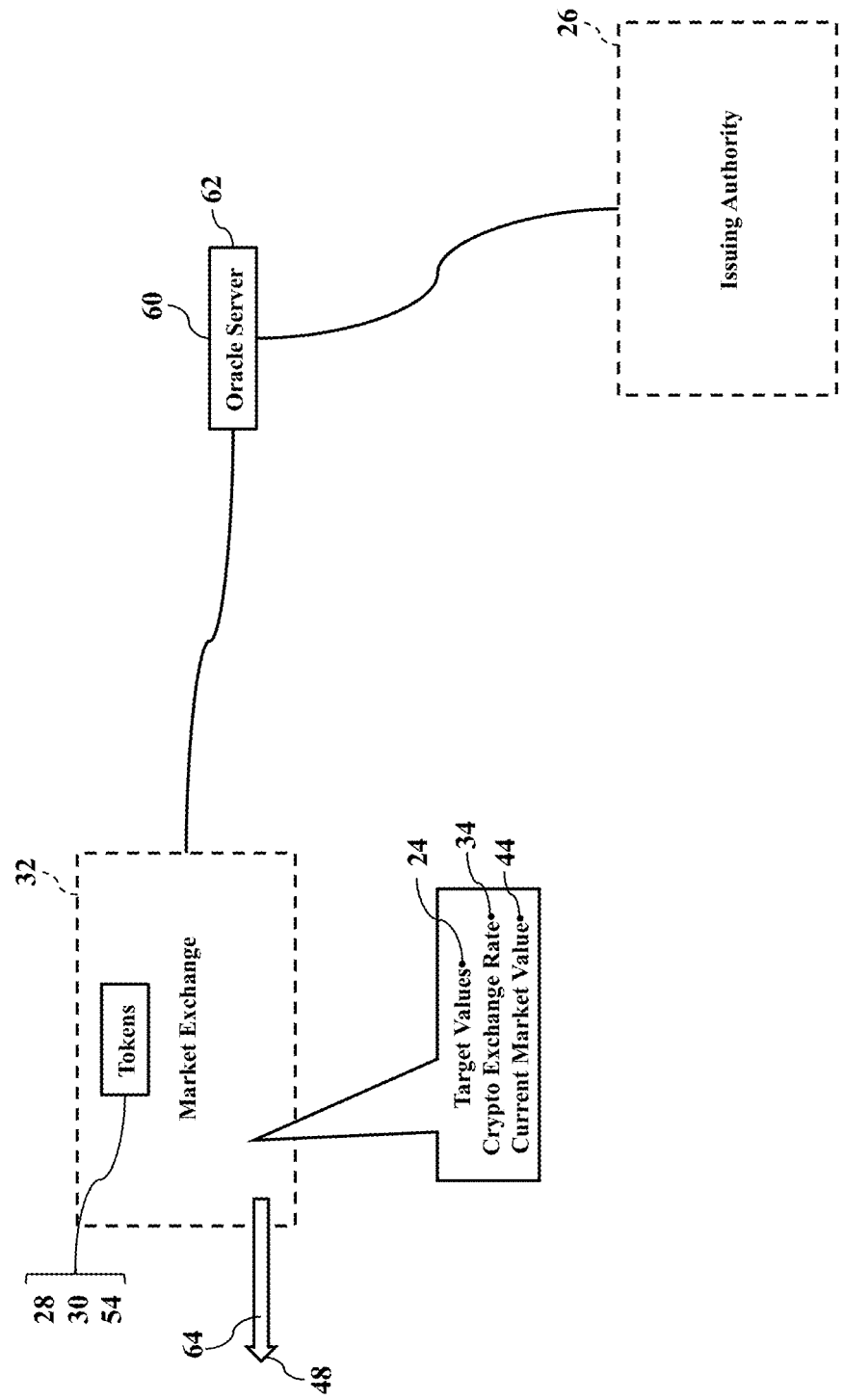

As FIG. 6 further illustrates, an oracle 60 may publish the current market values 44. As the market exchange 32 operates, the current market values 44 of the pegged cryptographic tokens 28, the variable-priced cryptographic token 30, and/or the reference cryptographic token 54 need to be discovered and dispersed to the market participants. Blockchain miners and other federated servers may find it inefficient to continuously and/or repeatedly query the market exchange 32 for current pricing. Moreover, these pricing queries would contribute to packet congestion in a communications network serving or accessing the market exchange 32. Pricing stability may require a faster and simpler mechanism for pricing discovery. Exemplary embodiments, then, may utilize any query mechanism to discover the current market values 44 of the cryptographic tokens 28, 30, and/or 54. One or more oracle servers 62, for example, may communicate with the market exchange 32 and with the issuing authority 26. The oracle servers 62 perform an oracle function that provides historical and/or the current market values 44 of the cryptographic tokens 28, 30, and/or 54. Any participant of the market exchange 32, and the issuing authority 26, may send a query to the oracle server 62 and retrieve current market values 44, the cryptographic exchange rate 34, and/or the target values 24. Indeed, there may be multiple or different cryptographic exchange rates 34, perhaps reflecting value spreads when converting "VT" 30 to "PT" 28 or when converting "PT" 28 to "VT" 30. The market exchange 32 thus establishes market values for the cryptographic tokens 28, 30, and/or 54. The blockchain 48 may additionally or alternative publish pricing information as a transaction in a block 64 of data, which allows the smart, digital contract 48 to remotely attest that the pricing information is accurate.

Exemplary embodiments may also permit multiple coinage trades. That is, participants in the market exchange 32 may buy and sell many different cryptocurrencies and assets. For example, the synthetic pair 36 may actually be associated multiple pegged cryptographic tokens 28 and/or multiple variable-priced cryptographic tokens 30. The synthetic pair 36 may thus be bought and sold as a single trade or transaction involving the tokens 28 and 30, and that single transaction may be recorded to the blockchain 48. Indeed, a single variable-priced cryptographic token 30 may be paired with several or many pegged cryptographic tokens 28, and the pegged cryptographic tokens 28 may be associated with different issuing authorities 26 (such as BITCOIN®, ETHEREUM®, RIPPLE®, or other cryptographic coin mechanisms).

Pegging to the Consumer Price Index allows for a virtual distributed market. Coinage trades need not be between people, as exemplary embodiments would push collateral from one pegged cryptographic token 28 to another. Suppose, for example, that the pegged cryptographic token 28 is tied or associated with the Dow Jones Industrial Average ("DJIA") as a token pair against the variable-priced cryptographic token 30, gold, a BITCOIN® token, and the US Dollar. Then, if a holder wanted to be in US Dollars, the holder need only push or convert value over into dollars. If the holder wanted to be in the DJIA, the holder could push and convert into shares or holdings in the DJIA. The positional changes increase the value of the variable-priced cryptographic token 30 because, the only way in is burn the variable-priced cryptographic token 30 out of existence. The holder pushes the supply down, thus increasing the demand interest in the distributed market exchange 32. The holder has thus necessarily created the higher price of the variable-priced cryptographic token 30 in order to get her assets into the system. Merely buying on the market exchange 32 creates a price that allows the holder to get into the variable-priced cryptographic token 30. Furthermore, as the holder moves out of the variable-priced cryptographic token 30 into other assets or tokens, the holder necessarily burns the supply down. Thus, moving into the pegged cryptographic token 28 reinforces the supply of the underlying variable-priced cryptographic token 30.

Exemplary embodiments may also limit risk. Buying, selling, and destroying the variable-priced cryptographic token 30 only risks the collateral that is in the system. In other words, if the variable-priced cryptographic token 30 is only priced at five dollars ($5.00) at a start of trading, the holder has no risk from the pegged cryptographic token 28, as no pegged cryptographic token 28 exists or has been created. However, as participants buy the variable-priced cryptographic tokens 30, in order to get into the pegged cryptographic token 28 system, the market exchange 32 will push up the price of the variable-priced cryptographic token 30. If a holder should liquidate, then obviously the supply of the variable-priced cryptographic token 30 increases and the price drops. So, as people don't want to have the variable-priced cryptographic token 30, the demand 46 drops and the price lowers. However, if market participants desire the variable-priced cryptographic token 30, they raise the price.

Trust is important. If the pricing information provided by the oracle server 62 and/or by the blockchain 48 is untrusted or unreliable, the market exchange 32 may fail. Trust may thus depend on any participant's ability to audit and prove the distributed nature of the oracle servers 62, the historical and current market values 44 they collect over time, and the application of the pricing data to trades by the issuing authority 26.

Additional observations on stabilization are provided. If the variable-priced cryptographic token 30 loses significant value, traders may flee or liquidate and convert to the pegged cryptographic token 28 (to escape the falling value of the variable-priced cryptographic token 30). However, this conversion may destroy a significant quantity of the variable-priced cryptographic tokens 30, thus reducing its supply in the market exchange 32. A reduction in supply, in turn, may cause significant inflation in the current market value 44 of the variable-priced cryptographic token 30. Again, then, the destruction operation 40 provide by exemplary embodiments helps stabilize current market value 44.

The demand 46 further influences stabilization. Suppose that the utility of the pegged cryptographic token 28 is significant, implying that many market participants demand ownership positions. The market participants, in other words, may want to acquire the variable-priced cryptographic token 30 as the only gateway to create the pegged cryptographic token 28 (via the destruction operation and the creation operation 38, as above explained). The demand 46 for the variable-priced cryptographic token 30, in other words, increases, thus increasing its current market value 44. However, if the current market value 44 significantly increases, holders of the pegged cryptographic token 28 may be tempted to convert their pegged cryptographic tokens 28 to the variable-priced cryptographic tokens 30, particularly if the trade volume is not high and a thin market depth provides an advantage. However, such a trade on the issuing authority tends to lower the price (e.g., the current market value 44) by increasing the supply of the variable-priced cryptographic tokens 30.

Exemplary embodiments may thus impose limits. At any point in time, the ability to inflate the current market value 44 of the variable-priced cryptographic token 30 is limited by the value and quantity of the pegged cryptographic token 28. Similarly, the supply of the pegged cryptographic tokens 28 is limited by the value of the variable-priced cryptographic token 30. The stability of the pegged cryptographic token 28 may thus be dependent not just on the accuracy of the oracle servers 62 used by the issuing authority 26, but stability may also depend on the extent to which the price on the market exchange 32 matches the value provided nu the oracle(s). In truth, prices of tokens and assets will vary across different exchanges, and arbitrage opportunities exist for all trading as a result. The pegged cryptographic token 28 then can be expected to be close to the value of the reference cryptographic token 54, but unlikely to be perfectly pegged to the value of the reference cryptographic token 54.

Exemplary embodiments may introduce time delay. Trades conducted by, or ordered by, the issuing authority 26 may necessarily be delayed in time, due to the time required for the oracle server(s) 62 to provide their pricing information. This delay, especially if random, thwarts traders who attempt to front run or anticipate upcoming, future trades by the issuing authority 26. This uncertainty may be a feature, as predictability is necessary to game automatic systems. So, when a buy/sell order is placed, the buyer/seller may have to wait some period of time before that order picks up the oracle price to suppress or thwart front-running. The time delay, though, may be limited or maxed out, as too long of a delay may dampen or hinder the ability of the market exchange 32 to correct prices.

The pegged cryptographic token 28 need not traded on the market exchange 32. Upon launch of the pegged cryptographic token 28, where the variable-priced cryptographic token 30 is traded on the market exchange 32, other observations may be noted. Holders of the variable-priced cryptographic token 30 can move the variable-priced cryptographic token 30 to the pegged cryptographic token 28 using the services of the issuing authority 26 to escape currency risk when the variable-priced cryptographic token 30 is falling in value. This removes the variable-priced cryptographic token 30 from the market exchange 32, thus reducing its market supply and supporting the current market value 44 of the variable-priced cryptographic token 30. At the same time, the pegged cryptographic token 28 holds its current market value 44 (perhaps relative to its target value 24 or to the reference cryptographic token 54). Exemplary embodiments thus provide a safe harbor for treasury management purposes.

For example, suppose a traditional cryptocurrency "A" supports the pegged cryptographic token 28 pegged to the US Dollar. When the cryptocurrency A is slipping in value, the cryptocurrency A can be converted to the pegged cryptographic token 28 with a simple electronic wallet transaction. It should be noted that converting the cryptocurrency A to the pegged cryptographic token 28 lowers the supply of the cryptocurrency A, tending to support the price of the cryptocurrency A. When the price of the cryptocurrency A is rising, a party that moved to the pegged cryptographic token 28 can move back into the cryptocurrency A. This does cause inflation in the cryptocurrency A, so such moves will tend to lower the price of the cryptocurrency A, leading to a steadier value, and discouraging large movements from the pegged cryptographic token 28 to the cryptocurrency A. If the cryptocurrency A and the pegged cryptographic token 28 are part of an investment portfolio, these conversions can be done without involving the market exchange 32 or looking for buyers. If the cryptocurrency A is used for funding operations or paying for goods and services, the pegged cryptographic token 28 provides a logical mechanism for these transactions, as it has a predictable price over time.

Both the pegged cryptographic token 28 and the variable-priced cryptographic token 30 may be traded on the market exchange 32. For miners of operators of a public blockchain that have expenses to pay, conversion to US Dollars may be desired. However, they also have a vested interest in maintaining the price of the variable-priced cryptographic token 30. A conversion of the variable-priced cryptographic token 30 to the pegged cryptographic token 28 supports the price of the variable-priced cryptographic token 30 (their likely unit of support), and the pegged cryptographic token 28 can be moved to an exchange and liquidated for an expected value more easily. If the variable-priced cryptographic token 30 is falling in value over time, the pegged cryptographic token 28 becomes an increasingly attractive option, and can be executed in a reasonably predictable transaction compared to exchanges. At the same time, such conversions support the price of the variable-priced cryptographic token 30. If the variable-priced cryptographic token 30 is rising in price, purchasing on the market exchange 32 will support the price, while conversion of the pegged cryptographic token 28 to the variable-priced cryptographic token 30 will tend to slow gains in the variable-priced cryptographic token 30. For those interested in investing in the variable-priced cryptographic token 30, transactions in the market exchange 32 make more sense.

Exemplary embodiments may include treasury management. Any entity (such as the market exchange 32 and/or the issuing authority 26) may allocate the dollar-denominated pegged cryptographic token 28, plan a period of usage, monitor market conditions, and adjust an exposure to the variable-priced cryptographic token 30 versus the stability of the pegged cryptographic token 28. Exemplary embodiments may manage pricing, the demand 46, and supply of the variable-priced cryptographic token 30, even if no one is trading the pegged cryptographic token 28, because the protocol (executed by the issuing authority 26) respects it.

Exemplary embodiments may also thwart sell loops. Suppose a holder owns or holds a large amount or quantity of the cryptographic tokens 28 and/or 30. The holder, of course, may sell the cryptographic tokens 28 and/or 30, thus converting to some other quantity of the pegged cryptographic tokens 28. This sell operation lowers the current market price of the sold cryptographic tokens 28 and/or 30. Now the holder has a resulting quantity of the pegged cryptographic tokens 28. The holder may then withdraw the cryptographic tokens 28 and/or 30 from the market exchange 32 (such as moving the pegged cryptographic tokens 28 to her electronic wallet). Later in time, the holder could move the pegged cryptographic tokens 28 from her electronic wallet and exchange back into another pegged cryptographic token 28 and/or the variable-priced cryptographic tokens 30. This conversion inflates the supply in the market exchange 32. In theory, then, the holder could repeat this sell scheme to attack the current market value 44 of the variable-priced cryptographic tokens 30 and/or the pegged cryptographic token 28. However, a problem with this attack includes the fact that the attacker needs quite a bit of funds, and the cryptographic tokens 28 and/or 30 may lose value with each cycle. Moreover, the market participants may police actions. When the price of the variable-priced cryptographic token 30 falls, other participants may also convert to the pegged cryptographic token 28, thus lowering the supply. This collective market action my even negate the attacker's sell loop attack.

Preservation of wealth prevails. The attacker is trying to inflate the value of the variable-priced cryptographic token 30 or the pegged cryptographic token 28, depending on position. The holder tries to sell the variable-priced cryptographic token 30 on the market exchange 32, thus forcing down its price and acquiring the pegged cryptographic token 28. The attacker may then approach the issuing authority 26 and sell the pegged cryptographic token 28 back into the variable-priced cryptographic token 30, which inflates the supply. The attacker can then upload the higher volume to the market exchange 32 repeat the sell cycle, as the market participants see the supply inflate and that is a downward pressure. However, this attack process also raises the supply of variable-priced cryptographic token 30, which necessarily burns down the supply of the pegged cryptographic tokens 28. Ultimately, then, this sell cycle would exhaust the entire supply of the pegged cryptographic tokens 28, and the sell cycle costs the attacker money. The attacker will be successful to the extent that he/she loses money. However, as the variable-priced cryptographic tokens 30 are sold to drive down the price, other market participants will panic and move into the pegged cryptographic tokens 28. As the price of the variable-priced cryptographic tokens 30 falls, other market participants buy the pegged cryptographic tokens 28, thus also burning down the supply of the variable-priced cryptographic tokens 30. So, while the attacker is trying to inflate the supply, other market participants can be working against the attacker to burn the supply down. Simply put, the other market participants are preserving their wealth.

Exemplary embodiments may also apply to nation-state governments. Countries with hyperinflation and a central bank struggle to create a platform by which businesses and their markets can transact. The conditions and constraints involved vary widely from country, but exemplary embodiments may be applied by national governments to improve currency management. Any country with a national currency needs to have its value stabilized, and a possible secondary token can be used to carry out business in the immediate term. So, assume that a transaction currency (e.g., a "USDpeg" is a national currency pegged to the United States Dollar), implemented with an indirect pegging to the United States Dollar and managed and controlled by the central bank, is a desired solution. First, the national currency would have to be available on a free exchange to establish a real exchange rate with the United States Dollar. Second, the Central bank would provide services to convert the national currency at the market exchange rate into the USDpeg currency. Third, the Central bank would provide services to convert the USDpeg currency at the market exchange rate into the national currency. Fourth, the only mechanism to generate the USDpeg currency would be the conversion of the national currency to the USDpeg currency. As businesses and transactions move to the USDpeg, the supply of the national currency would be reduced, and the value of the national currency should be supported. The concern would be for the national currency to become worthless on the market. Some amount of fiscal/monetary/monetary responsibility around managing the supply of the national currency may be required. However, stability in business and the market could be attained quicker and in parallel with fiscal/monetary reforms rather than putting off stability until reforms are in place.

Exemplary embodiments overcome a loss in confidence. As the reader may understand, a loss in confidence in any stable token may create a downward spiral, where market forces drive value to low or even historic lows. With an indirect pegged token (such as the variable-priced cryptographic token 30), though, the value of the pegged cryptographic token 28 is lower than the variable-priced cryptographic token 30 that supports it. Arbitrage allows users to diminish the supply of the pegged cryptographic token 28 to attain more variable-priced cryptographic tokens 30 from the issuing authority 26 than the trade of the variable-priced cryptographic token 30 for pegged cryptographic token 28 on the market exchange 32 allows. Arbitrage will allow the trader to gain in the variable-priced cryptographic tokens 30 at the expense of lowering the supply of the pegged cryptographic token 28. While selling the pegged cryptographic token 28 on the market exchange 32 to get out of the pegged cryptographic token 28 will be a solution for many, exemplary embodiments provide an arbitrage opportunity for traders to profit, but necessarily lowers the supply of the pegged cryptographic token 28 in the process. When both the variable-priced cryptographic token 30 and the pegged cryptographic token 28 fall in value, and the variable-priced cryptographic token 30 falls faster than arbitrage can be leveraged for profit, traders could shift to selling off both the variable-priced cryptographic token 30 and the pegged cryptographic token 28 on the exchanges, and both the variable-priced cryptographic token 30 and the pegged cryptographic token 28 could go to zero. This could happen with any issuing authority with irresponsible monetary policy for the variable-priced cryptographic token 30.

Still more observations are provided. Any oracle (such as an operator of the oracle server 62 or other service provider) may be as simple as members of any community polling and reporting using application programming interfaces (or "APIs") provided by the market exchange 32. If the oracle requires time for pricing information to settle and record, conversions between the variable-priced cryptographic token 30 and the pegged cryptographic token 28 may be delayed in order to use future exchange rates to avoid front running by holders watching and gaming the market. Transactions may be recorded (perhaps in the blockchain 48) at the beginning of the delay, but the transactions may be later executed using the current price at the end of the delay. On the blockchain 48, the cryptocurrency exchange rate(s) 34 (perhaps gathered from the oracle server 62) may be logged over time to provide an audit trail, perhaps including conversions details (e.g., time, GPS location, quantity, the current market price 44, and buy/sell parties) and even the time delay implemented or enforced by the issuing authority 26. Because the issuing authority 26 can create the variable-priced cryptographic token 30 as needed, the conversion of the pegged cryptographic token 28 to the variable-priced cryptographic token 30 is always possible. Because the pegged cryptographic token 28 is desired by parties performing transactions over time, for many use cases the variable-priced cryptographic token 30 may need to first be converted to the pegged cryptographic token 28. This destroys the variable-priced cryptographic token 30, while relatively simultaneously supporting the value of the variable-priced cryptographic token 30 by reducing the quantity or supply of the variable-priced cryptographic token 30. Arbitrage for the pegged cryptographic token 28 and/or the variable-priced cryptographic token 30 in the exchange market 32, and coinage conversions between the pegged cryptographic token 28 and the variable-priced cryptographic token 30 by the issuing authority 26, maintains the value of the pegged cryptographic token 28 (perhaps at any value pegged to the reference cryptographic token 54).

Even more observations are provided. Exemplary embodiments may be implemented by any central bank. Exemplary embodiments may be implemented by a smart contract and/or a blockchain protocol (such as the blockchain 48). The pegged cryptographic token 28, the variable-priced cryptographic token 30, and/or the reference token 54 may be a real world currency, a cryptocurrency implemented by a blockchain, a token issued on a blockchain, or any other asset or commodity or security as long as the issuing authority has a realistic ability to issue the pegged cryptographic token 28, the variable-priced cryptographic token 30, and/or the reference token 54 without fail according to the creation operation 38 and the destruction operation 40 (as earlier explained). In the cryptocurrency market, the concept of a stable coin is a coin that has a constant value relative to one of the real-world currencies (such as the US Dollar, Euro, Yen, Yuan, etc.). If the reference token 54 is the U.S. Dollar, then the reference token 54 becomes a stable coin pegged to the U.S. Dollar.

Exemplary embodiments may include transactional sharding. If implemented on a blockchain at the protocol level, transactions involving the pegged cryptographic token 28 may be restricted to a single input account address to allow transactional sharding. If any cryptographic coinage transaction specifies a single or multiple input account addresses and a single or multiple output account addresses, then the cryptographic coinage transaction may be transactionally sharded (e.g., each transactional shard handles a particular set of addresses to validate a transaction input is valid). Once the input account address has been decremented as required as a result of the transaction, the output account addresses may be updated by messaging between shards. This approach requires the transaction processing mechanism of the blockchain to track and validate all shards, but a party interested in validating the balance of an address need only validate the updates of the address in the shard responsible for that address. The transaction would be referenced by all shards involved. Transactional sharding is further explained by U.S. application Ser. No. 16/116,991 filed Aug. 30, 2018 and entitled "Transactional Sharding of Blockchain Transactions," which is incorporated herein by reference in its entirety.

Yet more observations are provided. If the variable-priced cryptographic token 30 supports multiple pegged cryptographic tokens 28 (where, for example, one pegged cryptographic token 28 is pegged to the U.S. Dollar, another is pegged to BTC, another to the EUR, another to the price of Gold, etc.) then these synthetic pairs can be traded against each other on exchanges. Trading of the pegged cryptographic token 28 on any exchange (such as the market exchange 32) may have two paths for exchange to its the reference cryptographic token 54. A trading pair (such as the pegged cryptographic token 28 and the reference cryptographic token 54) would allow the reference cryptographic token 54 to be purchased for the pegged cryptographic token 28. Absent a trading pair, purchase of a liquid token (such as the BITCOIN®) could be used to sell for the reference cryptographic token 54 like the U.S. Dollar. The pegged cryptographic token 28 may be converted to the variable-priced cryptographic token 30 by the issuing authority 26, and the variable-priced cryptographic token 30 moved onto an exchange and traded for the reference cryptographic token 54 directly, or through a liquid token like BITCOIN® for conversion to the reference cryptographic token 54 like the U.S. Dollar. A blockchain implementation at the protocol level has many advantages for defining and trading the pegged cryptographic token 28 because of the ability of users to audit supplies of variable-priced cryptographic token 30 and pegged cryptographic token 28, audit historical Oracle data used and Pegging Token Operations.

Exemplary embodiments thus describe decentralized, two-cryptocoinage mechanism for stability in value. Exemplary embodiments may be protocol enforced according to an algorithm, with little or no human intervention or judgment. Exemplary embodiments thus implement a monetary policy by a decentralized bank for stable cryptocurrency coinage.

Figure 7:
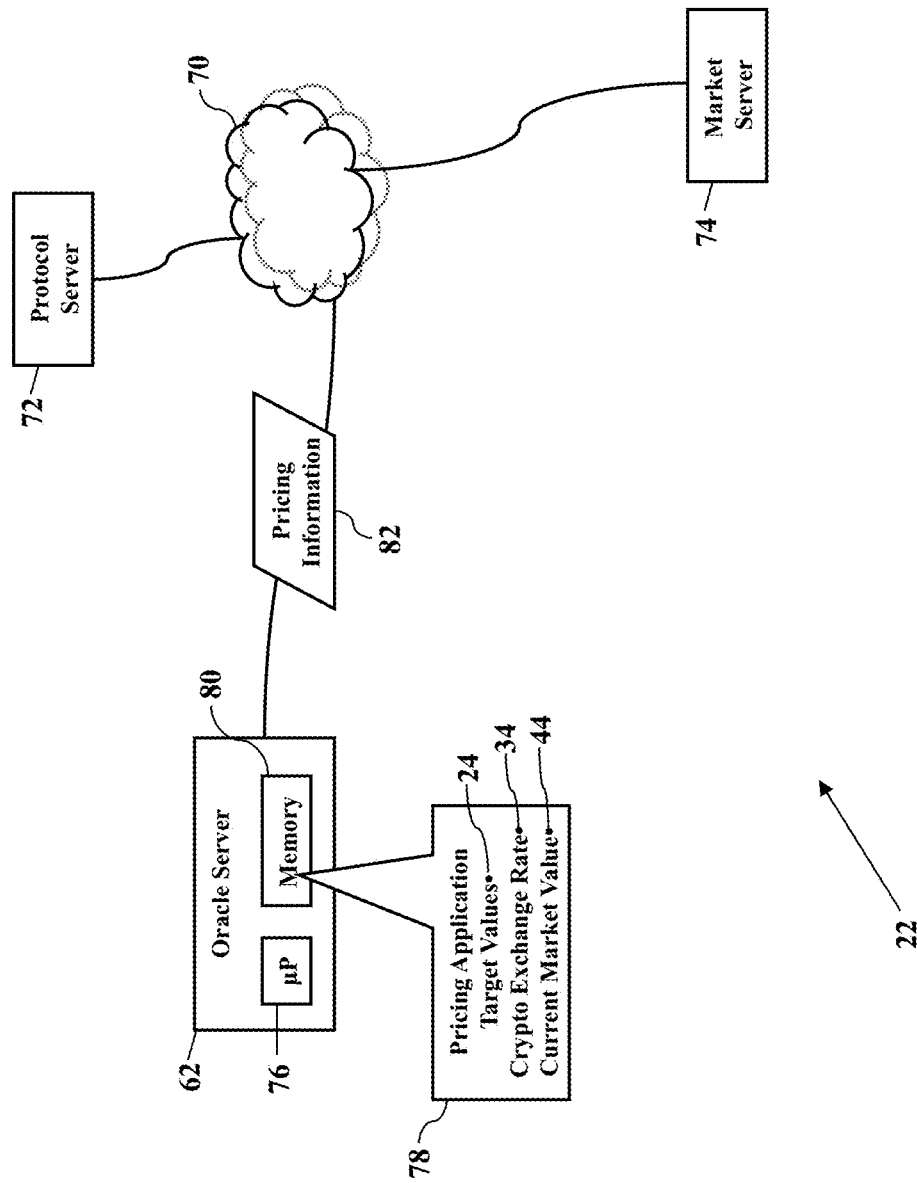

FIGS. 7-10 are more detailed illustrations of an operating environment, according to exemplary embodiments. FIG. 7 illustrates the oracle server 62 communicating via a communications network 70 with a protocol server 72 and with a market server 74 in the blockchain environment 22. The oracle server 62 has a processor 76 (e.g., "µP"), application specific integrated circuit (ASIC), or other component that executes a pricing application 78 stored in a local, solid-state memory device 80. The oracle server 62 has a network interface (not shown for simplicity) to the communications network 70, thus allowing two-way, bidirectional communication. The pricing application 78 includes instructions, code, and/or programs that cause the oracle server 62 to perform operations, such as sending pricing information 82 to the protocol server 72 and/or to the market server 74. The pricing information 82 may include the current market values 44 and the target values 24 of the pegged cryptographic token 28 and the variable-priced cryptographic token 30. The pricing information 82 may include the cryptographic exchange rate 34 between the pegged cryptographic token 28 and the variable-priced cryptographic token 30. The oracle server 62 may feed the pricing information 82 on a periodic or random timing basis. However, the protocol server 72 and/or the market server 74 may send queries via the communications network 70 to the network or IP address associated with the oracle server 62, and the queries specify a query parameter that requests the latest and/or historical pricing information 82. The oracle server 62 may then retrieve and send the pricing information 82 as a query response.

Figure 8:
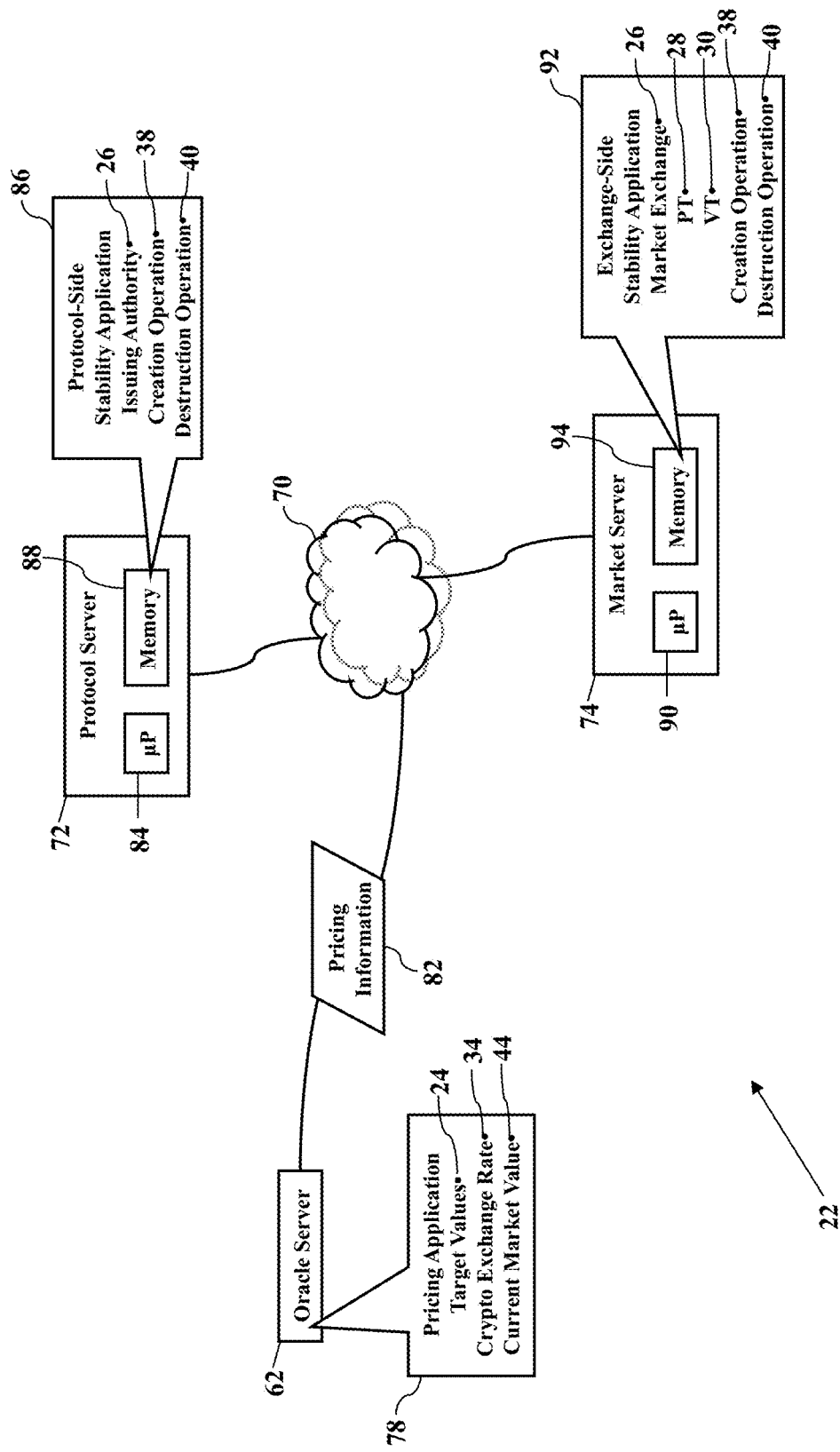

FIG. 8 illustrates the protocol server 72 and the market server 74. These servers 72 and 74 may cooperate to achieve algorithmic monetary policy. The protocol server 72 may be operated by, or on behalf of, the issuing authority 26. The protocol server 72 has a processor 84 (e.g., "µP"), application specific integrated circuit (ASIC), or other component that executes a protocol-side stability application 86 stored in a local, solid-state memory device 88. The protocol server 72 has a network interface (not shown for simplicity) to the communications network 70, thus allowing two-way, bidirectional communication. The protocol-side stability application 86 includes instructions, code, and/or programs that cause the protocol server 72 to perform operations, such as performing the creation operation 38 and/or the destruction operation 40.

The market server 74 is also processor-controlled. The market server 74 is operated by, or on behalf of, the market exchange 32. The market server 74 has a processor 90 (e.g., "µP"), application specific integrated circuit (ASIC), or other component that executes an exchange-side stability application 92 stored in a local, solid-state memory device 94. The market server 74 has a network interface (not shown for simplicity) to the communications network 70, thus allowing two-way, bidirectional communication. The exchange-side stability application 92 includes instructions, code, and/or programs that cause the market server 74 to perform operations, such as performing the creation operation 38 and/or the destruction operation 40. The protocol-side stability application 86 and the exchange-side stability application 92 may thus cooperate to maintain stability between the current market values 44 and the target values 24 of the pegged cryptographic token 28 ("PT") and/or the variable-priced cryptographic token 30 ("VT").

Figure 9:
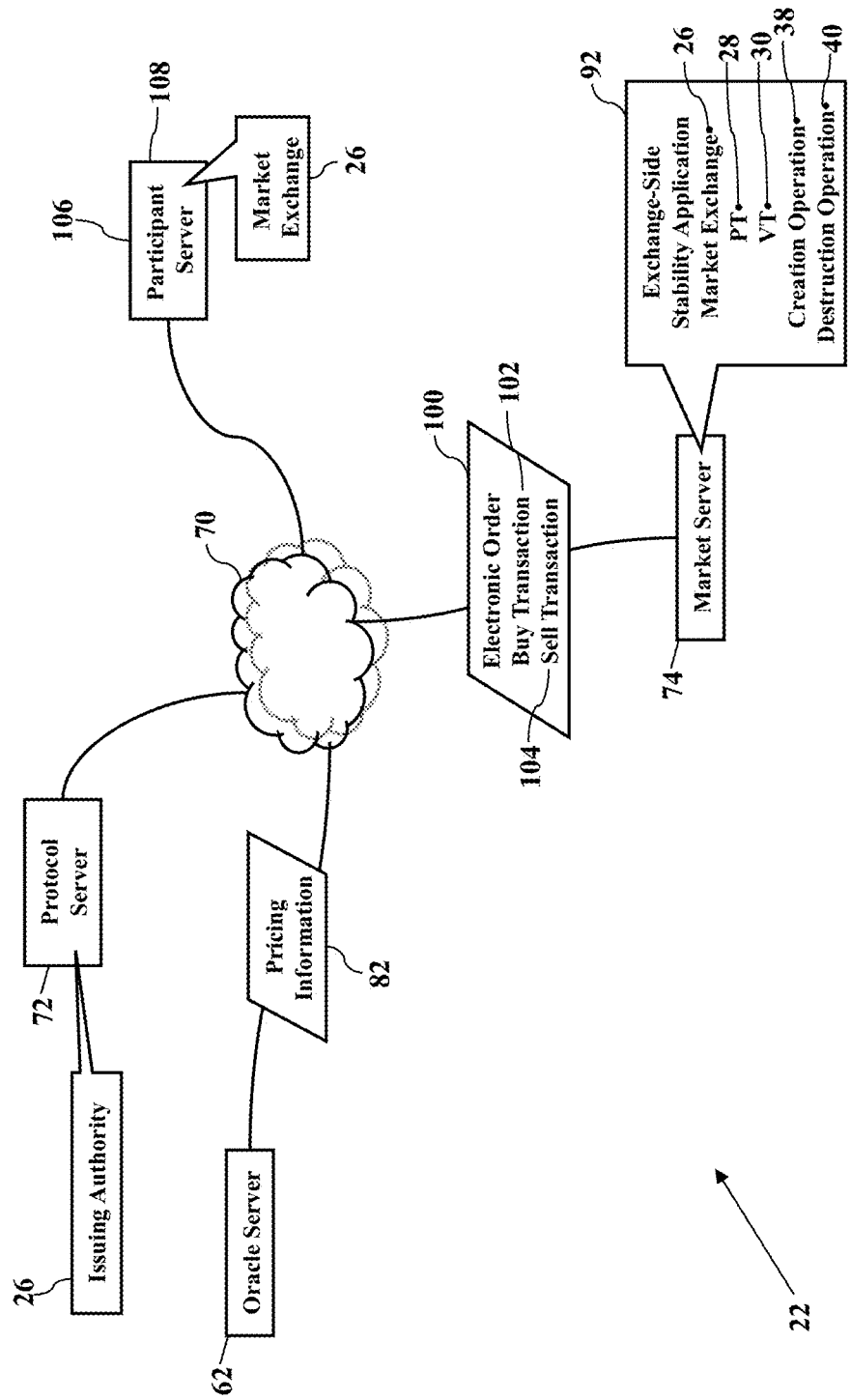

FIG. 9 illustrates additional details. The market server 74 receives an electronic order 100 that specifies any cryptographic transaction (such as a buy transaction 102 and/or a sell transaction 104). While the electronic order 100 may be sent from any entity, FIG. 9 illustrates a participant server 106 operated on behalf of a market participant 108. That is, the market participant 108 is a member of the market exchange 32, and the participant server 106 is registered and/or authorized to submit the electronic order 100 specifying a buy or sell of a quantity or number of the pegged cryptographic token 28 and/or the variable-priced cryptographic token 30. The market server 74 obtains, reads, or retrieves the pricing information 82 and processes and/or executes the electronic order 100. That is, the market server 74 processes and/or executes the creation operation 38 and/or the destruction operation 40 according to the cryptographic exchange rate 34.

Cryptographic conversion may occur. For example, the participant server 106 may request that the market exchange 32 and/or the issuing authority 26 covert a certain number of the variable-priced cryptographic token(s) 30 to the pegged cryptographic token(s) 28 at the current cryptographic exchange rate 34. As another example, the participant server 106 may request that the market exchange 32 and/or the issuing authority 26 convert a requested number of the pegged cryptographic token(s) 28 into the variable-priced cryptographic token(s) 30 at the current cryptographic exchange rate 34. The market exchange 32 and/or the issuing authority 26 may thus create or destroy the variable-priced cryptographic token(s) 30 and/or the pegged cryptographic token(s) 28, according to the creation operation 38 and/or the destruction operation 40.

Figure 10:
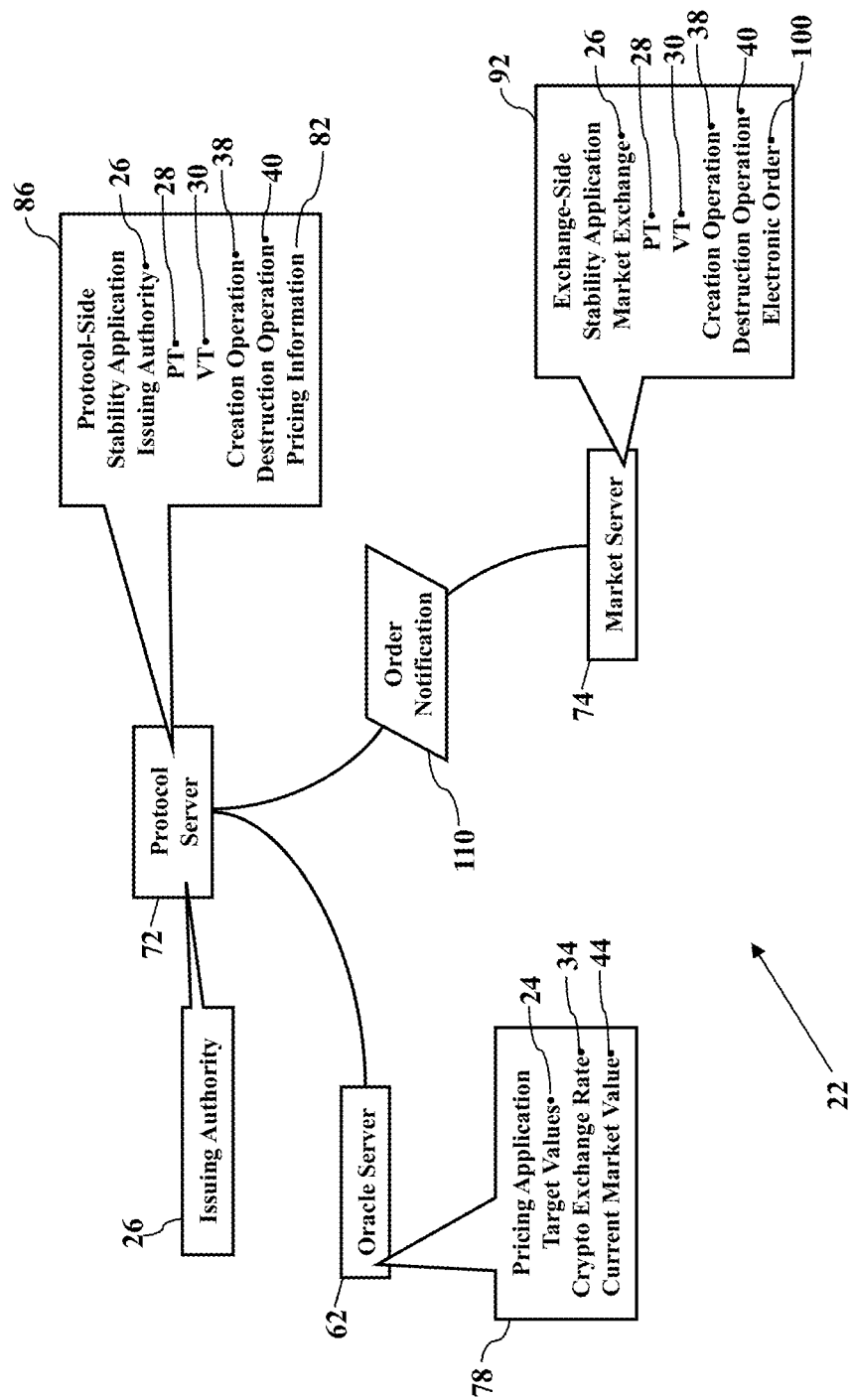

FIG. 10 illustrates near real time supply management. Whenever the market server 74 receives the electronic order 100 (specifying the buy transaction 102 and/or the sell transaction 104, as FIG. 9 illustrated), the market server 74 may notify the protocol server 72. The market server 74, for example, may send an order notification 110 to the network or Internet Protocol address associated with the protocol server 72. The order notification 110 may include or specify the quantity or number of the pegged cryptographic token 28 and/or the variable-priced cryptographic token 30 to be bought or sold. The order notification 110 may include or specify the pricing information 82 at which the pegged cryptographic token 28 and/or the variable-priced cryptographic token 30 is bought or sold. Additionally or alternatively, the protocol server 72 may query the oracle server 62 for the pricing information 82. Regardless, when the protocol server 72 receives or is informed of the order notification 110, the protocol server 72 may deposit or withdraw one or more pegged cryptographic token 28 to/from the market exchange to stabilize its current market value 44 to its target value 24. Likewise, the protocol server 72 may deposit or withdraw one or more variable-priced cryptographic tokens 30 to/from the market exchange to stabilize its current market value 44 to its target value 24.

Exemplary embodiments may be applied regardless of networking environment. Exemplary embodiments may be easily adapted to stationary or mobile devices having cellular, wireless local area networking capability (such as WI-FI®), near field, and/or BLUETOOTH® capability. Exemplary embodiments may be applied to mobile devices utilizing any portion of the electromagnetic spectrum and any signaling standard (such as the radio spectrum and IEEE 802 family of standards, GSM/CDMA/TDMA or any cellular standard, and/or the ISM band).

Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. When any device or server communicates via the communications network 70, the device or server may collect, send, and retrieve information. The information may be formatted or generated as packets of data according to a packet protocol (such as the Internet Protocol). The packets of data contain bits or bytes of data describing the contents, or payload, of a message. A header of each packet of data may contain routing information identifying an origination address and/or a destination address.

Figure 11:
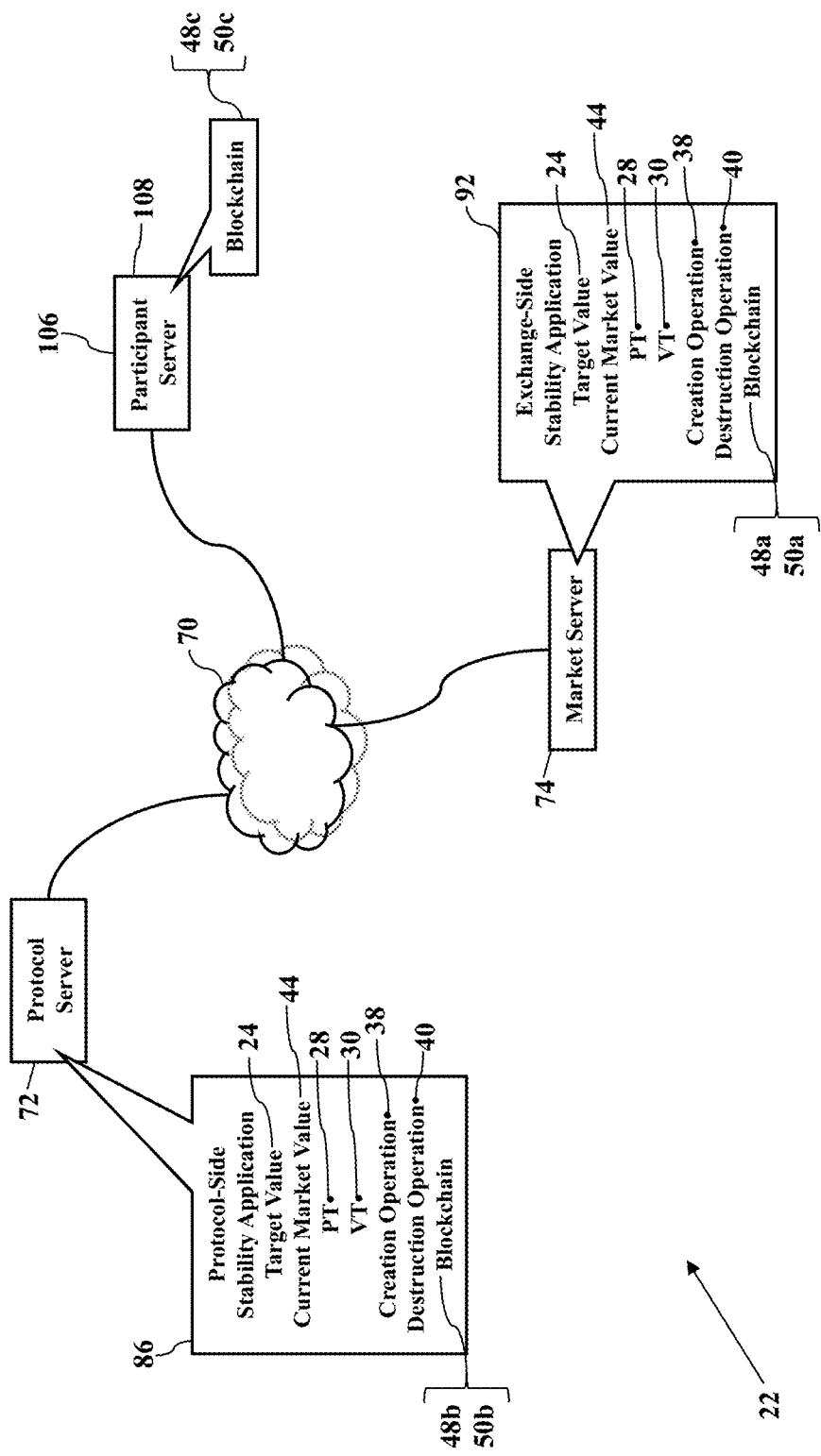
FIGS. 11-13 illustrate a below-target scenario, according to exemplary embodiments.
Figure 12:
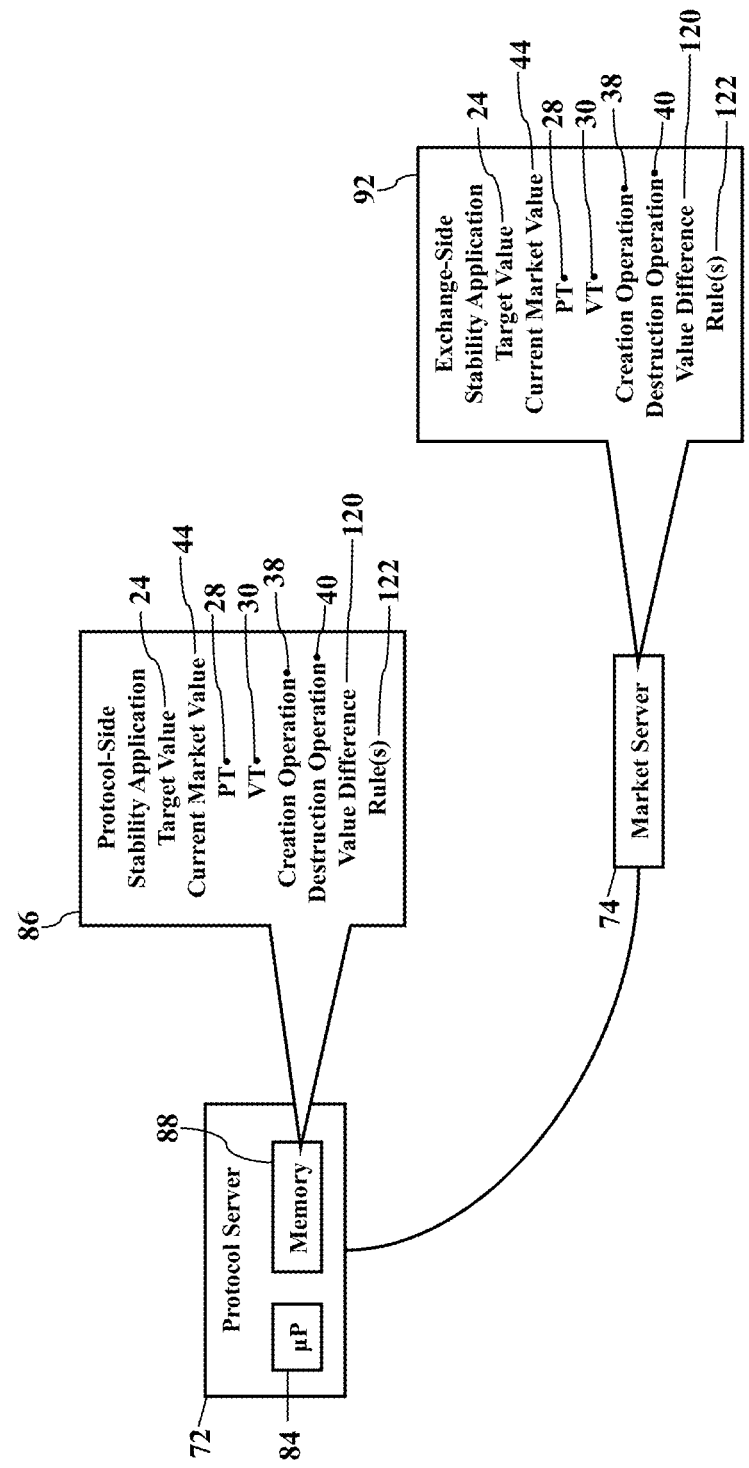
Figure 13:
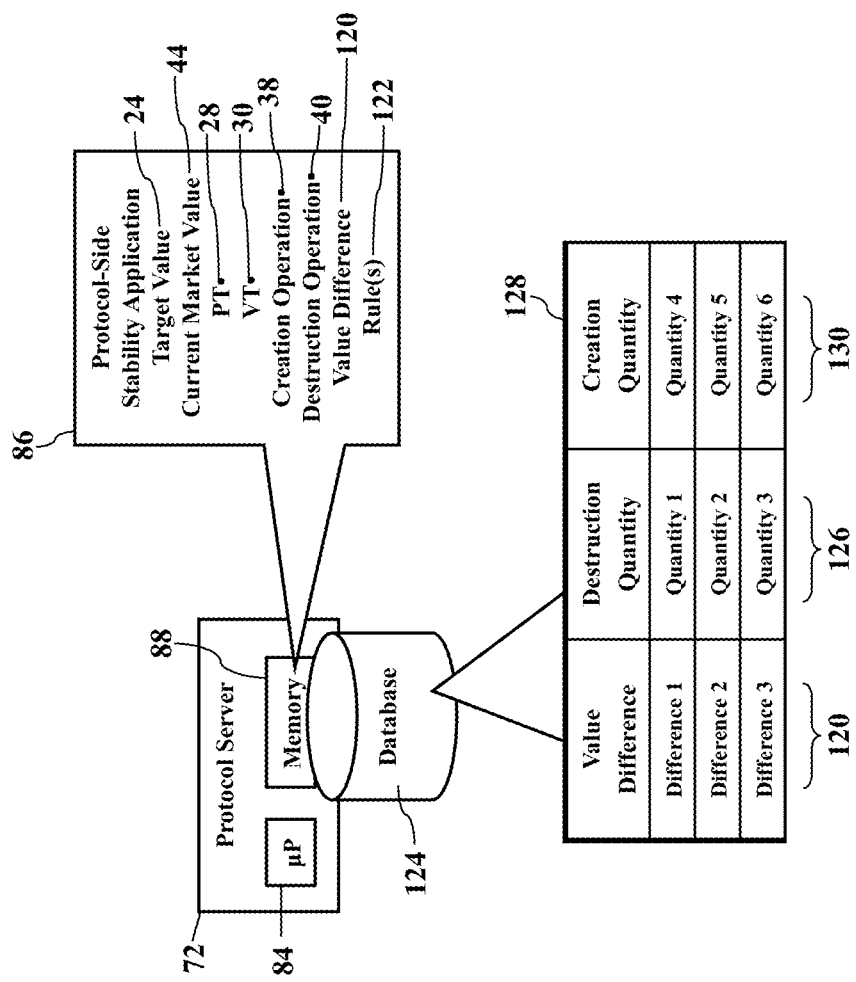

FIGS. 11-13 illustrate a below-target scenario, according to exemplary embodiments. Here the current market value 44 of the pegged cryptographic token 28 lags or trails its desired target value 24. Put another way, if the pegged cryptographic token 28 is trading low, then the demand 46 for the pegged cryptographic token 28 is falling and low and devalued relative to the variable-priced cryptographic token 30. The digital or smart contract 50a-c, whether processed by the market server 74, the protocol server 72, and/or the participant server 106, determines the buy opportunity in the pegged cryptographic token 28. Conversely, any smart contracts 50a-c executed on behalf of holders of the variable-priced cryptographic token 30 see the sell opportunity to reap a profit. The smart contracts 50 may thus organize or arrange to sell or exchange a quantity of the variable-priced cryptographic tokens 30 for an equivalent quantity of the pegged cryptographic tokens 28 (according to the cryptographic exchange rate 34), thus realizing the profit. The protocol server 72, perhaps acting in concert with the market server 74, may jointly operate as a powerful stabilizing force for the pegged cryptographic token 28.

Stabilization may occur. Because a profit opportunity exists, the smart contract 50 (perhaps executed by the blockchain 48) sells or exchanges the variable-priced cryptographic tokens 30 for an equivalent quantity or number of the pegged cryptographic tokens 28 (according to the cryptographic exchange rate 34), thus realizing the profit. As the sales/exchanges are processed, a total population, quantity, or pool of the variable-priced cryptographic tokens 30 in the market exchange 32 is reduced (perhaps due to the destruction operation 40) and the total population, quantity, or pool of the pegged cryptographic tokens 28 (e.g., a total number in usage or issuance) increases in the market exchange 32 (perhaps due to the creation operation 38). As the coinage exchanges proceed, the issuing authority 26 and/or the market exchange 32 may monitor the circulation numbers or supplies of the variable-priced cryptographic tokens 30, the pegged cryptographic tokens 28, their current market values 44, and the target value 24. If too many variable-priced cryptographic tokens 30 are sold or exchanged and destroyed, there may be a greater number of the pegged cryptographic tokens 28 than desired (due to the creation operation 38 and/or the destruction operation 40) and the oversupply condition may exist, perhaps causing values to fall. Simultaneously, or nearly simultaneously, the issuing authority 26 and/or the market exchange 32 may cooperate to reduce, or withdraw, the pegged cryptographic tokens 28 from the market exchange 32. The issuing authority 26, in other words, performs the destruction operation 40 to withdraw and destroy a desired quantity of the pegged cryptographic tokens 28 from the market exchange 32 to stabilize its current market value 44 to the target value 24. At nearly the same time, the issuing authority 26 performs the creation operation 38 to create a desired quantity of the variable-priced cryptographic tokens 30 and injects, or deposits, the newly-created variable-priced cryptographic tokens 30 into the market exchange 32, thus replenishing its population supply. These trades/exchanges may happen without delays imposed by deposits and withdraws as long as balances are setup ahead of time by the trader. Trades on the market exchange 32 and with the issuing authority 26 may be executed in parallel. Once the trades are executed and recorded (perhaps to the blockchain 48), the issuing authority 26 deposits or replenishes the population supply or balance of the variable-priced cryptographic tokens 30 into the market exchange 32 to set the market exchange 32 up for the next arbitrage opportunity.

Exemplary embodiments thus stabilize the pegged cryptographic token 28. Because the exchange of the pegged cryptographic token 28 for the variable-priced cryptographic token 30 could vary greatly over time, the issuing authority 26 ensures enough variable-priced cryptographic tokens 30 are injected/provided for any transaction. These variable-priced cryptographic tokens 30 are created and the pegged cryptographic tokens 28 are destroyed. Moreover, the issuing authority 26 may also create any amount of the variable-priced cryptographic tokens 30 that are needed to maintain an equilibrium between the current market value 44 and the target value 24 of the pegged cryptographic token 28.

Exemplary embodiments use market forces. If the pegged cryptographic token 28 is trading low, then traders/holders in the market exchange 32 consider the pegged cryptographic token 28 to be devalued relative to the variable-priced cryptographic token 30. The market exchange 32 may have a pool of the pegged cryptographic tokens 28 and another pool of the variable-priced cryptographic tokens 30. The issuing authority 26 (e.g., a protocol or central authority off the market exchange 32) also has additional pools of the pegged cryptographic tokens 28 and the variable-priced cryptographic tokens 30. When the pegged cryptographic token 28 is devalued by the market exchange 32, the demand 46 is low and traders/holders will have a profit incentive to buy the pegged cryptographic token 28 at its low current market price 44, thus converting the pegged cryptographic token 28 to its equivalent number of variable-priced cryptographic tokens 30 (according to the cryptographic exchange rate 34). Because the issuing authority 26 may monitor the total number of the variable-priced cryptographic tokens 30, the issuing authority 26 may also, nearly simultaneously, buy an excess number of the variable-priced cryptographic tokens 30 to maintain a consistent supply or pool of the variable-priced cryptographic tokens 30. Recall that a buy order destroys the variable-priced cryptographic tokens 30 and creates or gains more pegged cryptographic tokens 28. Simply put, anytime a trader/holder and/or the issuing authority 26 can make money, market forces will push the market price 44 up. An increasing market price 44 concomitantly increases the demand 46 of the pegged cryptographic token 28, thus bringing the current market price 44 toward the target value 24.

As FIG. 12 illustrates, exemplary embodiments may implement algorithmic decentralized monetary policy. Assume, again, that the current market value 44 of the pegged cryptographic token 28 lags or trails its desired target value 24. The protocol-side stability application 86 instructs the protocol server 72 to compare the current market value 44 to its desired target value 24. When the current market value 44 (or "CMV") is less than the target value 24 (or "TV"), a value difference 120 is negative (e.g., [CMV-TV] <0). Because the demand 46 for the pegged cryptographic token 28 is falling or reducing, there may be too many of the pegged cryptographic tokens 28 in the market exchange 32 and the oversupply condition may exist. The protocol-side stability application 86 may thus instruct the protocol server 72 to implement pre-programmed fiscal/monetary measures to stabilize the current market value 44 of the pegged cryptographic token 28. For example, the protocol-side stability application 86 may identify and execute a logical rule 122 that forces a withdrawal of the pegged cryptographic tokens 28 from the market exchange 32. The logical rule 122 may thus be an algorithmic code or instruction that is executed in response to the negative value difference 120 and/or the oversupply condition. The protocol server 72 and the market server 74 may thus cooperate to withdraw and destroy a desired quantity of the pegged cryptographic tokens 28 from the market exchange 32 to stimulate the demand 46 and to increase its current market value 44 toward the target value 24.

As FIG. 13 illustrates, exemplary embodiments may query an electronic database 124. The electronic database 124 is illustrated as being locally stored and maintained by the protocol server 72, but any of the database entries may be stored by the market server 74 and/or at any remote, accessible location via the communication network 70 (illustrated by FIG. 7). Regardless, the electronic database 124 relates, maps, or associates different values of the value difference 120 to their corresponding destruction quantity 126. While the electronic database 124 may have any logical and physical structure, a relational structure is thought perhaps easiest to understand. FIG. 13 thus illustrates the electronic database 124 as a table 128 that relates, maps, or associates each value difference 120 to its corresponding destruction quantity 126. So, once the value difference 120 is determined, exemplary embodiments may query the electronic database 124 for the value difference 120 and identify its corresponding destruction quantity 126. While FIG. 13 only illustrates a simple example of a few entries, in practice the electronic database 124 may have many entries that detail a rich depository of different rules 122 and their finely defined destruction quantities 126. Once the destruction quantity 126 is determined, exemplary embodiments perform the destruction operation 40 to remove or delete the destruction quantity 126 of the pegged cryptographic tokens 28 from the market exchange 32.

The creation operation 38 may also be performed. Recall that exemplary embodiments may also monitor the total population, quantity, or pool of the cryptographic tokens 28 and/or 30 in the market exchange 32. Once the value difference 120 is determined (as above explained), the same or a different rule 122 may also be implemented to create and to inject additional cryptographic tokens 28 and/or 30 into the market exchange 32. That is, the electronic database 124 may additionally or alternatively have entries that associate the different value differences 120 to different creation quantities 130. Exemplary embodiments may thus query the electronic database 124 for the value difference 120 and identify its corresponding creation quantity 130. Once the creation quantity 130 is determined, exemplary embodiments perform the creation operation 38 to deposit or inject newly-created cryptographic tokens 28 and/or 30 into the market exchange 32. Exemplary embodiments may implement these pre-programmed fiscal/monetary measures to stabilize the current market value 44 of the pegged cryptographic token 28.

Figure 14:
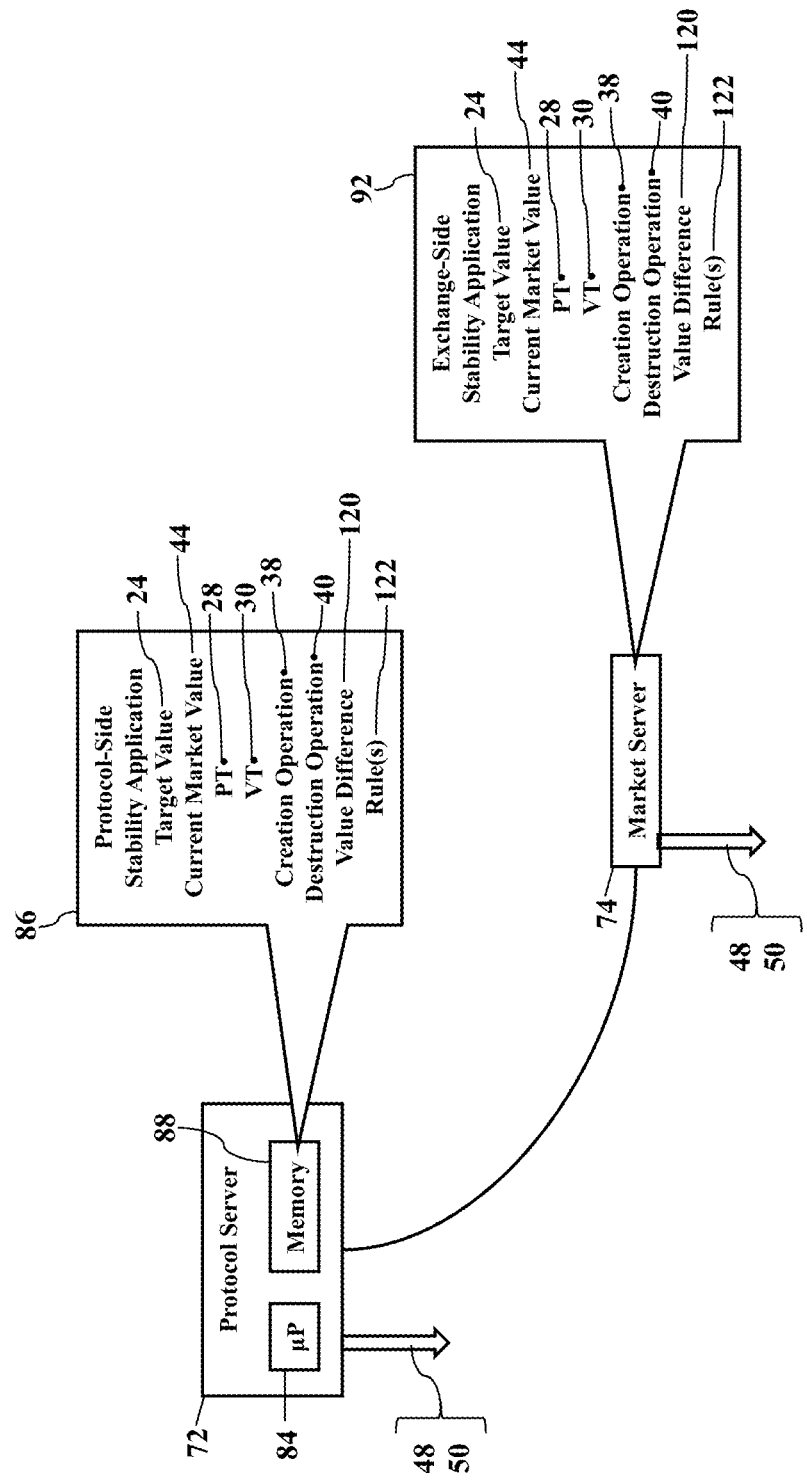
FIGS. 14-15 illustrate an above-target scenario, according to exemplary embodiments.
Figure 15:
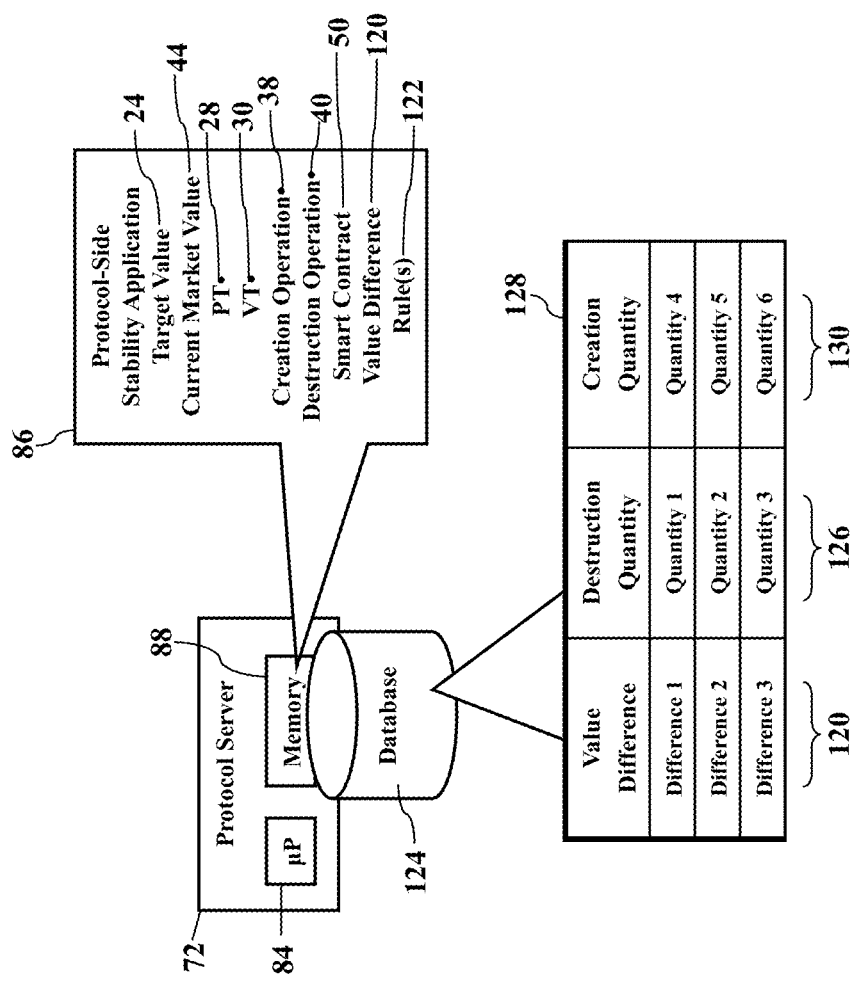

FIGS. 14-15 illustrate an above-target scenario, according to exemplary embodiments. Here the current market value 44 of the pegged cryptographic token 28 is greater or higher than its desired target value 24. Demand for the pegged cryptographic token 28 is increasing, so the pegged cryptographic token 28 may eventually be overvalued relative to other pegged cryptographic tokens 28 and/or the variable-priced cryptographic token 30 and/or to its target price or value 24. The smart contract 50 may thus determine the sell opportunity to reap a profit, while other smart contracts/traders/holders see the buy opportunity. The smart contract 50 may sell or exchange the pegged cryptographic tokens 28 for an equivalent number of the other pegged cryptographic tokens 28 and/or the variable-priced cryptographic tokens 30 (according to the cryptographic exchange rate 34), thus realizing the profit. As the sales/exchanges are processed, the demand 46 for the pegged cryptographic token 28 decreases, thus reducing its current market value 44 toward its target value 24. Moreover, the demand 46 for the other pegged cryptographic tokens 28 and/or the variable-priced cryptographic token 30 may also increase, thus increasing its current market value 44.

Population control may also be implemented. As the holders of the pegged cryptographic token 28 sell, the population pool or quantity of the pegged cryptographic tokens 28 in the market exchange 32 decreases. As the coinage trades proceed, the issuing authority 26 and/or the market exchange 32 may monitor the population supplies of the other pegged cryptographic tokens 28 and/or the variable-priced cryptographic tokens 30, their current market values 44, and the target values 24. If too many pegged cryptographic tokens 28 are sold or exchanged and destroyed, there may be a greater number of the other pegged cryptographic tokens 28 and/or the variable-priced cryptographic tokens 30 than desired (due to the creation operation 38 and/or the destruction operation 40) and the oversupply condition may exist. Simultaneously, or nearly simultaneously, the issuing authority 26 and/or the market exchange 32 may cooperate to reduce, or withdraw, the other pegged cryptographic tokens 28 and/or the variable-priced cryptographic tokens 30 from the market exchange 32. The issuing authority 26, in other words, performs the destruction operation 40 to destroy a desired quantity of the other pegged cryptographic tokens 28 and/or the variable-priced cryptographic tokens 30 from the market exchange 32 to stabilize its current market value 44 to the target value 24. At nearly the same time, the issuing authority 26 performs the creation operation 38 to create a desired quantity of the pegged cryptographic tokens 28 and injects, or deposits, the newly-created pegged cryptographic tokens 28 into the market exchange 32, thus replenishing its population supply. These trades may then be recorded to the blockchain 48. Market forces again prevail. If the value of the pegged cryptographic token 28 is high compared to its target value 24 and/or the variable-priced cryptographic token 30, then the pegged cryptographic token 28 may be sold on the market exchange 32 for the variable-priced cryptographic token 30. This sell operation results in a greater amount of the variable-priced cryptographic tokens 30 than the pegged cryptographic token 28 should allow. At the same time, a lesser amount of the variable-priced cryptographic tokens 30 can be exchanged for the same pegged cryptographic tokens 28 by the issuing authority 26, thus replenishing the supply of the pegged cryptographic tokens 28 in the market exchange 32.

As FIG. 15 illustrates, more algorithmic currency control may be implemented. Because the current market value 44 of the pegged cryptographic token 28 exceeds its desired target value 24, the demand 46 for the pegged cryptographic token 28 is increasing and may become overvalued. The protocol-side stability application 86 instructs the protocol server 72 to compare the current market value 44 to its desired target value 24. The value difference 120 is positive (e.g., [CMV-TV]>0) and the oversupply condition may exist. Exemplary embodiments may implement additional pre-programmed fiscal/monetary measures, such as executing one of the logical rules 122 to force a reduction or withdrawal of the other pegged cryptographic tokens 28 and/or the variable-priced cryptographic token(s) 30 from the market exchange 32. Once the value difference 120 is determined, exemplary embodiments may query the electronic database 124 for the value difference 120 and identify its corresponding destruction quantity 126 and/or its corresponding creation quantity 130. The protocol server 72 and the market server 74 may thus cooperate to withdraw and destroy the destruction quantity 126 of the other pegged cryptographic tokens 28 and/or the variable-priced cryptographic tokens 30. Additionally or alternative, exemplary embodiments may perform the creation operation 38 and deposit the creation quantity 130 of newly-created pegged cryptographic token 28 into the market exchange 32. Exemplary embodiments may implement these pre-programmed fiscal/monetary measures to stabilize the current market values 44 of the pegged cryptographic token 28 and/or the variable-priced cryptographic token 30.

As FIGS. 11-15 illustrate, the issuing authority 26 may thus be one of the market participants 106. However, the issuing authority 26 may participate for opposite market effects. When the issuing authority 26 trades between the pegged cryptographic tokens 28 and the variable-priced cryptographic tokens 30, the market effect of these trades is opposite to the trades on the market exchange 32. Suppose, for example, that a large number of the variable-priced cryptographic tokens 30 were sold for between the pegged cryptographic tokens 28 on the market exchange 32. The price of the variable-priced cryptographic token 30 necessarily goes down as the trade(s) consumes the order book for the variable-priced cryptographic token 30. On the other hand, a large number of the variable-priced cryptographic tokens 30 exchanged for the pegged cryptographic tokens 28 using the issuing authority 26 reduces the supply of the variable-priced cryptographic tokens 30 by that amount. Lowering the supply of the variable-priced cryptographic tokens 30 eventually increases the current market price 44 of the variable-priced cryptographic tokens 30. So, as the pegged cryptographic token 28 becomes popular as a stable value, the demand for the pegged cryptographic token 28 is likely to rise, but the only way to create a bigger supply of the pegged cryptographic token 28 is through the conversation of the variable-priced cryptographic token 30 to the pegged cryptographic token 28, which lowers the supply of the variable-priced cryptographic token 30. On the other hand, if the value of the variable-priced cryptographic token 30 is in question and falls in the market exchange 32, conversion to the pegged cryptographic token 28 becomes attractive. All of these operations (e.g., the creation operation 38 and the destruction operation 40) increase the value of the variable-priced cryptographic token 30. As the value of the variable-priced cryptographic token 30 goes up, market participants will purchase the variable-priced cryptographic token 30 and thus further increase its value. But demand may also trigger the conversion of the pegged cryptographic token 28 to the variable-priced cryptographic token 30, and that conversion may dampen the growth in value of the variable-priced cryptographic token 30 by increasing the supply.

Figure 16:
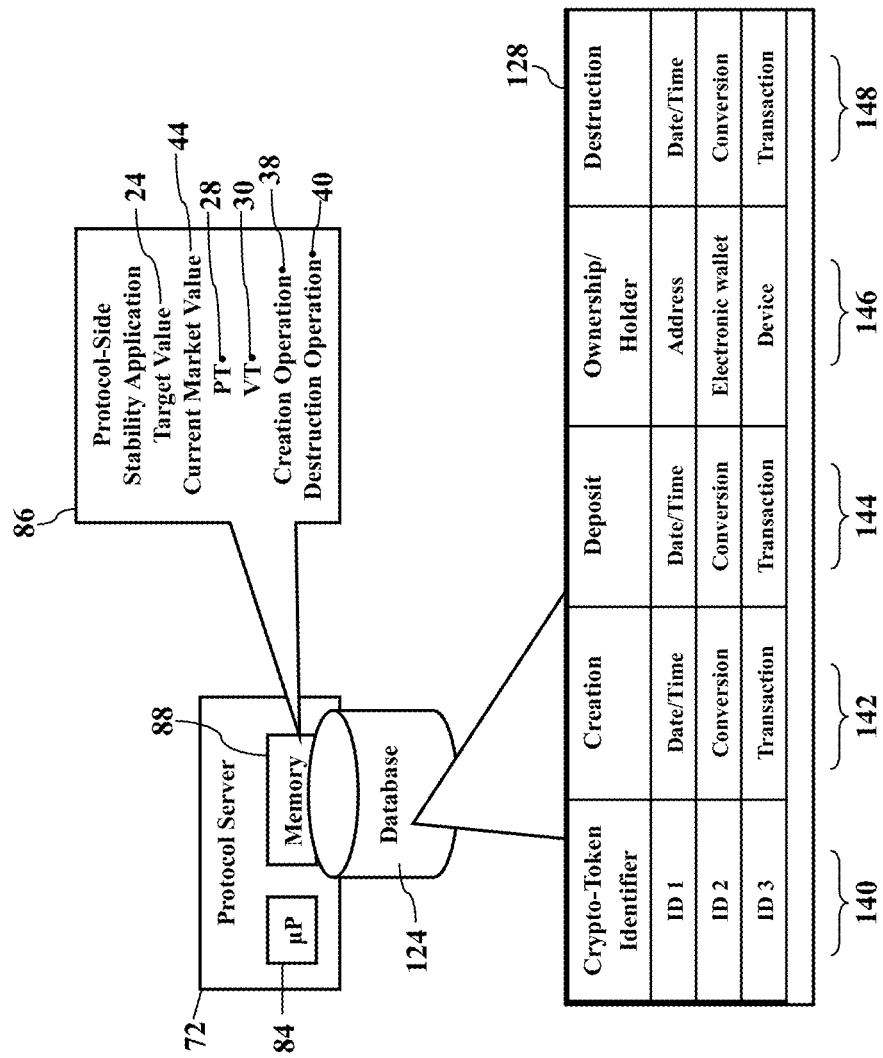
FIG. 16 illustrates indexing of cryptographic coinage, according to exemplary embodiments.

FIG. 16 illustrates indexing of cryptographic coinage, according to exemplary embodiments. When any cryptographic token 28 and 30 is created or destroyed (perhaps initially or via the creation operation 38 and/or the destruction operation 40, as above explained), here exemplary embodiments may then log the details. As a simple example, suppose the protocol server 72 logs each creation operation 38 and each destruction operation 40 in the electronic database 124. The electronic database 124 may thus store and maintain detailed transactional records for each pegged cryptographic token 28 and/or for each variable-priced cryptographic token 30. Suppose, for example, that each pegged cryptographic token 28 and each variable-priced cryptographic token 30 is uniquely identified with a unique token identifier 140. Moreover, the electronic database 124 has entries that relate, associate, or map each token identifier 140, its creation details 142, its deposit details 144 of entry or injection into the market exchange 32, and its ownership details 146 (such as buyer/seller account addresses, holder information, and/or electronic wallet details). Moreover, if the cryptographic token 28 or 30 was subject to the destruction operation 40, then the electronic database 124 may logs its corresponding destruction details 148 documenting its withdrawal from the market exchange 32. Although not shown, the entries may further relate each cryptographic token 28 or 30 to its corresponding pricing information 82 and the smart contract 50 and/or the market server 74 that ordered or requested the buy/sell/conversion. Exemplary embodiments may thus generate a central repository that indexes each cryptographic token 28 or 30 that is created and/or deposited into the market exchange 32. The entries may further relate each cryptographic token 28 or 30 that was destroyed after creation (according to the creation operation 38). The entries may thus fully document what tokens 28 or 30 were created, how and when and why, and also their destruction, if any.

The electronic database 124 may be queried for its entries. Because the electronic database 124 may store detailed creation and destruction records for each pegged cryptographic token 28 and each variable-priced cryptographic token 30, any client may send a query to the protocol server 72 to identify related entries. As an example, a query parameter may specify the unique token identifier 140 and request its corresponding entries (such as its date/time of creation and current ownership/holder details). A query response is sent back to the client, and the query response specifies any of the corresponding database entries.

Figure 17:
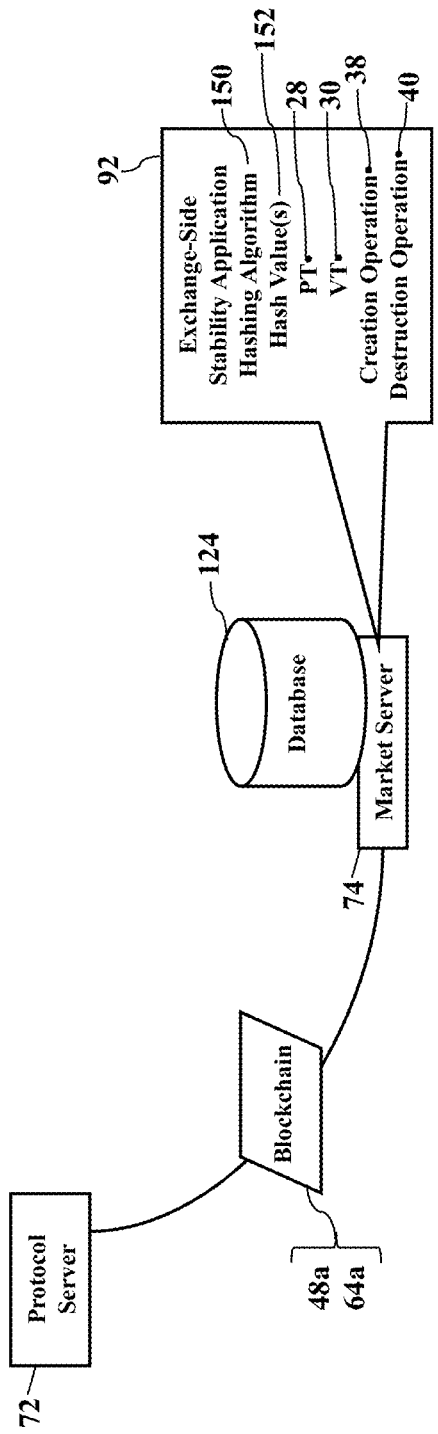
FIGS. 17-18 illustrate blockchain recordations, according to exemplary embodiments.
Figure 18:
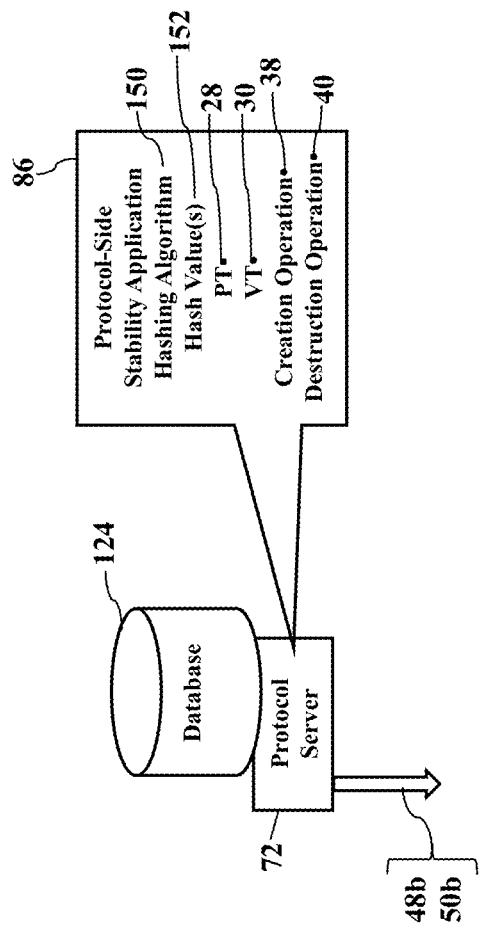

FIGS. 17-18 illustrate blockchain recordations, according to exemplary embodiments. Here, when any pegged cryptographic token 28 or any variable-priced cryptographic token 30 is created or destroyed, exemplary embodiments may record that creation operation 38 and/or destruction operation 40 to the blockchain 48. The market server 74, for example, may generate the block 64a of data within the blockchain 48a. The exchange-side stability application 92 may even call, invoke, and/or apply an electronic representation of a hashing algorithm 150 to any of the entries in the electronic database 124 and/or to the block 64 of data within the blockchain 48a. The hashing algorithm 150 thus generates one or more hash values 152, which may be incorporated into the blockchain 48a. The exchange-side stability application 92 may then instruct the market server 74 to send the blockchain 48a to any destination, such as the network address (e.g., Internet protocol address) associated with the protocol server 72.

FIG. 18 also illustrates blockchain records. When any pegged cryptographic token 28 or any variable-priced cryptographic token 30 is created or destroyed, that creation operation 38 and/or destruction operation 40 may be recorded to the blockchain 48b. The protocol server 72, for example, may generate the block 64b of data within the blockchain 48b. The protocol-side stability application 86 may also call, invoke, and/or apply an electronic representation of the hashing algorithm 150 to any of the entries in the electronic database 124 and/or to the block 64b of data within the blockchain 48b. The hashing algorithm 150 thus generates one or more hash values 152, which are incorporated into the blockchain 48b.

Figure 19:
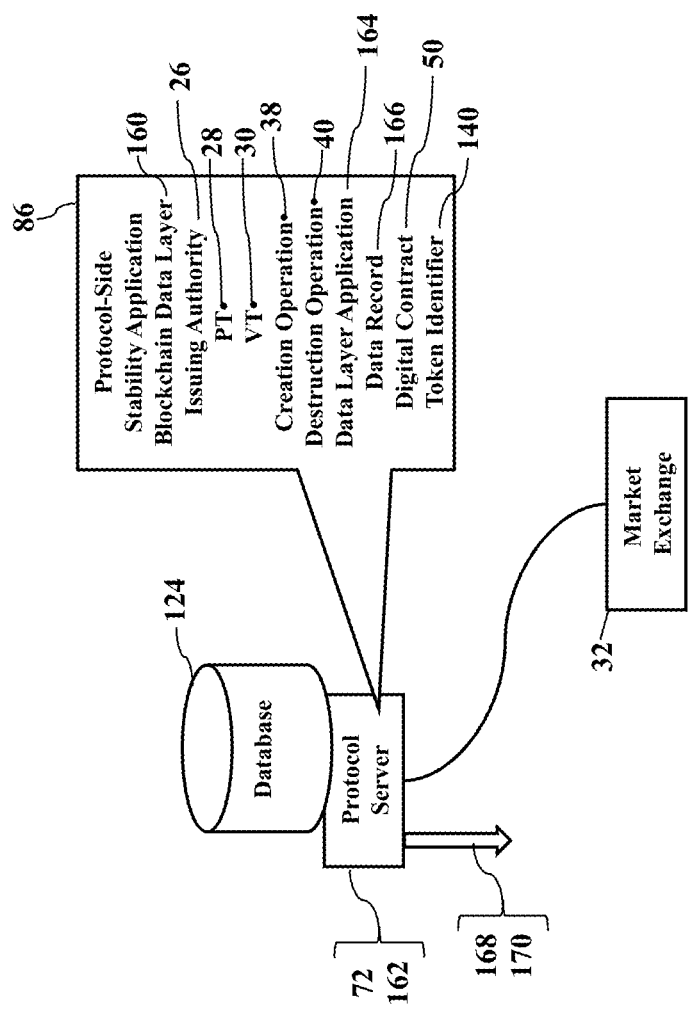
FIGS. 19-20 illustrate a blockchain data layer, according to exemplary embodiments.
Figure 20:
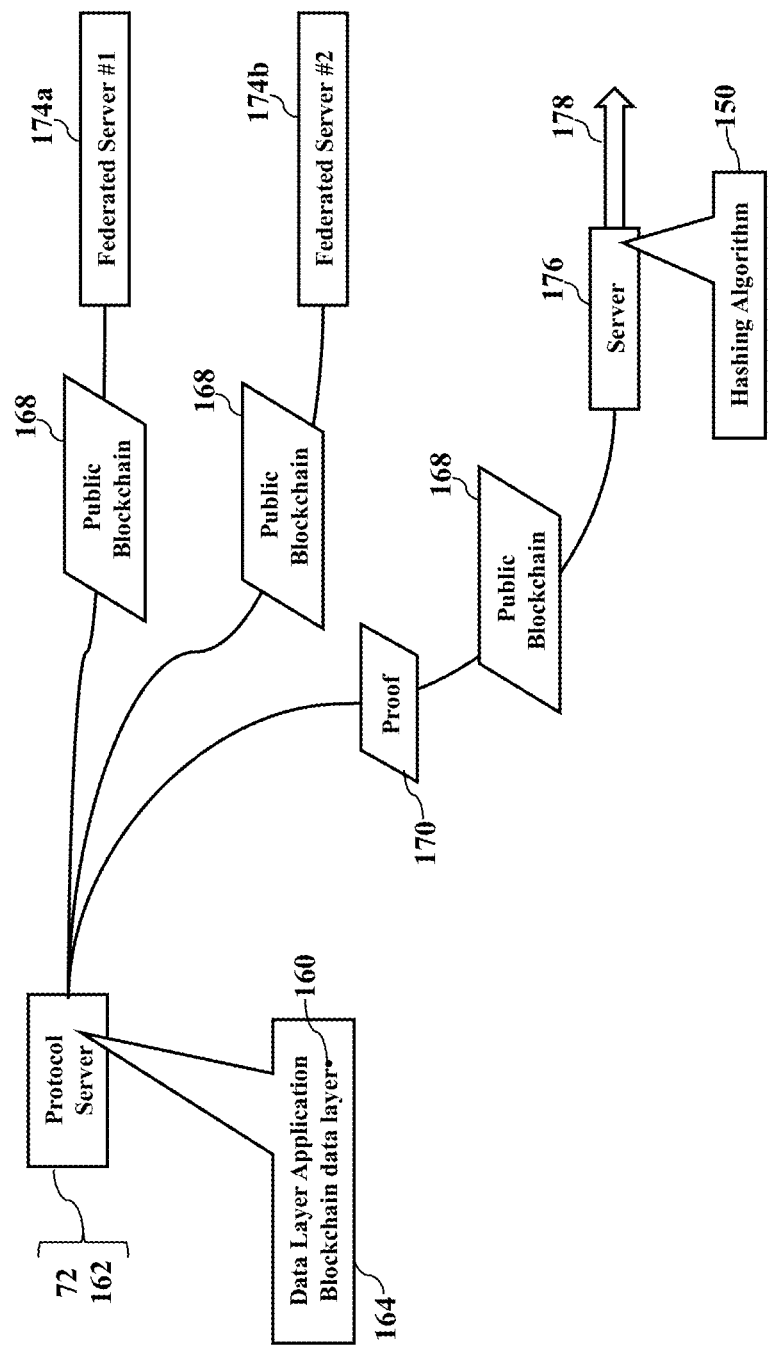

FIGS. 19-20 illustrate a blockchain data layer 160, according to exemplary embodiments. Here the protocol server 72 may generate a blockchain data layer 160 that also documents the creation operation 38 and the destruction operation 40 involving or associated with any pegged cryptographic token 28 or any variable-priced cryptographic token 30. Recall that the protocol server 72 is operated by or on behalf of the issuing authority 26 that manages the population supply of the pegged cryptographic tokens 28 and the variable-priced cryptographic tokens 30. When any token 28 or 30 is created or destroyed, whether within the market exchange 32 or by the issuing authority 26, the corresponding creation operation 38 and the destruction operation 40 may be documented within the blockchain data layer 160. The protocol server 72 may thus be termed or called a data layer server 162 that generates the blockchain data layer 160. The protocol-side stability application 86 may thus call, invoke, or apply a data layer application 164 as a software module or subroutine that generates data records 166 in the blockchain data layer 160. Moreover, the blockchain data layer 160 may also add another layer of cryptographic hashing to generate a public blockchain 168. The blockchain data layer 160 acts as a validation service that validates the smart, digital contract 50 was executed according to the creation operation 38 and the destruction operation 40. Moreover, the blockchain data layer 160 may generate a cryptographic proof 170. The public blockchain 168 thus publishes the cryptographic proof 170 as a public ledger that establishes chains of blocks of immutable evidence.

The blockchain data layer 160 may be searched. Because blockchain data layer 160 may track and/or prove any creation operation 38 and/or any destruction operation 40, exemplary embodiments may search the blockchain data layer 160 for any query parameter. For example, the protocol server 72 may receive queries from clients requesting the data records 166 within the blockchain data layer 160 that match a query parameter. As a simple example, suppose a query specifies the token identifier 140 as a query parameter. Recall that the token identifier 140 uniquely identifies its corresponding pegged cryptographic token 28 or variable-priced cryptographic token 30. The protocol server 72 may then act as a query handler, determine a matching data record 166 or other entry in the blockchain data layer 160, and identify/retrieve its corresponding contents or data or entries. As another example, suppose a query specifies some parameter or party associated with the smart contract 50 (such as a contract identifier that uniquely represents the smart contract 50). The protocol server 72 may then identify/retrieve any data records 166 associated with the smart contract 50, such as the specific pegged cryptographic token(s) 28 and the variable-priced cryptographic token(s) 30 that were created/destroyed according to the smart contract 50.

FIG. 20 illustrates additional publication mechanisms. Once the blockchain data layer 160 is generated, the blockchain data layer 160 may be published in a decentralized manner to any destination. The protocol server 72 (e.g., the data layer server 162), for example, may generate and distribute the public blockchain 168 (via the communications network 70 illustrated in FIGS. 7-8) to one or more federated servers 174. While there may be many federated servers 174, for simplicity FIG. 20 only illustrates two (2) federated servers 174a and 174b. The federated server 174a and 174b provide a service and, in return, they are compensated according to a compensation or services agreement or scheme.

Exemplary embodiments include still more publication mechanisms. For example, the cryptographic proof 170 and/or the public blockchain 168 may be sent (via the communications network 70 illustrated in FIGS. 7-8) to still another server 176. The server 176 may then add another, third layer of cryptographic hashing (perhaps using the hashing algorithm 150) and generate another or second public blockchain 178. While the server 176 and/or the public blockchain 178 may be operated by, or generated for, any entity, exemplary embodiments may integrate another cryptographic coin mechanism. That is, the server 176 and/or the public blockchain 178 may be associated with BITCOIN®, ETHEREUM®, RIPPLE®, or other cryptographic coin mechanism. The cryptographic proof 170 and/or the public blockchains 168 and 178 may be publicly distributed and/or documented as evidentiary validation. The cryptographic proof 170 and/or the public blockchains 168 and 178 may thus be historically and publicly anchored for public inspection and review.

Figure 21:
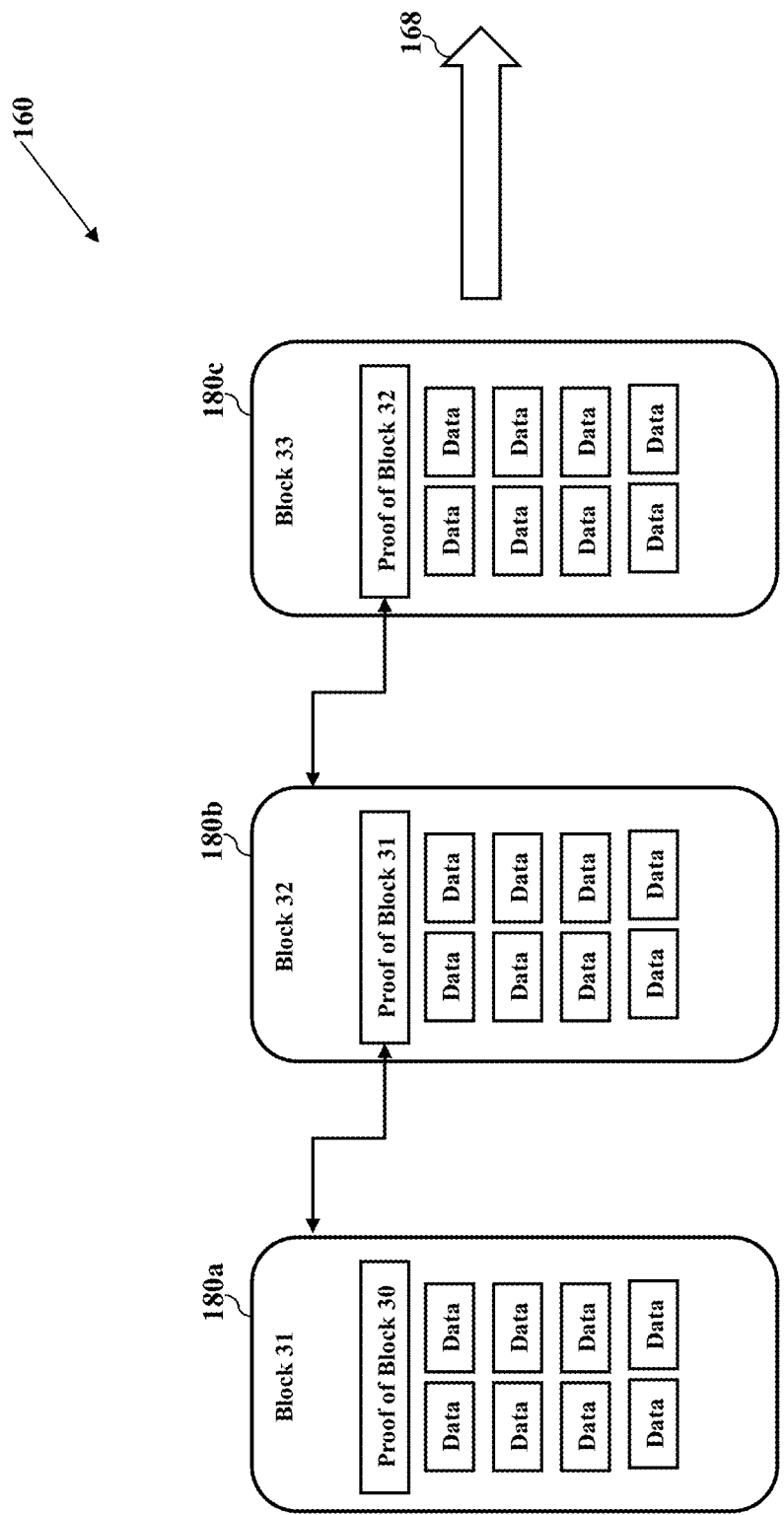
FIGS. 21-25 further illustrate the blockchain data layer, according to exemplary embodiments

FIGS. 21-25 further illustrate the blockchain data layer 160, according to exemplary embodiments. The blockchain data layer 160 chains hashed directory blocks 180 of data into the public blockchain 168. For example, the blockchain data layer 160 accepts input data (such as any of the data logged in the electronic database 124, and/or the blockchain 48a sent from the market server 74 illustrated in FIG. 17) within a window of time. While the window of time may be configurable from fractions of seconds to hours, exemplary embodiments use ten (10) minute intervals. FIG. 21 illustrates a simple example of only three (3) directory blocks 180a-c of data, but in practice there may be millions or billions of different blocks. Each directory block 180 of data is linked to the preceding blocks in front and the following or trailing blocks behind. The links are created by hashing all the data within a single directory block 180 and then publishing that hash value within the next directory block.

Figure 22:
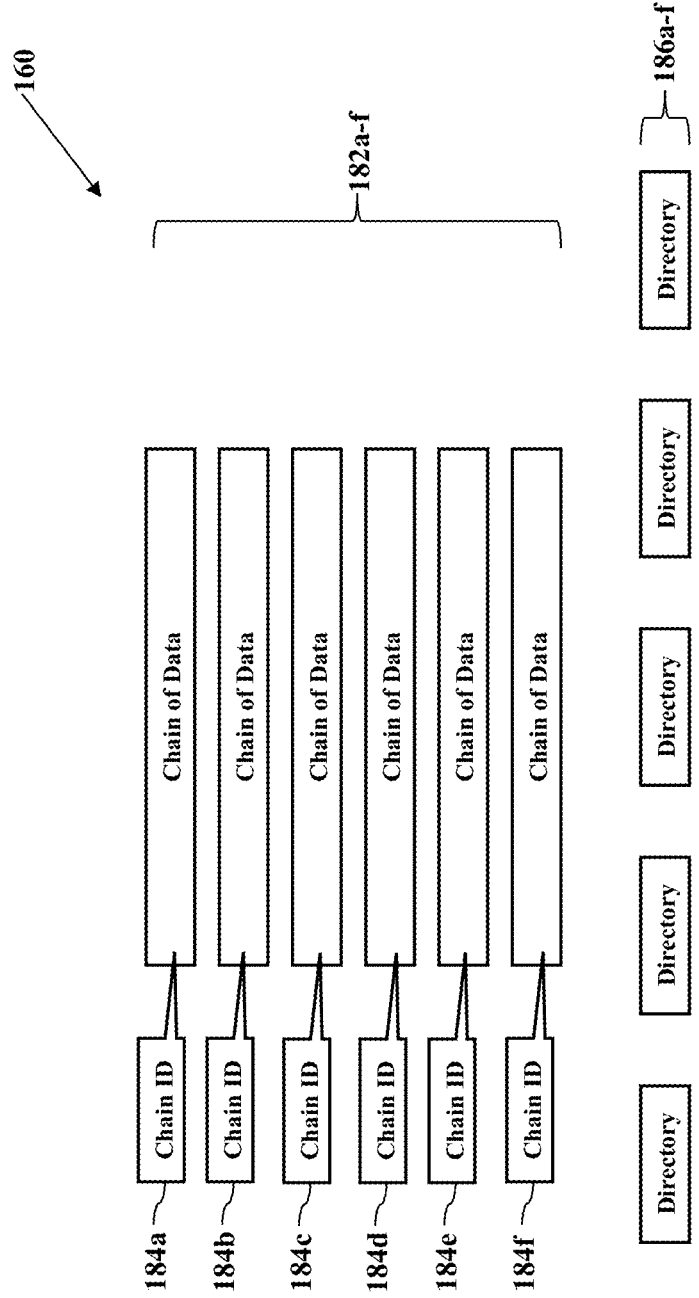

As FIG. 22 illustrates, published data may be organized within chains 182. Each chain 182 is created with an entry that associates a corresponding chain identifier 184. As a simple example, suppose there are several market participants 108 (such as different participant servers 106, illustrated with reference to FIG. 9), and each participant server 106 has its own corresponding chain identifier 184a-d. The blockchain data layer 160 may thus track any buy/sell/conversion and any other data associated with each participant server 106 with its corresponding chain identifier 184a-d. As other examples, each pegged cryptographic token 28 and each variable-priced cryptographic token 30 may also have its corresponding token identifier 140 and its corresponding chain identifier 184. A unique chain 182 may thus be used to track the buy/sell/creation/destruction events for any token 28 and 30. New and old data in time may be associated with, linked to, identified by, and/or retrieved using the chain identifier 184a-d. Each chain identifier 184a-d thus functionally resembles a directory 186a-d (e.g., files and folders) for organized data entries.

Figure 23:
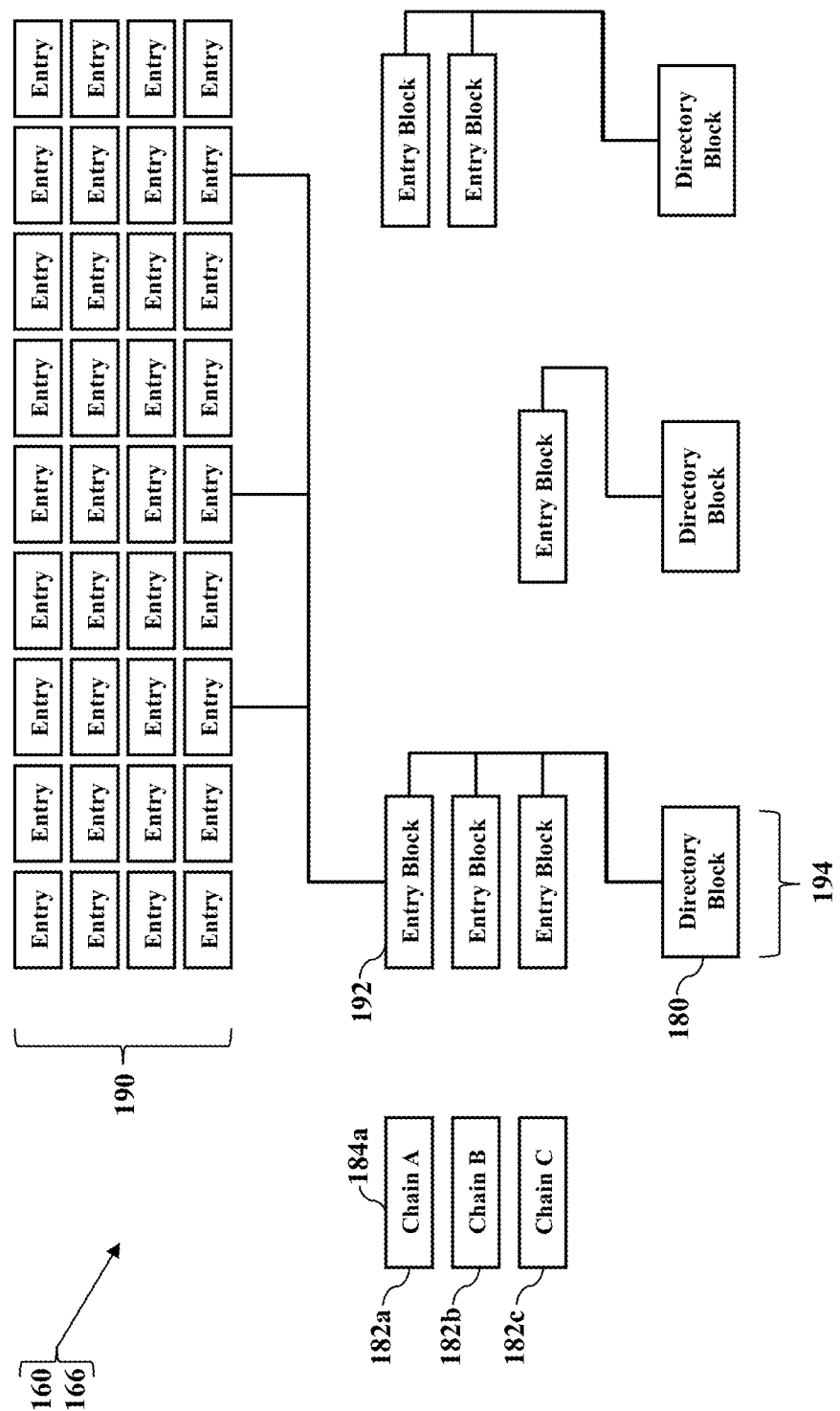

FIG. 23 illustrates the data records 166 in the blockchain data layer 160. As data is received as an input (such as the blockchain 48 and/or the order notification 110 illustrated in FIGS. 10-11), data is recorded within the blockchain data layer 160 as an entry 190. While the data may have any size, small chunks (such as 10 KB) may be pieced together to create larger file sizes. One or more of the entries 190 may be arranged into entry blocks 192 representing each chain 182 according to the corresponding chain identifier 184. New entries for each chain 182 are added to their respective entry block 192 (again perhaps according to the corresponding chain identifier 184). After the entries 190 have been made within the proper entry blocks 192, all the entry blocks 192 are then placed within in the directory block 180 generated within or occurring within a window 194 of time. While the window 194 of time may be chosen within any range from seconds to hours, exemplary embodiments may use ten (10) minute intervals. That is, all the entry blocks 192 generated every ten minutes are placed within in the directory block 180.

Figure 24:
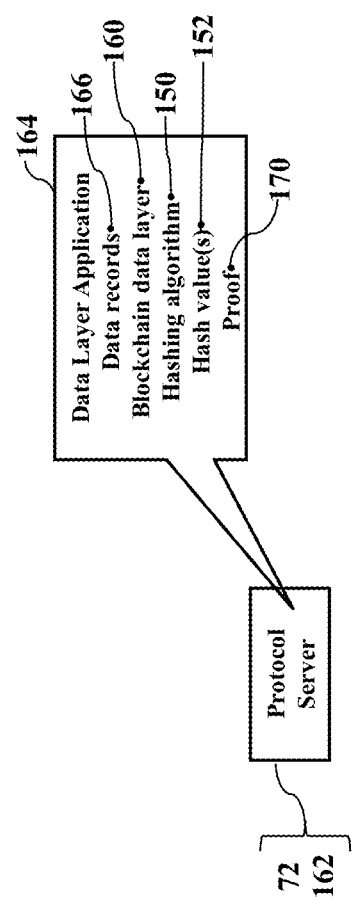

FIG. 24 illustrates cryptographic hashing. The protocol server 72 executes the data layer application 164 to generate the data records 166 in the blockchain data layer 160. The data layer application 164 may then instruct the data layer server 162 to execute the hashing algorithm 150 on the data records 166 (such as the directory block 180 illustrated in FIGS. 21-23). The hashing algorithm 150 thus generates one or more hash values 152 as a result, and the hash values 152 represent the hashed data records 166. As one example, the blockchain data layer 160 may apply a Merkle tree analysis to generate a Merkle root (representing a Merkle proof 170) representing each directory block 180. The blockchain data layer 160 may then publish the Merkle proof 170 (as this disclosure explains).

Figure 25:
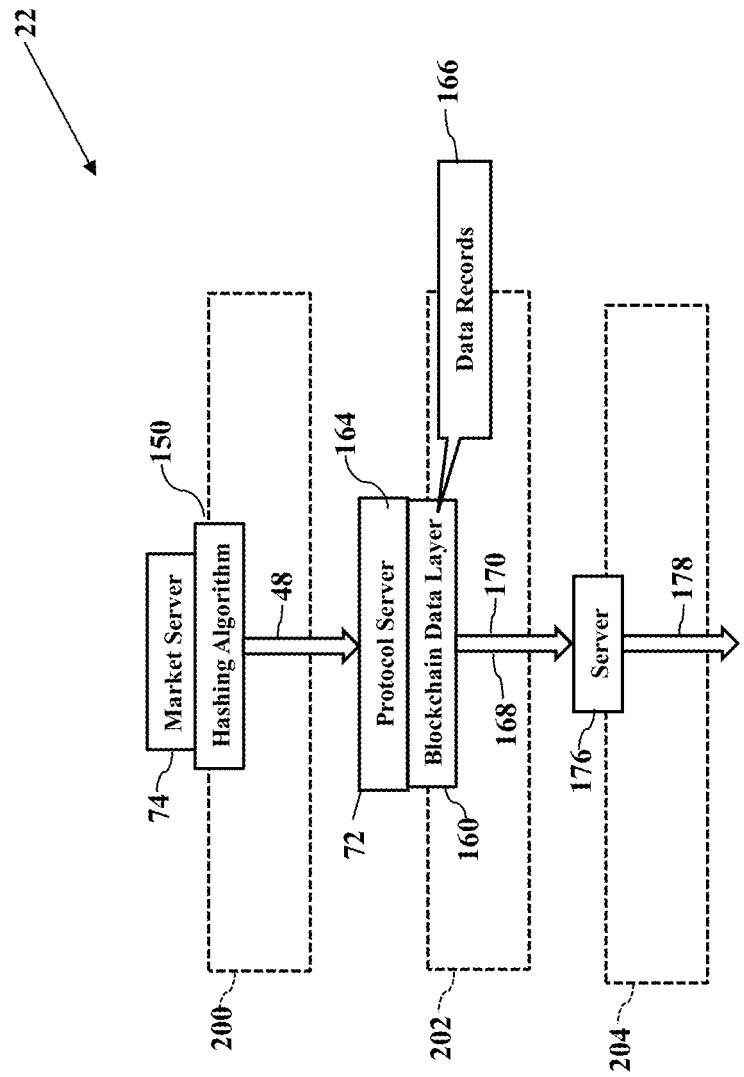

FIG. 25 illustrates hierarchical hashing. The market server 74, generating the blockchain 48, provides a first layer 200 of cryptographic hashing. The market server 74 may then send the blockchain 48 to the protocol server 72. The protocol server 72, executing the data layer application 164, generates the blockchain data layer 160. The data layer application 164 may optionally provide the second or intermediate layer 202 of cryptographic hashing to generate the cryptographic proof 170. The data layer application 164 may also publish any of the data records 166 as the public blockchain 168, and the cryptographic proof 170 may or may not also be published via the public blockchain 168. The public blockchain 168 and/or the cryptographic proof 170 may be optionally sent to a server 176 as an input to yet another public blockchain 178 (again, such as BITCOIN®, ETHEREUM®, or RIPPLE®) for a third layer 204 of cryptographic hashing and public publication. The first layer 200 and the second layer 202 thus ride or sit atop a conventional public blockchain 178 (again, such as BITCOIN®, ETHEREUM®, or RIPPLE®) and provide additional public and/or private cryptographic proofs 170.

Exemplary embodiments may use any hashing function. Many readers may be familiar with the SHA-256 hashing algorithm. The SHA-256 hashing algorithm acts on any electronic data or information to generate a 256-bit hash value as a cryptographic key. The key is thus a unique digital signature. There are many hashing algorithms, though, and exemplary embodiments may be adapted to any hashing algorithm.

Figure 26:
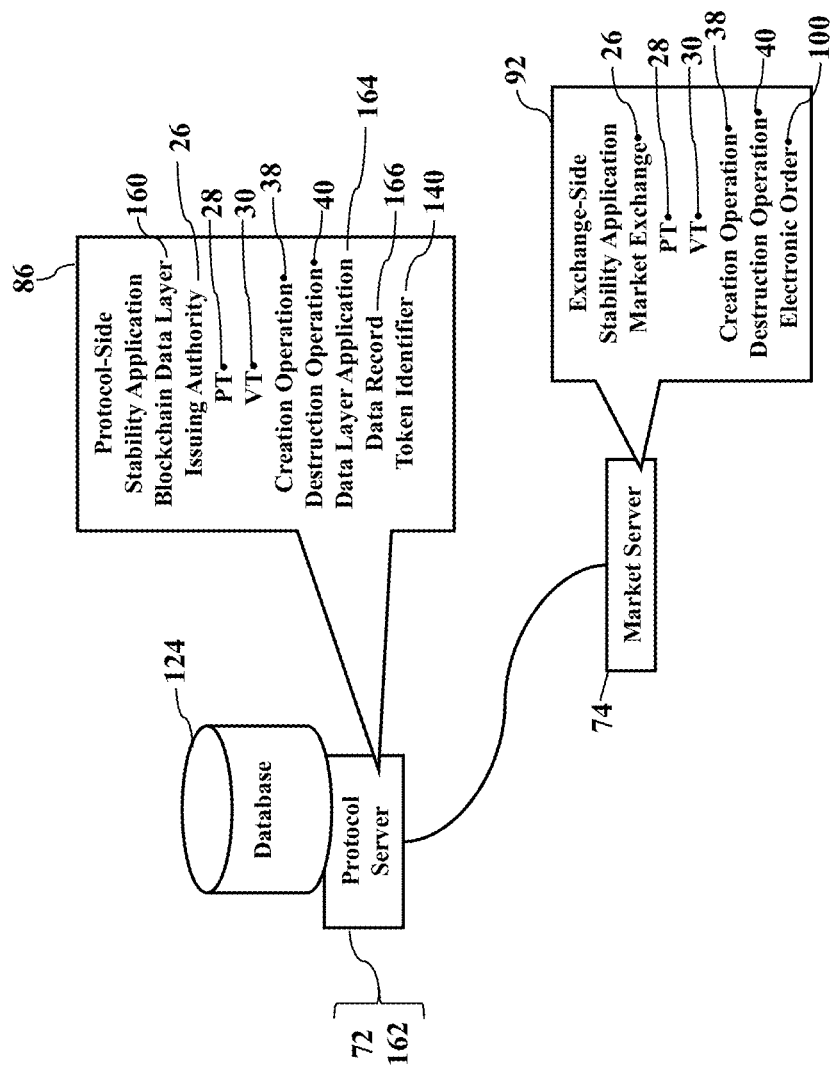
FIG. 26 illustrates fraud detection, according to exemplary embodiments.

FIG. 26 illustrates fraud detection, according to exemplary embodiments. Here destruction is confirmed to maintain the desired quantity or number of the pegged cryptographic tokens 28 and/or the variable-priced cryptographic tokens 30. For example, when the market server 74 receives the electronic order 100 (specifying the buy transaction 102 and/or the sell transaction 104, as illustrated with reference to FIG. 9) associated with any pegged cryptographic token 28, exemplary embodiments may first query the electronic database 124 for the corresponding token identifier 140. If an entry in the electronic database 124 associates the token identifier 140 to the destruction operation 40, then exemplary embodiments may escalate the electronic order 100 for a fraud review. In plain words, if the token identifier 140 is associated with a previous or historical destruction operation 40, then the corresponding pegged cryptographic token 28 may have already been destroyed in response to a previous or historical buy/sell order. The pegged cryptographic token 28 may have already been tagged or processed for deletion or removal from the market exchange 32, so its market presence may indicate a potential fraudulent order. Regardless, if fraud is suspected or inferred, exemplary embodiments may delay or even halt processing of the electronic order 100 for additional scrutiny.

The blockchain data layer 160 may also reveal fraudulent efforts. Again, when any electronic order 100 specifies any transaction involving any cryptographic token 28 or 30, exemplary embodiments may additionally or alternatively query the data records 166 in the blockchain data layer 160 for the corresponding token identifier 140. If any data record 166 contains a matching token identifier 140, the data record 166 may be retrieved and read/inspected for the destruction operation 40. If the data record 166 logs the destruction operation 40, then exemplary embodiments may infer that some party or market participant is attempting to buy/sell/convert a dead, destroyed, or uncirculated token 28 or 30.

Fraud detection may also apply to the variable-priced cryptographic tokens 30. When the electronic order 100 specifies a buy/sell of any variable-priced cryptographic token 30, exemplary embodiments may similarly query for its corresponding token identifier 140 to identify any past or historical destruction operation 40. Again, if the variable-priced cryptographic token 30 was previously slated for deletion or removal from the market exchange 32, its continued market presence may indicate a potential fraudulent order.

Exemplary embodiments may thus track circulation of the tokens 28 and 30 within the market exchange 32. Any token identifier 140 (or its hash value) may be compared to the entries in the electronic database 124 and/or to the blockchain data layer 160. Suppose, for example, the electronic database 124 only contains entries for active tokens 28 and 30. That is, the electronic database 124 may only have entries for the pegged cryptographic tokens 28 and/or the variable-priced cryptographic tokens 30 that are approved for trading in the market exchange 32. The token identifiers 140 of inactive or destroyed tokens 28 and 30, in other words, may not be logged in the electronic database 124. If the token identifier 140 fails to match an entry in the electronic database 124, then exemplary embodiments may infer that the corresponding token 28 or 30 is not authorize for trades and/or was previously destroyed.

Figure 27:
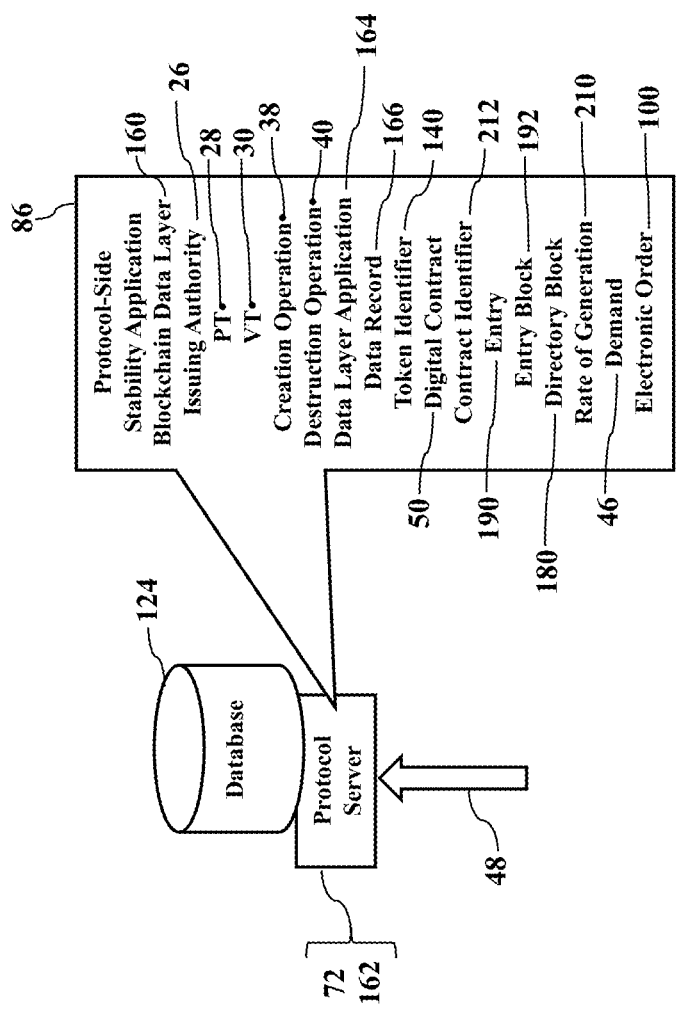
FIG. 27 illustrates monetary policy based on the blockchain data layer, according to exemplary embodiments.
Figure 28:
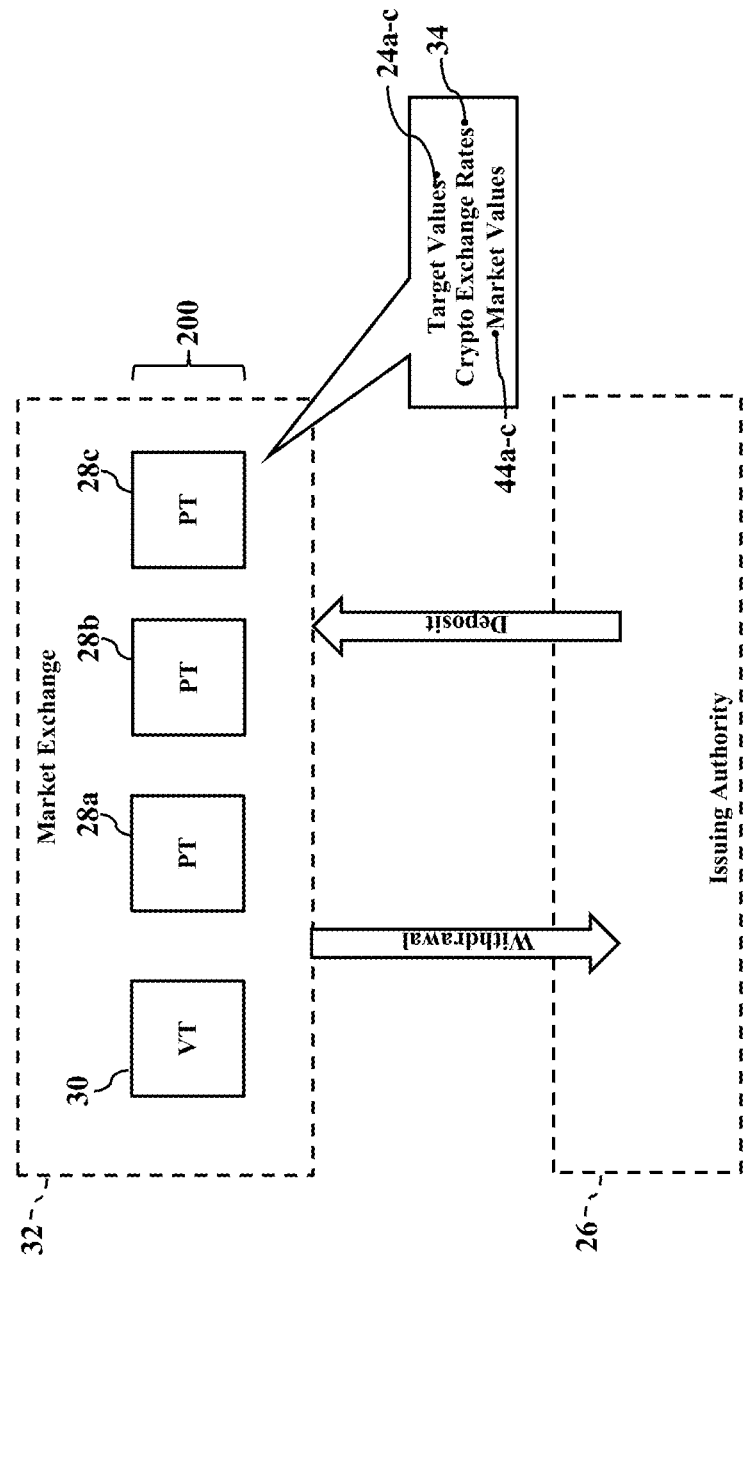
FIGS. 28-34 illustrate a network of multiple cryptographic pegged tokens, according to exemplary embodiments.

FIG. 27 illustrates monetary policy based on the blockchain data layer 160, according to exemplary embodiments. As this disclosure previously explained, exemplary embodiments may manage the quantities of the pegged cryptographic tokens 28 and/or the variable-priced cryptographic tokens 30 within the market exchange 32 to stabilize their respective market pricing. Moreover, as the pegged cryptographic tokens 28 and/or the variable-priced cryptographic tokens 30 are bought, sold, created, and destroyed, exemplary embodiments may also generate the data records 166 representing the blockchain data layer 160 (such as the entries 190, the entry blocks 192, and/or the directory blocks 180 explained with reference to FIGS. 21-23). Exemplary embodiments may thus deposit and/or withdraw the tokens 28 and 30 based on the number of the entries 190, the entry blocks 192, and/or the directory blocks 180 generated within the blockchain data layer 160. For example, as the data records 166 are generated, the protocol server 72 may determine a rate 210 of generation. That is, as the data records 166 are generated when or while executing trades or other transactions (such as according to the digital contract 50), exemplary embodiments may sum or count the entries 190, the entry blocks 192, and/or the directory blocks 180 that specify or reference a particular cryptographic token 28 and/or 30 and that are generated over time (such as per second, per minute, or other interval). Exemplary embodiments, for example, may call or initialize a counter having an initial value (such as zero). At an initial time (such as when the blockchain 48 is received or when a contract identifier 212 or token identifier 140 is determined), the counter commences or starts counting or summing the number of the entries 190, the entry blocks 192, and/or the directory blocks 180 (generated within the blockchain data layer 160) that are commonly associated with or reference the blockchain 48, the token identifier 140 (perhaps according to the chain ID 174) and/or the contract identifier 212. The counter stops counting or incrementing at a final time and exemplary embodiments determine or read the final value or count. Exemplary embodiments may then calculate the rate 210 of generation as the sum or count over time.

The rate 210 of generation may thus reflect the demand 46. As the demand 46 in the market exchange 32 increases, increasing numbers of the electronic orders 100 are being processed (regardless of the pegged cryptographic tokens 28 and/or the variable-priced cryptographic tokens 30) and increasing numbers of the data records 166 are being generated in the blockchain data layer 160. As the rate 210 of generation increases, the protocol-side stability application 86 may infer that the demand 46 is also increasing. The protocol-side stability application 86 may thus cause the protocol server 72 to inspect the data records 166 to determine whether the demand 46, perhaps based on the rate 210 of generation, reflects the pegged cryptographic tokens 28 and/or the variable-priced cryptographic tokens 30. Once the demand 46 is clarified, the protocol-side stability application 86 may then instruct the protocol server 72 to deposit, or to withdraw, a desired amount of the pegged cryptographic tokens 28 and/or the variable-priced cryptographic tokens 30 to achieve pricing stability.

The rate 210 of generation may thus be a feedback mechanism. As the data records 166 are generated, the rate 210 of generation of the data records 166 provides advance notice of the demand 46. That is, the data records 166 may be generated quicker, or ahead in time, when compared to processing of the electronic order 100, especially if recordation to the blockchain 48 is delayed due to miner consensus. The rate 210 of generation may thus be a precursor or indicator for the algorithmic monetary policy performed by the protocol server 72.

Compensation may be due. As the protocol server 72 deposits and/or destroys the tokens 28 and 30 in the market exchange 32, a cryptographic fee may be charged, assessed, or debited. More cryptographic fees may be assed for generating the data records 166 in the blockchain data layer 160. The cryptographic fee may be paid or charged in the pegged cryptographic tokens 28, the variable-priced cryptographic tokens 30, and/or still another cryptographic coinage.

Entry credits may be required. Exemplary embodiments may impose or require one or more of the entry credits for depositing, or for withdrawing, the pegged cryptographic token 28 and/or the variable-priced cryptographic token 30 to achieve pricing stability. The entry credits may be paid or redeemed for accessing the market server 74 and/or for using the protocol server 72. The entry credits (and any other cryptographic processing fees) thus protect the blockchain environment 22 from spam, numerous failed/fraudulent transactions, and other attacks.

Exemplary embodiments may include a cloud-based blockchain service provided by a cloud service provider. When the creation operation 38 or the destruction operation 40 is needed for stability, the protocol server 72 and/or the market server 74 may outsource or subcontract the creation operation 38 or the destruction operation 40 to the cloud service provider. The market server 74, for example, may generate and send a service request via the communications network 70 to the network address (such as an Internet protocol address) associated with the protocol server 72. The service request may include or specify any transactional details associated with the electronic order 100. The protocol server 72 acts on information in the service request, creates and/or destroys the tokens 28 and 30, generates the data records 166 in the blockchain data layer 160, and generates a service response. The service response may simply or comprehensively detail the creation operation 38 or the destruction operation 40. The protocol server 72 and the market server 74 may thus cooperate in a client/server fashion and cooperate to send, receive, and/or generate the service request, the service response, and/or the data records 166 in the blockchain data layer 160. A cryptographic fee may then be charged, assessed, or debited.

FIGS. 28-34 further illustrate the network 220 of multiple cryptographic pegged tokens 28, according to exemplary embodiments. The network 220 of the cryptographic pegged tokens 28 may provide additional arbitrage opportunities within the market exchange 32. While there may be many different pegged cryptographic tokens (such as any numeral N), FIG. 28 only illustrates a simple example of three (3) cryptographic pegged tokens 28*a-c*. Each pegged token 28*a-c* may have its corresponding current market value 44*a-c* in the market exchange 32. Each pegged token 28*a-c* may also have its corresponding target value 24*a-c*. Moreover, because the cryptographic pegged tokens 28*a-c* may fluctuate in value, there may be multiple cryptographic exchange rates 34 when valuing/trading/converting between any of the cryptographic pegged tokens 28*a-c* and/or the variable-priced cryptographic token 30 (as earlier explained). Even though the current market value 44 of the variable-priced cryptographic token 30 may fluctuate, the variable-priced cryptographic token 30 may have zero arbitrage opportunities. That is, its current market value 44 of the variable-priced cryptographic token 30 is whatever its market value is. The current market values 44*a-c* of the cryptographic pegged tokens 28*a-c*, however, may vary, especially when compared to each other. For example, suppose the current market value 44*a* of the cryptographic pegged token 28*a* exceeds its target value 24*a*, but the current market value 44*b* of the cryptographic pegged token 28*b* is less than its target value 24*b*. Traders in the market exchange 32 thus see an arbitrage advantage to trade/convert/sell the cryptographic pegged token 28*a* to reap a profit, and the traders see a buy opportunity to acquire the cryptographic pegged token 28*b*. The traders, in other words, may see the arbitrage opportunity is greater between the pegged tokens 28*a* and 28*b* as opposed to the variable-priced cryptographic token 30, which means that the whole network 220 has a more enhanced stability to leverage the differences between the pegged tokens 28*a* and 28*b* against each other instead of being restricted to just the variable-priced cryptographic token 30.

The network 220 of the cryptographic pegged tokens 28 may be traded. Any one of the cryptographic pegged tokens 28 may be exchanged between any other, and/or to any other, according to their relative cryptographic exchange rates 34, within the issuing authority 26 (e.g., the protocol or central authority of the market exchange 32). Indeed, the issuing authority 26 may permit exchange/conversion as long as there is no difference in their market values 44. If those cryptographic pegged tokens 28 are available on the protocol (e.g., the market exchange 32) and one token 28*a* is high and a different token 28*b* is low, an exchange (such as the high token 28*a* for the low token 28*b* on the market exchange 32) may be permitted. Indeed, the same conversion may be made inside of a user's electronic wallet. For example, suppose the cryptographic pegged token 28*a* is 5% high and the cryptographic pegged token 28*b* is 2% low. An arbitrage opportunity of 7% exists between the cryptographic pegged tokens 28*a* and 28*b*. The variable-priced cryptographic token 30 would always be spot on, so the user/trader only has an arbitrage opportunity of either 5% or 2%. The 2% low cryptographic pegged token 28*b*, however, may not really be adjusted because there is not enough room there to get a good return on the trades because there are other costs in trading. But if an arbitrage opportunity of 7% exists, then an acceptable (perhaps minimum) return is present, even including trading costs/fees. That acceptable arbitrage opportunity of 7% helps to adjust the 2% low cryptographic pegged token 28*b* up and decrease the market value 44 of the 5% high cryptographic pegged token 28*a*. The acceptable arbitrage opportunity also takes stress off of the variable-priced cryptographic token 30. The acceptable, minimum return has a lot of variables (e.g., some may accept a profit at 1%, whereas other users may need 15% or 20% profit). If any cryptographic pegged token 28 is extremely, extremely volatile, then a particular margin may be required to protect from the idea that it might either fall or increase in value before cashing out, in which case the advantages may not be realized.

Currency-pegged tokens provides another example. Suppose Venezuela was using their Venezuelan dollar to back a USD cryptographic pegged token 28 and they have a million percent inflation. A trader may need 20%, 30%, or even 50% margin before safely trying to arbitrage because the cryptographic pegged token 28 is rapidly losing market value 44. The Argentinian peso, which is undergoing 45% inflation per year, within an hour or two at 45% inflation over a year is not really that much, so the opportunity to arbitrage the Argentinian peso is much greater in that system. The arbitrage opportunities will thus vary, and in decentralized cryptocurrency, trades are very fast in that they settle very fast. Trades in FOREX are longer because there's a bank behind it all. Inside of an exchange may be fast, but arbitrage requires the cryptographic pegged tokens 28 to get in and out, or dollars or whatever, in and out of the exchange and those factor into trading costs.

Figure 29:
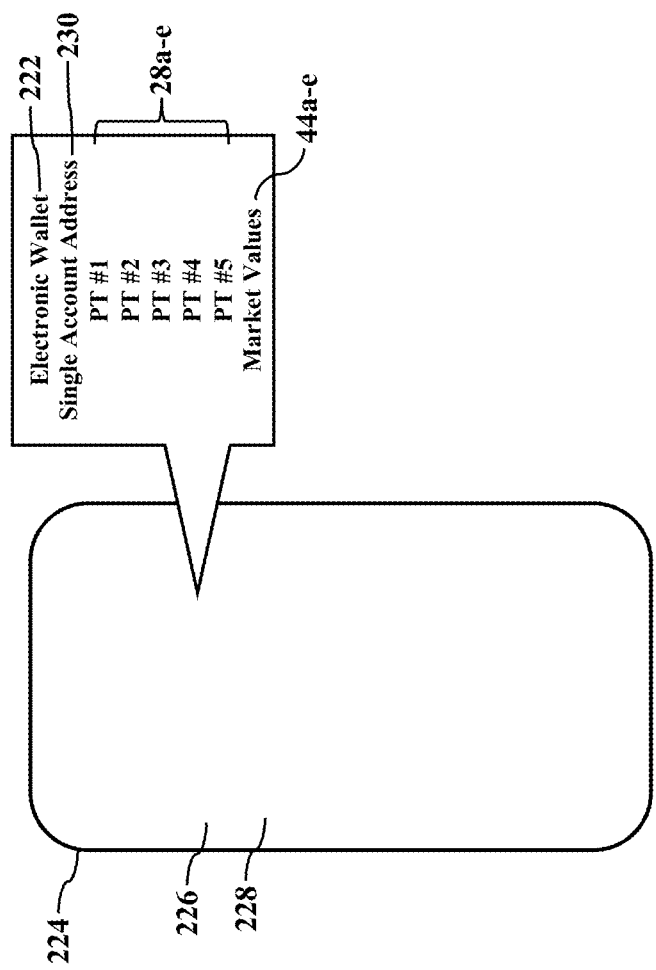

FIG. 29 illustrates an electronic wallet 222. The electronic wallet 222 is utilized by a user to buy/sell/trade/exchange her cryptographic holdings. The electronic wallet 222 is thus a software application that is stored and executed by the user's processor-controlled device. While the electronic wallet 222 may be accessed using any processor-controlled device, most readers are thought familiar with mobile computing. The electronic wallet 222 is thus a software application that is stored and executed by the user's smartphone 224. The user, and/or her electronic wallet 222 and smartphone 224, in other words, may be one of the market participants 108 in the market exchange 32, and the electronic wallet 222 and/or the smartphone 224 is/are registered and/or authorized to submit transactions/orders (such as the electronic order 100 explained with reference to FIG. 9). The smartphone 224 has a hardware processor 226 that executes the electronic wallet 222 stored in a memory device 228. The electronic wallet 222 may be associated with, or configured with, a single account address 230. The single account address 230 may thus be associated with, or related to, values or holdings in each one of the multiple cryptographic pegged tokens 28. That is, one of the multiple cryptographic pegged tokens 28*a* may be pegged or tied to USD, another one of the multiple cryptographic pegged tokens 28*b* may be pegged to gold, another one of the multiple cryptographic pegged tokens 28*c* may be pegged to the S&P 500, another one of the multiple cryptographic pegged tokens 28*d* may be pegged to Bitcoin, and still another one of the multiple cryptographic pegged tokens 28*e* may be pegged to the Chinese Yen. Their individual price or market values 44*a-e* determines how conversions are performed inside of the electronic wallet 222 having the single account or address 230. The single account or address 230 may thus be a cryptographic key to each one of their cryptographic holdings or buckets. The cryptographic key, in other words, may be related to the market values 44 or holdings in each cryptographic pegged token 28*a-d* and any variable-priced cryptographic token(s) 30 (e.g., $5.00 of USD, a hundred dollars in variable token, $25 in the S&P 500, and $10 in the Chinese Yen).

Figure 30:
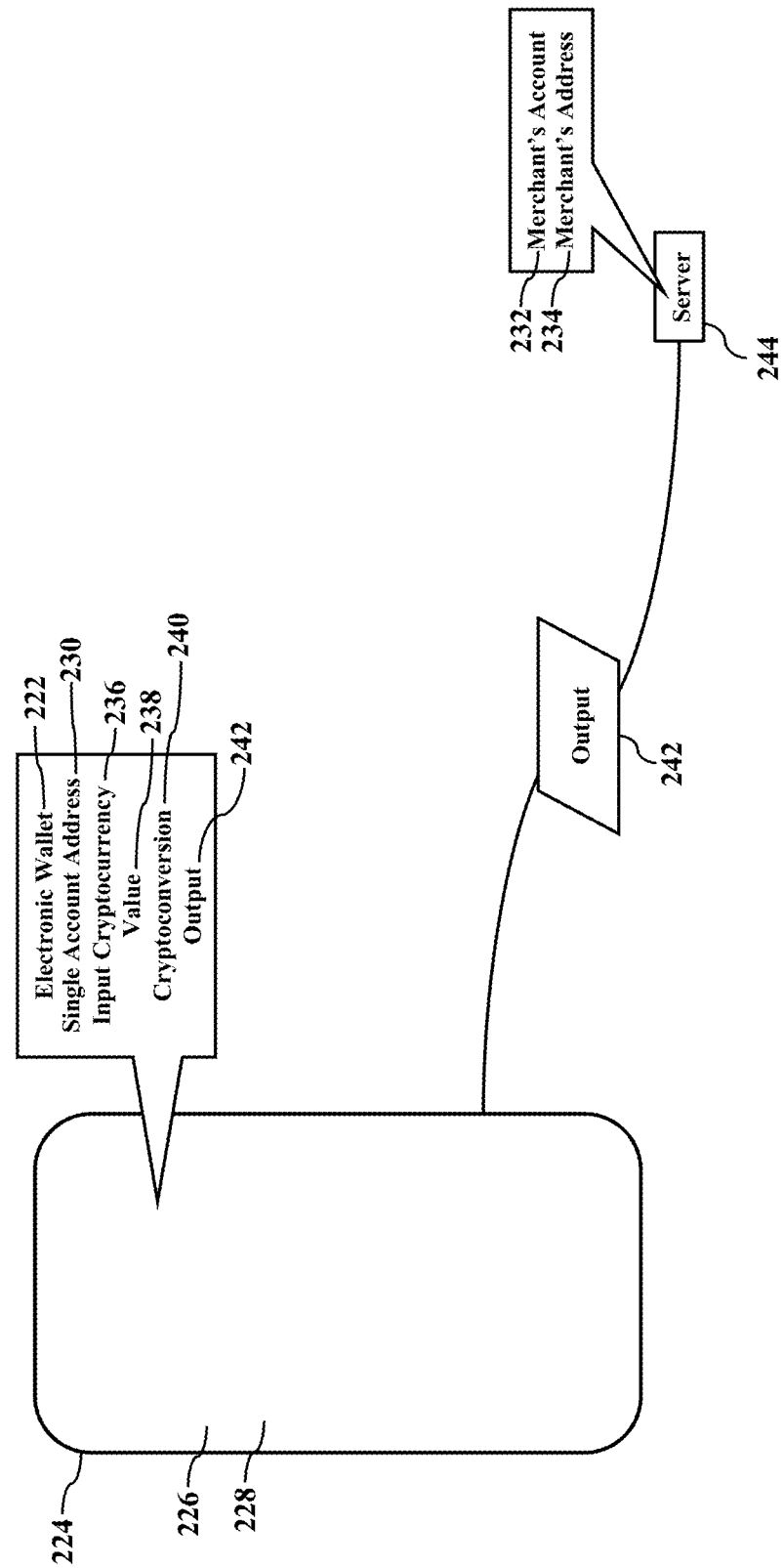

FIG. 30 illustrates wallet conversions. The reader may understand a common scenario with purchasing goods and services using cryptographic funds. Suppose the user wants to pay a retailer (whether online or bricks-and-mortar) in Bitcoin, but the retailer denominates its goods and pays its bills in US Dollars. The retailer may be exposed to a certain amount of currency risk, so the retailer conventionally uses an intermediary processing service (such a BitPay). The conventional intermediary processing service accepts a cryptocurrency (such as Bitcoin) and deposits US Dollars into the retailer's or merchant's account. Exemplary embodiments, instead, allow the user to move cryptocurrency (such as Bitcoin) value, not actual Bitcoins, into the merchant's account 232. That is, exemplary embodiments allow the user/buyer to move Bitcoin value from her electronic wallet 222 (having the single account or address 230) to the address 234 representing the retailer's/merchant's cryptographic account 232. As FIG. 30 illustrates, the user's electronic wallet 222 accepts an input cryptocurrency 236 and value 238 and performs a cryptocurrency conversion 240 to generate an equivalent output value 242 (perhaps in US Dollars), thus eliminating the conventional intermediary processing service. The user may also instruct or command her electronic wallet 222 and/or smartphone 224 to send the output value 242 as a message or transaction (via the communications network 70 above explained) to the merchant's account 232 or the merchant's address 234 (e.g., a server 244). The user thus may not suffer the usually big disadvantage of paying/compensating the conventional third party, intermediary processing service.

Figure 31:
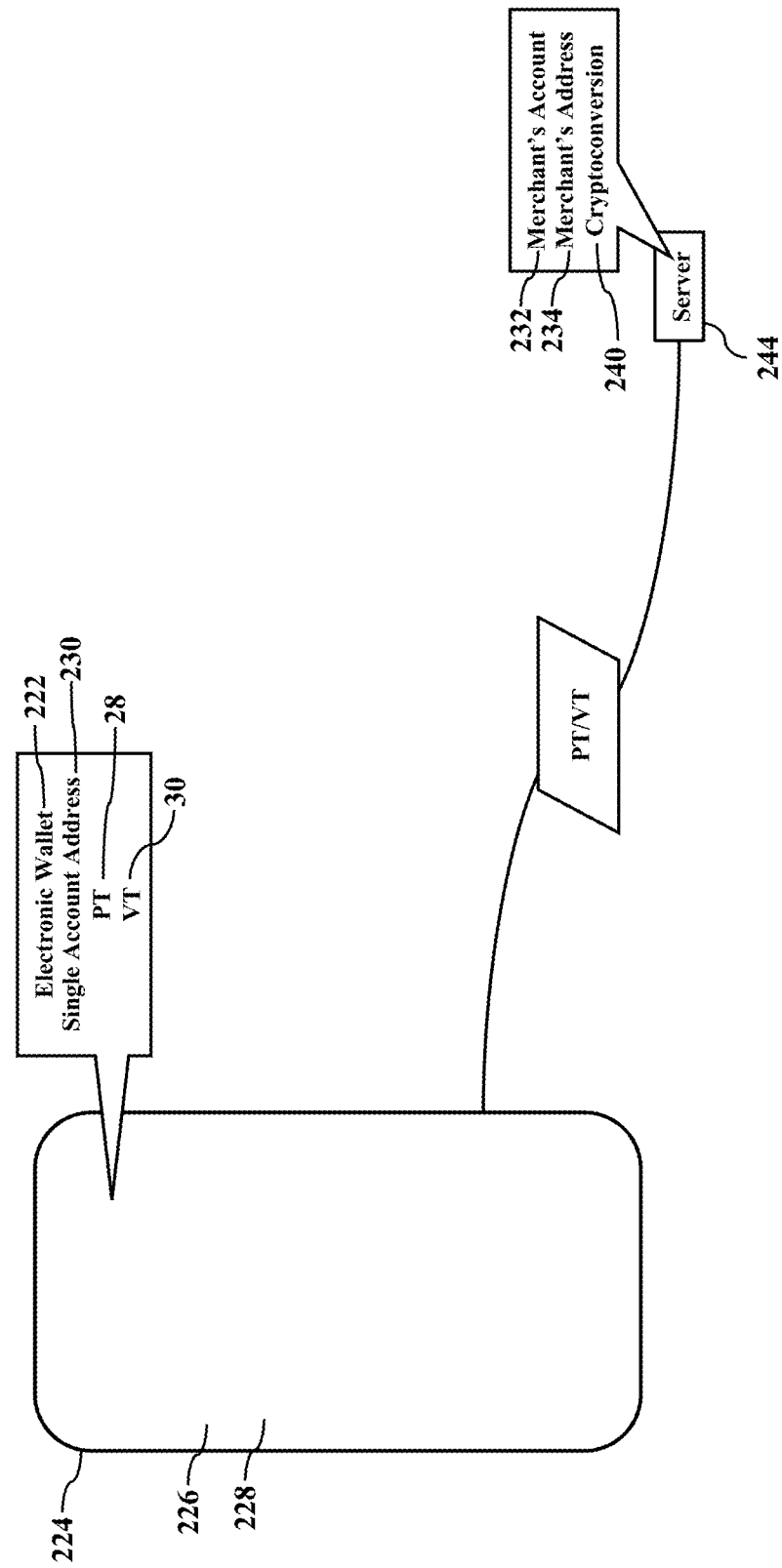

FIG. 31 illustrates merchant conversions. The user/buyer may move or transfer any cryptographic coin (such as the cryptographic pegged token 28 and/or the variable-priced cryptographic token 30) from her electronic wallet 222 (having the single account or address 230) to the address 234 representing the retailer's/merchant's cryptographic account 232. When the retailer's/merchant's cryptographic account 232 receives the cryptographic coin 28/30 or value (e.g., Bitcoin payment), the retailer's/merchant's cryptographic account 232 may then perform the cryptocurrency conversion 240 to convert the crypto-payment to US Dollars.

Multiple conversions may be performed. Either the user's electronic wallet 222 or the retailer's/merchant's cryptographic account 232 may perform multiple cryptocurrency conversions 240 to convert the Bitcoin value to portions or percentages of US Dollars, Yen, and Euros, depending on configuration or input selections. The user's electronic wallet 222 and/or the retailer's/merchant's cryptographic account 232 may thus convert any cryptographic holdings or values into other currencies or other cryptographic coinage (such as any of the cryptographic pegged tokens 28 and/or any variable-priced cryptographic token 30). Exemplary embodiments shave large chunks of money off of the conversion process. Moreover, the conversion details are easily accountable for tax purposes because all the cryptographic exchange rates 34 and cryptotransactions are documented in the blockchain data layer 160 and/or the blockchain 48 (as this disclosure above explained). The merchant/buyer thus has flexibility about how they hold their cryptovalue and how they accept purchases. That is, the network 220 of the cryptographic pegged tokens 28 is well-suited to today's increasingly global economy.

Figure 32:
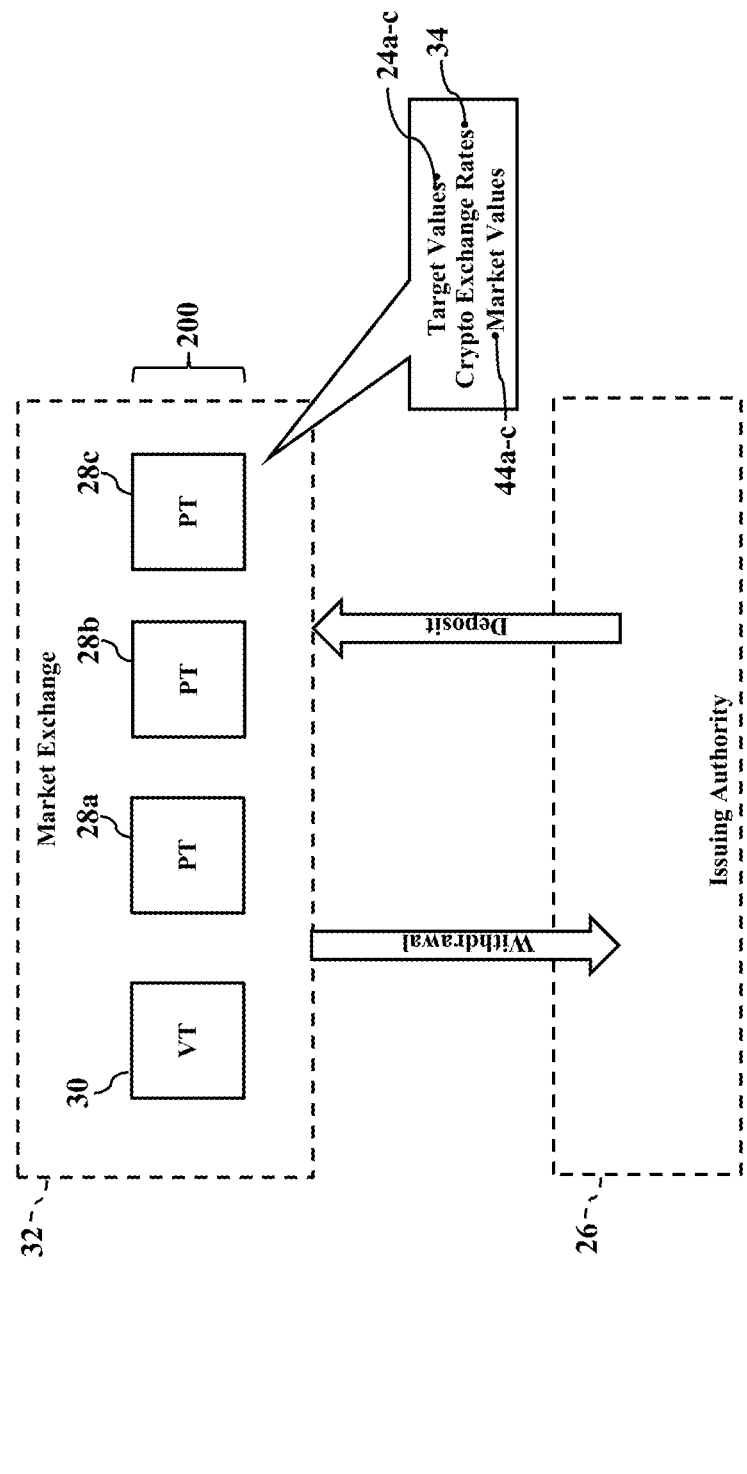

FIG. 32 illustrates asset-backed cryptographic pegged tokens 28. The network 220 of the cryptographic pegged tokens 28 may be based on demand. There may be only a few cryptographic pegged tokens 28, or there may be many cryptographic pegged tokens 28. The number of the cryptographic pegged tokens 28, and their individual pegged target values 24, may be based on what has market demand and utility. If a particular cryptographic pegged token 28 does not have market demand and utility, then it may not be worthy of trading. However, there is some advantage to have economically independent values in the network 220 of the cryptographic pegged tokens 28. For example, gold may not accurately track the US Dollar value, and the US Dollar value may not accurately track the S&P 500. The S&P 500 may not accurately track cryptocurrency and may not accurately commodities (like wheat or gold or oil). As the market values 44 of these disparate things move, then arbitrage opportunities may exist to chase and manage their values. Cryptotraders maintain stability because they understand how to trade against these commodities as they are reflected accurately in exchanges compared to the market. Then, of course, assuming then that those are keeping their cryptographic pegged tokens 28, and they ae keeping their market values 44 tightly, then the consumer now can leverage these various values for transactions. As an example, suppose an airline feels that it needs to have a thousand gallons of gas per month and a trader feels the gas is pretty cheap right now, then the trader may buy/grab the cryptographic pegged token 28 tied to gas and be able to convert it to physical gas later. The trader may get a profit on that because its market value 44 went up, but it would all be easily documented largely because, especially if this system begins to widely accepted, largely because the cryptographic pegged token 28 holds its target value 24 so tight that there's really no question of what the profit was during conversion from one to the other. Simply put, the underlying asset could be anything, as long as the asset has a market defined value. If there is not market defined value, or an artificial value that is guaranteed to do something (go up in value, for example), severe risks may exist because it may be guaranteed that at some point, meaning when it converts out, it always wins which creates inflation. Ultimately, all that inflation goes onto the cryptographic variable token 30 and if the cryptographic variable token 30 isn't designed to handle that inflation, harm to the system may occur (in some level still depend upon the cryptographic variable token 30 to reflect the value of the network 220).

Exemplary embodiments create a mechanism to exchange between assets. Exemplary embodiments may move speculators away from the assets and people that are investors that care, into the utility of the actual asset, which might reform a lot of the pressures inside of corporations because the people that don't really care about their vote, don't really care about control, don't care about the issues that a company is asked about. They're just trading on the value. This is a convenient place to hold the value and do those trades in an unrestricted way while those parties that really want to participate or really need to use gold or really feel that owning the Bitcoin in my wallet is the important thing, not just playing around with its value. Those parties are the ones that are actually setting the price and appealing to the people that care about the utility and the long-term value is probably more critical than kowtowing to speculators who just want the price to go up. If the speculators don't really have a vote, then they're not the party that companies care about, so if you can find some place for them to live.

Figure 33:
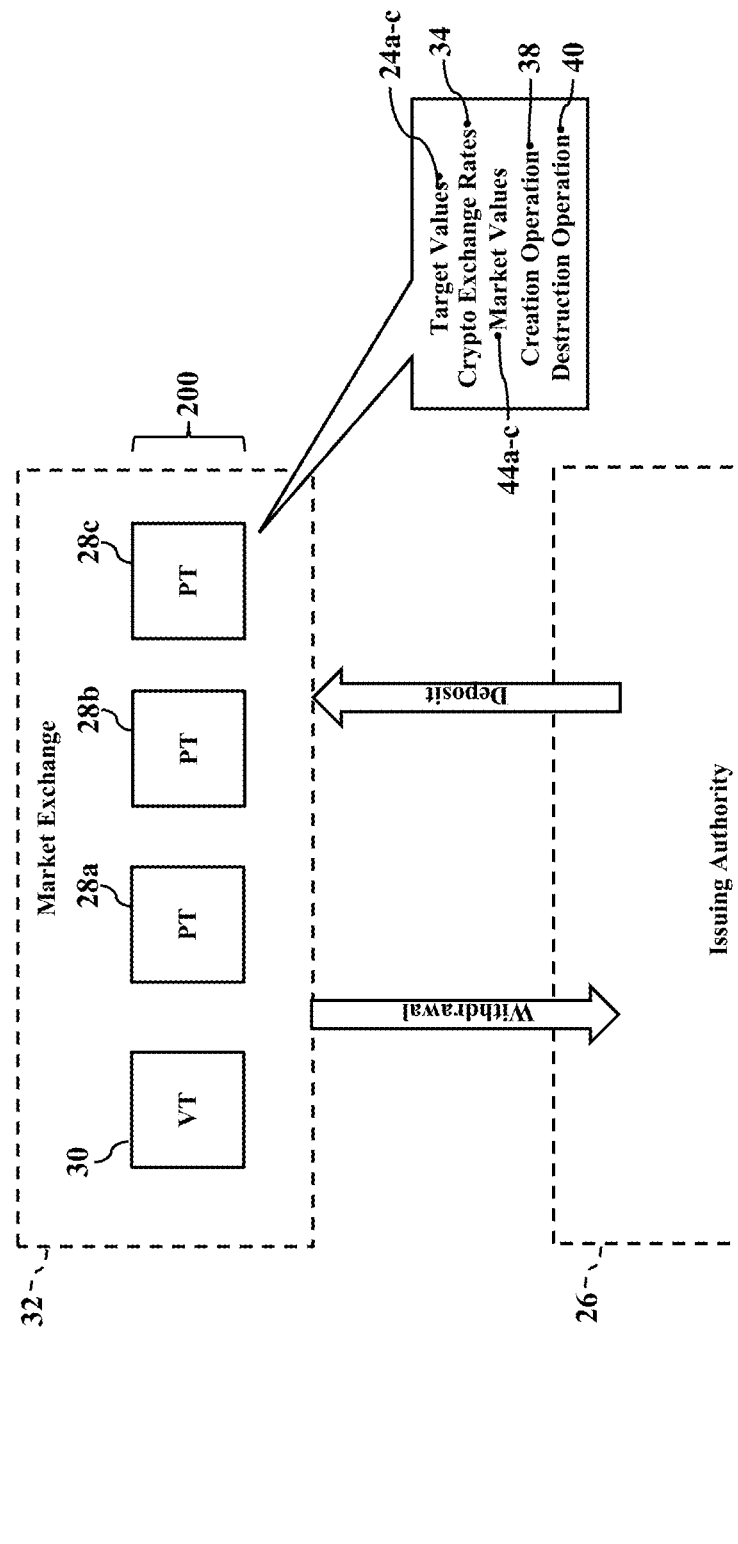

FIG. 33 illustrates creation and destruction. As any of the pegged cryptographic tokens 28 and the variable-priced cryptographic token 30 are bought/sold/traded/exchanged, their supply may be managed using the creation operation 38 and/or the destruction operation 40. For example, the issuing authority 26 may convert a certain number of the pegged cryptographic token 28a into the variable-priced cryptographic token 30, perhaps on demand, at the current cryptographic exchange rate 34. That is, the issuing authority 26 may perform the destruction operation 40 to destroy a certain number the pegged cryptographic tokens 28a and also perform the creation operation 38 to create an equivalent number of the variable-priced cryptographic tokens 30, as determined by the current cryptographic exchange rate 34. The issuing authority 26, vice versa, may perform the destruction operation 40 to destroy a certain number the variable-priced cryptographic tokens 30 and also perform the creation operation 38 to create an equivalent number of the pegged cryptographic tokens 28a. The issuing authority 26 may thus use the creation operation 38 and/or the destruction operation 40 to maintain a supply of the pegged cryptographic tokens 28a and/or the variable-priced cryptographic tokens 30 as a stability mechanism.

Any one of the pegged cryptographic tokens 28 may be created and destroyed. If needed or desired, the issuing authority 26 may convert any number of the pegged cryptographic tokens 28b into the variable-priced cryptographic token 30 using the creation operation 38 and/or the destruction operation 40. The issuing authority 26 may also convert any number of the pegged cryptographic tokens 28c into the variable-priced cryptographic token 30 using the creation operation 38 and/or the destruction operation 40.

Figure 34:
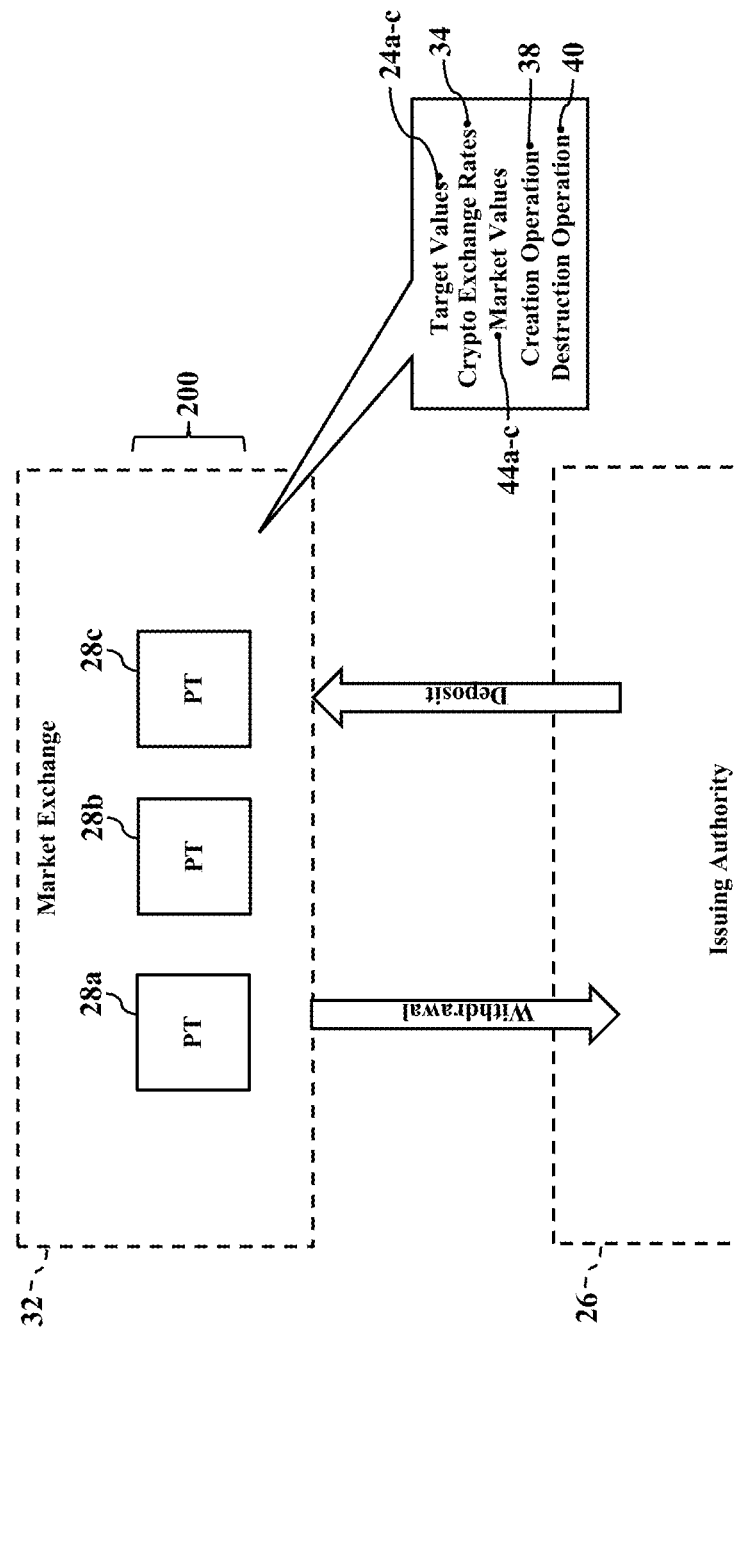

FIG. 34 illustrates pegged creation and destruction. As any of the pegged cryptographic tokens 28 are bought/sold/traded/exchanged, their supply may be managed using the creation operation 38 and/or the destruction operation 40. For example, the issuing authority 26 may convert a certain number of the pegged cryptographic token 28a into the pegged cryptographic token 28b, perhaps on demand, at the current cryptographic exchange rate 34. That is, the issuing authority 26 may perform the destruction operation 40 to destroy a certain number the pegged cryptographic tokens 28a and also perform the creation operation 38 to create an equivalent number of the pegged cryptographic token 28b, as determined by the current cryptographic exchange rate 34. The issuing authority 26, vice versa, may perform the destruction operation 40 to destroy a certain number the pegged cryptographic token 28b and also perform the creation operation 38 to create an equivalent number of the pegged cryptographic tokens 28a. The issuing authority 26 may thus use the creation operation 38 and/or the destruction operation 40 to maintain a supply of the pegged cryptographic tokens 28a and/or 28b as stability mechanisms. The creation operation 38 and/or the destruction operation 40 may also be implemented between the pegged cryptographic tokens 28a and 28c and between 28b and 28c.

Figure 35:
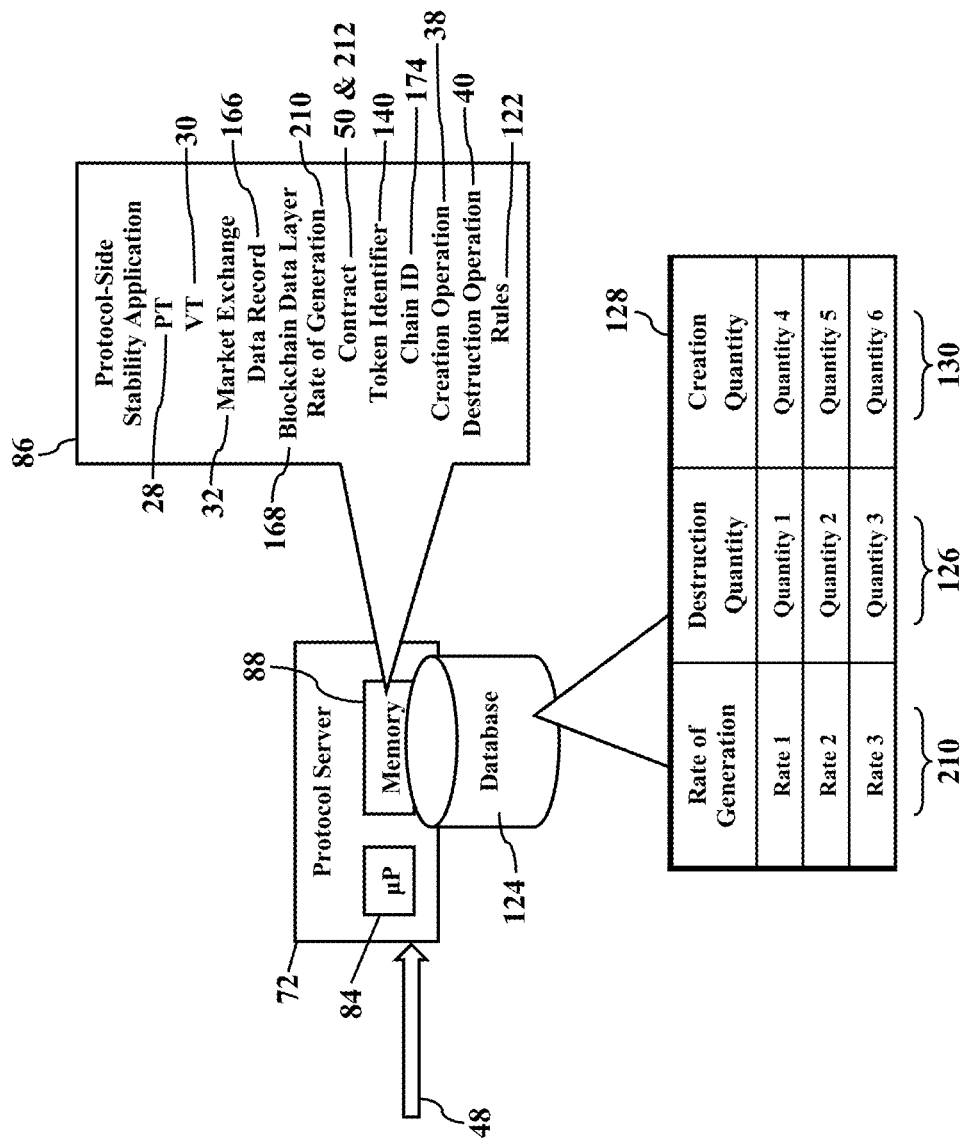
FIGS. 35-36 further illustrate algorithmic decentralized monetary policy, according to exemplary embodiments.
Figure 36:
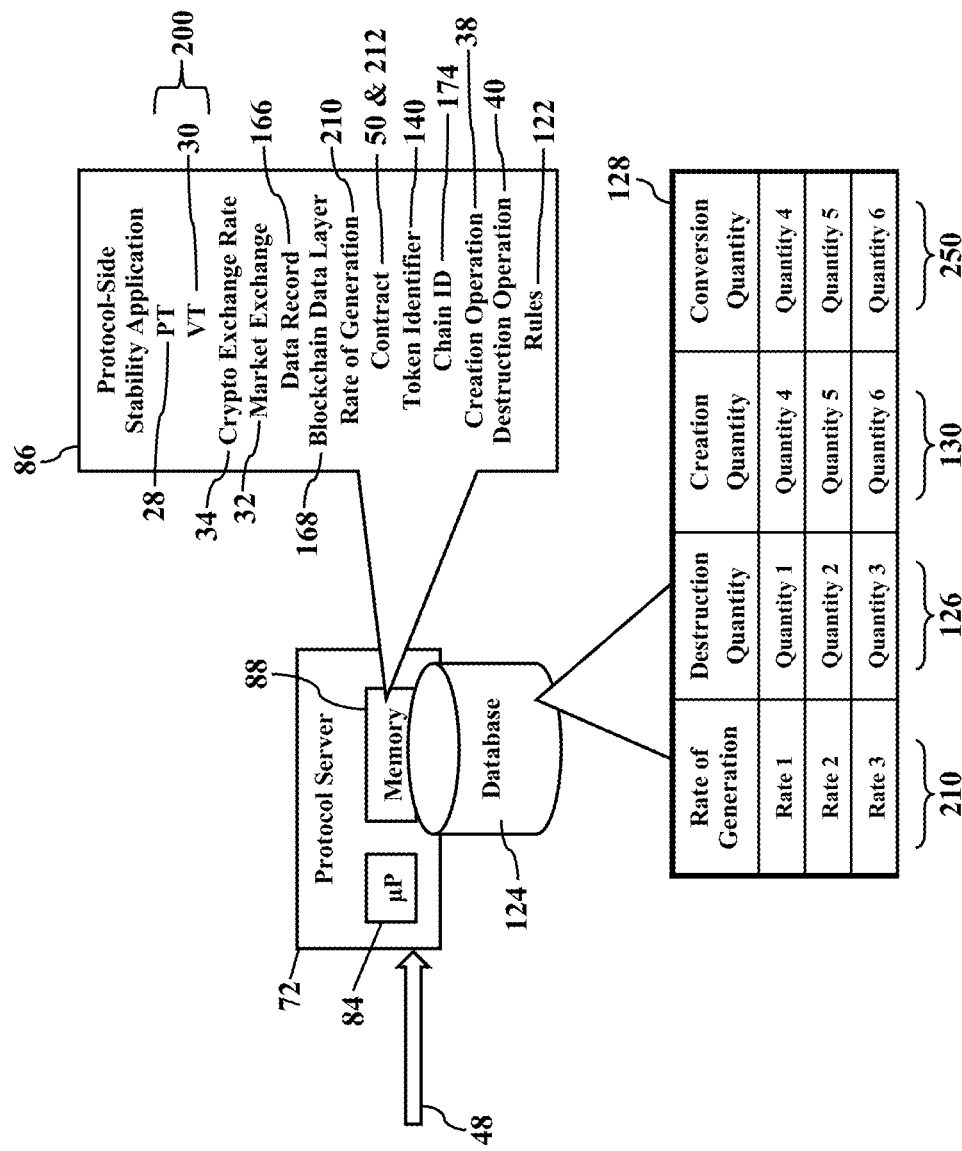

FIGS. 35-36 further illustrate algorithmic decentralized monetary policy based on the blockchain data layer 160, according to exemplary embodiments. As this disclosure previously explained, exemplary embodiments may manage the quantities of the pegged cryptographic tokens 28 and/or the variable-priced cryptographic tokens 30 within the market exchange 32 to stabilize their respective market pricing. Moreover, as the pegged cryptographic tokens 28 and/or the variable-priced cryptographic tokens 30 are bought, sold, created, and destroyed, exemplary embodiments may also generate the data records 166 representing the blockchain data layer 160 (such as the entries 190, the entry blocks 192, and/or the directory blocks 180 explained with reference to FIGS. 21-23). Exemplary embodiments may thus deposit, withdraw, and/or convert the tokens 28 and 30 based on the number of the entries 190, the entry blocks 192, and/or the directory blocks 180 generated within the blockchain data layer 160. For example, as the data records 166 are generated, the protocol server 72 may determine the rate 210 of generation (as previously explained with reference to FIG. 27). The rate 210 of generation may thus be specified according to, or be associated with, the digital contract 50 and/or its contract identifier 212 that is referenced by the data records 166 in the blockchain data layer 160. The rate 210 of generation may also be specified according to, or be associated with, any particular one of the cryptographic tokens 28 and/or 30 and their corresponding token identifier 140 referenced by the data records 166 in the blockchain data layer 160. The rate 210 of generation may also be specified according to, or be associated with, the chain ID 174 referenced by the data records 166 in the blockchain data layer 160.

The rate 210 of generation may relate to crypto-supply management. As this disclosure previously explained, the demand 46 for any of the pegged cryptographic tokens 28 and/or the variable-priced cryptographic tokens 30 may be inferred from the rate 210 of generation of the data records 166 in the blockchain data layer 160 (as previously explained with reference to FIG. 27). As FIG. 35 illustrates, the creation operation 38 and/or the destruction operation 40 may also be inferred from the rate 210 of generation of the data records 166 in the blockchain data layer 160. For example, once the rate 210 of generation is determined, exemplary embodiments may query the electronic database 124 for the rate 210 of generation. The electronic database 124 is illustrated as being locally stored and maintained by the protocol server 72, but any of the database entries may be stored by the market server 74 and/or at any remote, accessible location via the communication network 70 (illustrated by FIG. 7). Regardless, the electronic database 124 may relate, map, or associate different values of the rate 210 of generation to their corresponding destruction quantities 126 and/or creation quantities 130. Again, even though the electronic database 124 may have any logical and physical structure, FIG. 35 illustrates the relational data table 128 that relates, maps, or associates each rate 210 of generation to its corresponding destruction quantity 126 and creation quantity 130. So, once the rate 210 of generation is determined, exemplary embodiments may query the electronic database 124 for the rate 210 of generation and identify its corresponding destruction quantity 126 and creation quantity 130. While FIG. 35 only illustrates a simple example of a few entries, in practice the electronic database 124 may have many entries that detail a rich depository of the different rules 122 and their finely defined destruction quantities 126 and/or creation quantities 130. Once the destruction quantity 126 and/or the creation quantity 130 is determined, exemplary embodiments perform the creation operation 38 and/or the destruction operation 40, as previously explained.

Algorithmic decentralized monetary policy may be inferred from the data records 166 in the blockchain data layer 160. As the demand 46 for any of the pegged cryptographic tokens (such as 28a-c) and/or the variable-priced cryptographic tokens 30 changes within the market exchange 32, the rate 210 of generation of the data records 166 may reflect the demand 46, the current market value 44, and/or the supply of the pegged cryptographic tokens 28 and the variable-priced cryptographic tokens 30. For example, if the rate 210 of generation of the data records 166 is falling (or negative), the rate 210 of generation may indicate that the current market value 44 (or "CMV") is less than the target value 24 (or "TV"), the demand 46 for the corresponding cryptographic token 28 or 30 is falling or reducing, and there may be too many of the corresponding cryptographic token 28 or 30 in the market exchange 32, thus perhaps implying an oversupply condition may exist. The protocol-side stability application 86 may thus instruct the protocol server 72 to implement pre-programmed fiscal/monetary measures to stabilize the current market value 44, such as withdrawing/destroying the corresponding destruction quantity 126 identified in the electronic database 124. The logical rule 122 may thus be an algorithmic code or instruction that is executed in response to the falling/negative rate 210 of generation. The protocol server 72 and the market server 74 may thus cooperate to withdraw and destroy a desired quantity of the cryptographic token 28 or 30 from the market exchange 32 to stimulate or increase the rate 210 of generation and to increase its current market value 44 toward the target value 24.

The creation operation 38 may also be performed. As the protocol-side stability application 86 causes or instructs the protocol server 72 to monitor the rate 210 of generation of the data records 166 in the blockchain data layer 160, creation and/or conversion may be implemented to inject additional cryptographic tokens 28 and/or 30 into the market exchange 32. For example, if the rate 210 of generation of the data records 166 is increasing (or positive), the rate 210 of generation may indicate that the current market value 44 (or "CMV") is greater than the target value 24 (or "TV"), the demand 46 for the corresponding cryptographic token 28 or 30 is rising or increasing, and there may be too few of the corresponding cryptographic token 28 or 30 in the market exchange 32, thus perhaps implying an undersupply condition may exist. The protocol-side stability application 86 may thus instruct the protocol server 72 to implement pre-programmed fiscal/monetary measures to stabilize the current market value 44, such as injecting/creating the corresponding creation quantity 130 identified in the electronic database 124. The logical rule 122 may thus be an algorithmic code or instruction that is executed in response to the rising/positive rate 210 of generation. The protocol server 72 and the market server 74 may thus cooperate to inject and create a desired quantity of the cryptographic token 28 or 30 from the market exchange 32 to suppress or decrease the rate 210 of generation and to decrease its current market value 44 toward the target value 24.

FIG. 36 shows more pre-programmed fiscal/monetary measures. The electronic database 124 may also have entries that relate, map, or associate the rate 210 of generation to its corresponding destruction quantity 126, creation quantity 130, and/or conversion quantity 250. Recall that the because network 220 of multiple cryptographic pegged tokens 28a-c may fluctuate in value, there may be pre-programmed fiscal/monetary measures to create, destroy, and/or convert between any of the cryptographic pegged tokens 28a-c and/or the variable-priced cryptographic token 30 (as earlier explained). The electronic database 124 may have entries that additionally relate rate 210 of generation to its corresponding conversion quantity 250. The conversion quantity 250 may be a predetermined number of any of the cryptographic pegged tokens 28a-c that is converted into another one of the cryptographic pegged tokens 28a-c (perhaps according to the corresponding cryptographic exchange rate 34). The conversion quantity 250 may additionally or alternatively specify a predetermined number of any of the cryptographic pegged tokens 28a-c that is converted into the variable-priced cryptographic token 30. Regardless, once the rate 210 of generation is determined and the conversion quantity 250 is identified, exemplary embodiments may conduct cryptocurrency conversions as further pre-programmed fiscal/monetary measures.

Pre-programmed stimulus may be implemented. If the rate 210 of generation of the data records 166 is falling (or negative), the rate 210 of generation may indicate that the current market value 44 (or "CMV") of the cryptographic pegged token 28a is less than its target value 24 (or "TV"), its demand 46 is falling or reducing, and there may be too many of the cryptographic pegged tokens 28a in the market exchange 32, thus perhaps implying an oversupply condition may exist. The protocol-side stability application 86 may thus instruct the protocol server 72 to implement pre-programmed fiscal/monetary measures, such as converting the corresponding conversion quantity 250 of the cryptographic pegged tokens 28a into the different cryptographic pegged token 28b (perhaps according to the corresponding cryptographic exchange rate 34). The logical rule 122 implementing the conversion quantity 250 is executed in response to the falling/negative rate 210 of generation of the data records 166. The protocol server 72 and the market server 74 may thus cooperate to convert a desired quantity of the cryptographic pegged tokens 28a-c to stimulate or increase the rate 210 of generation and to increase its current market value 44 toward the target value 24.

Crypto-supply may be managed. When the rate 210 of generation of the data records 166 is increasing (or positive), the rate 210 of generation may indicate that the current market value 44 (or "CMV") of the cryptographic pegged token 28a is greater than its target value 24 (or "TV"), the demand 46 for the cryptographic pegged token 28a is rising or increasing, and there may be too few of the corresponding cryptographic pegged token 28a in the market exchange 32, thus perhaps implying an undersupply condition may exist. The protocol-side stability application 86 may thus instruct the protocol server 72 to implement pre-programmed fiscal/monetary measures to stabilize the current market value 44, such as converting the conversion quantity 250 of the different cryptographic pegged tokens 28b into the cryptographic pegged token 28a (perhaps according to the corresponding cryptographic exchange rate 34). The logical rule 122 may thus be an algorithmic code or instruction that is executed in response to the rising/positive rate 210 of generation. The protocol server 72 and the market server 74 may thus cooperate to inject new cryptographic pegged tokens 28a into the market exchange 32 to suppress or decrease the rate 210 of generation and to decrease its current market value 44 toward the target value 24.

Figure 37:
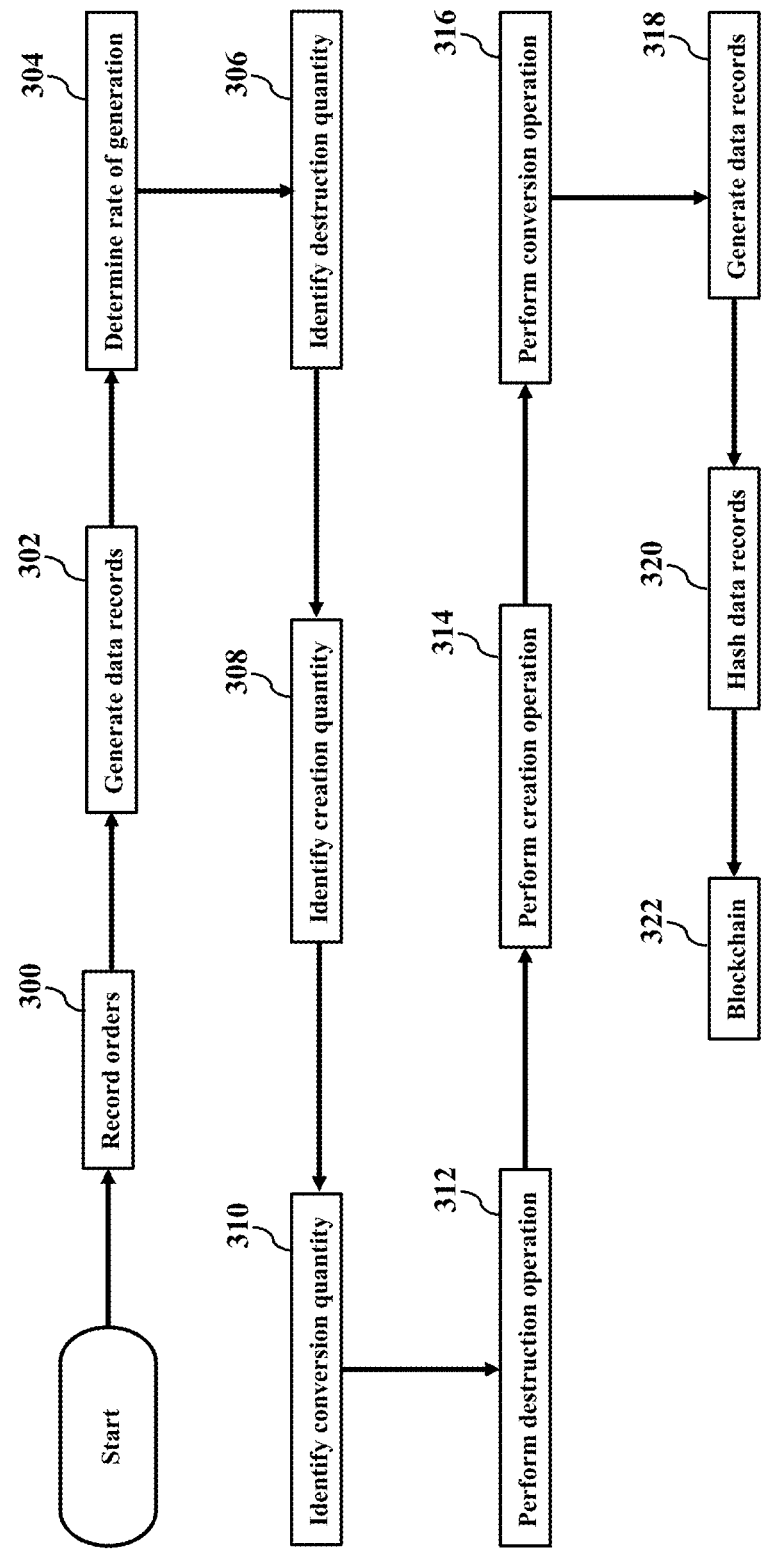
FIG. 37 is a flowchart illustrating a method or algorithm for stable pricing of cryptographic coinage, according to exemplary embodiments.

FIG. 37 is a flowchart illustrating a method or algorithm for stable pricing of cryptographic coinage, according to exemplary embodiments. The electronic orders 100 are recorded (Block 300) and the data records 166 in the blockchain data layer 160 are generated (Block 302). The rate 210 of generation is determined (Block 304) and the destruction quantity 126 (Block 306), the creation quantity 130 (Block 308), and the conversion quantity 250 (Block 310) are identified. The destruction operation 40 may be performed (Block 312) to remove and destroy a quantity of the pegged cryptographic token 28 from the market exchange 32. The creation operation 38 may be performed (Block 314) to create and deposit a quantity of a different pegged cryptographic token 28 into the market exchange 32. A conversion operation of the conversion quantity 250 may be performed (Block 316) to increase or decrease any of the pegged cryptographic tokens 28 in the market exchange 32. More data records 166 in the blockchain data layer 160 are generated (Block 318) to document the destruction quantity 126, the creation quantity, and the conversion quantity 250. The data records 166 may be hashed (Block 320) and incorporated into the public blockchain (Block 322).

Figure 38:
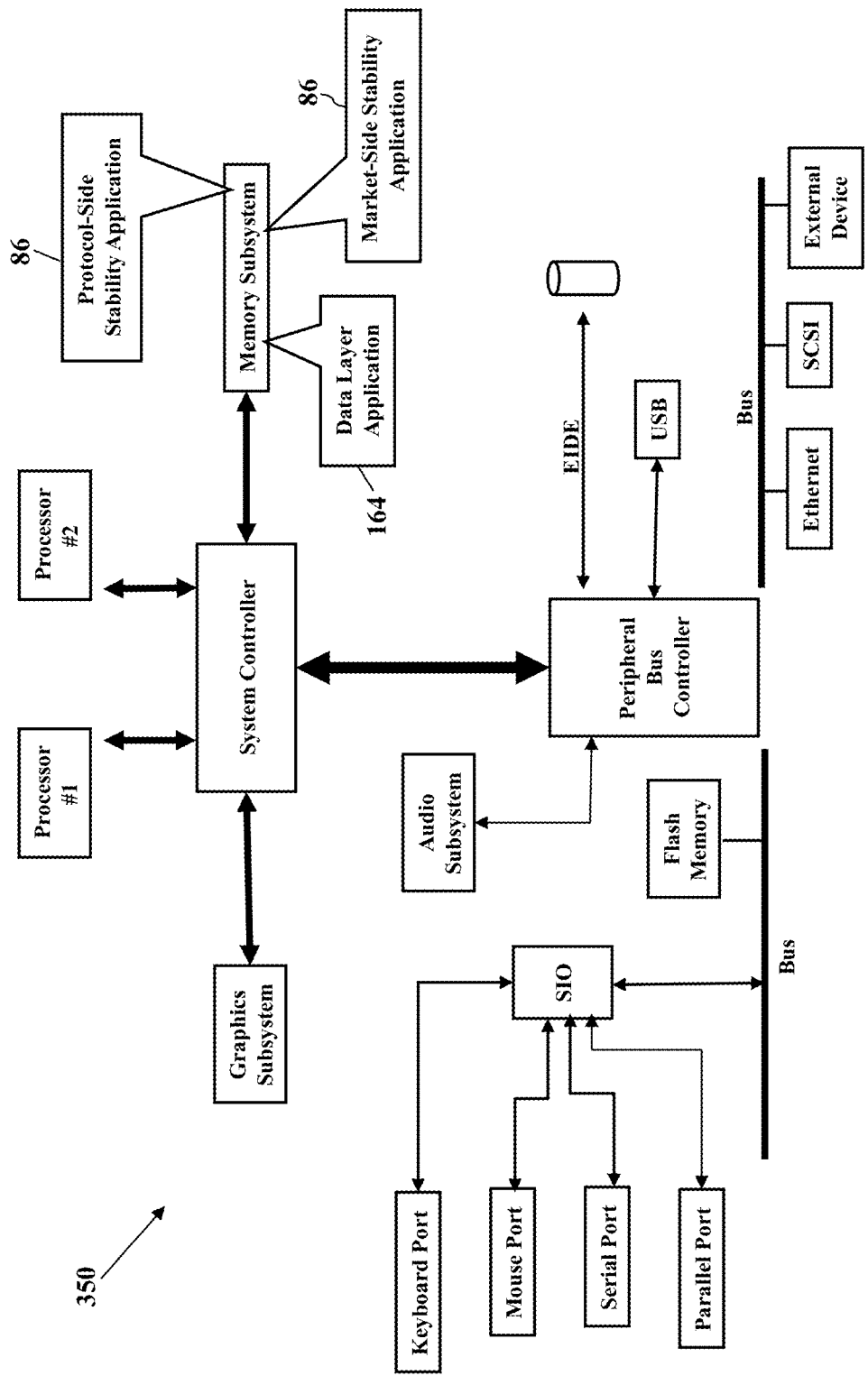
FIGS. 38-39 depict still more operating environments for additional aspects of the exemplary embodiments.

FIG. 38 is a schematic illustrating still more exemplary embodiments. FIG. 38 is a more detailed diagram illustrating a processor-controlled device 350. As earlier paragraphs explained, the protocol-side stability application 86, the market-side stability application 86, and/or the data layer application 164 may partially or entirely operate in any mobile or stationary processor-controlled device. FIG. 38, then, illustrates the protocol-side stability application 86, the market-side stability application 86, and/or the data layer application 164 stored in a memory subsystem of the processor-controlled device 350. One or more processors communicate with the memory subsystem and execute either, some, or all applications. Because the processor-controlled device 350 is well known to those of ordinary skill in the art, no further explanation is needed.

Figure 39:
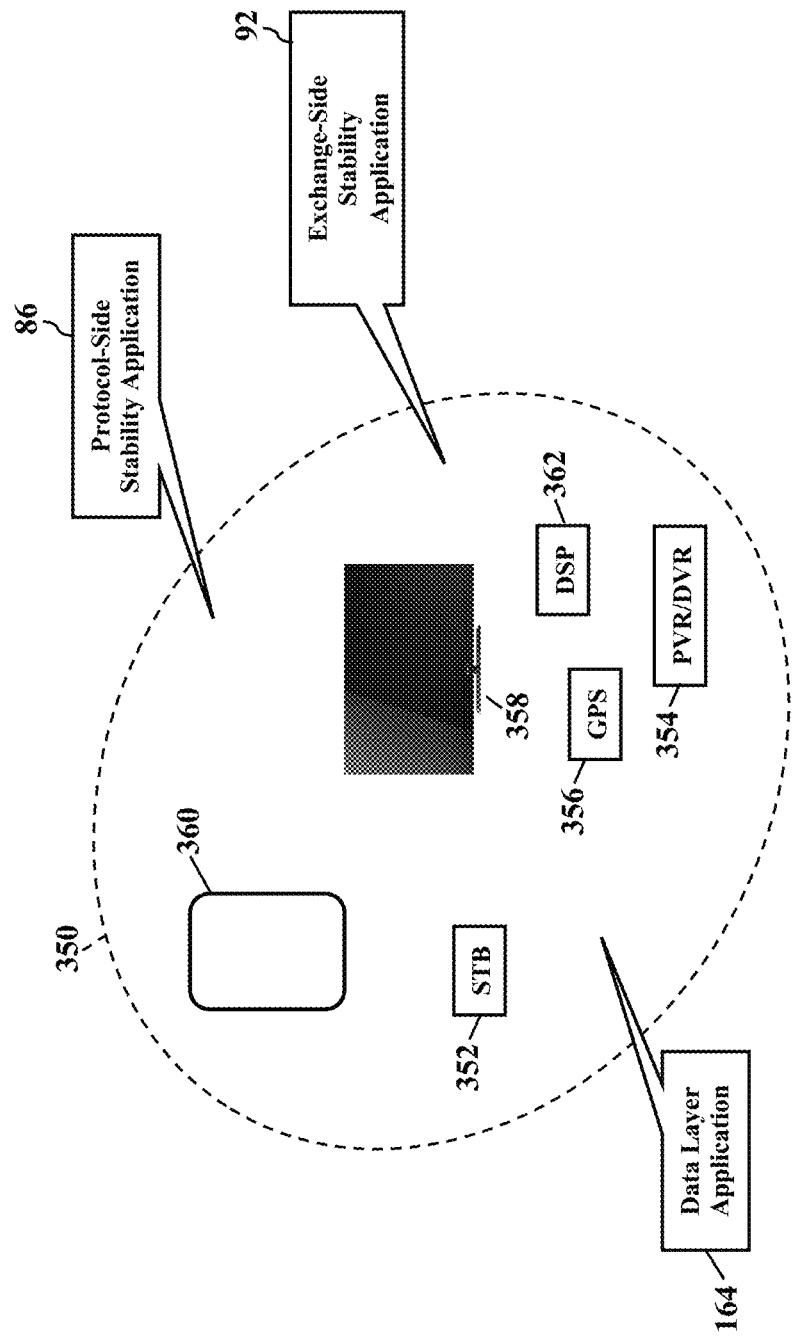

FIG. 39 depicts other possible operating environments for additional aspects of the exemplary embodiments. FIG. 39 illustrates the protocol-side stability application 86, the exchange-side stability application 92, and/or the data layer application 164 operating within various other processor-controlled devices 350. FIG. 39, for example, illustrates that the protocol-side stability application 86, the exchange-side stability application 92, and/or the data layer application 164 may entirely or partially operate within a set-top box ("STB") or other media player (352), a personal/digital video recorder (PVR/DVR) 354, a Global Positioning System (GPS) device 356, an interactive television 358, a tablet computer 360, or any computer system, communications device, or processor-controlled device utilizing any of the processors above described and/or a digital signal processor (DP/DSP) 362. Moreover, the processor-controlled device 350 may also include wearable devices (such as watches), radios, vehicle electronics, cameras, clocks, printers, gateways, mobile/implantable medical devices, and other apparatuses and systems. Because the architecture and operating principles of the various devices 350 are well known, the hardware and software componentry of the various devices 350 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable non-transitory storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for pricing stability of cryptographic coins, as the above paragraphs explain.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A memory device storing instructions that when executed by a hardware processor perform operations, the operations comprising:

receiving a blockchain sent via a computer network to blockchain node computers, the blockchain specifying cryptographic coinage transactions conducted via the computer network between the blockchain node computers as a reserveless decentralized market exchange, the cryptographic coinage transactions associated with a pegged cryptographic token and a different pegged cryptographic token traded via the blockchain network between the blockchain node computers;

generating data records in a blockchain data layer describing the cryptographic coinage transactions associated with the pegged cryptographic token and the different pegged cryptographic token traded via the blockchain network between the blockchain node computers;

monitoring a rate of generation of the data records in the blockchain data layer describing the cryptographic coinage transactions associated with the pegged cryptographic token and the different pegged cryptographic token traded via the blockchain network between the blockchain node computers;

querying an electronic database for the rate of generation of the data records in the blockchain data layer, the electronic database electronically associating destruction quantities, creation quantities, and conversion quantities to rates of generation including the rate of generation of the data records in the blockchain data layer;

identifying a destruction quantity of the destruction quantities in the electronic database that is electronically associated with the rate of generation of the data records in the blockchain data layer;

identifying a creation quantity of the creation quantities in the electronic database that is electronically associated with the rate of generation of the data records in the blockchain data layer;

identifying a conversion quantity of the conversion quantities in the electronic database that is electronically associated with the rate of generation of the data records in the blockchain data layer;

performing a destruction operation that destroys the destruction quantity of the pegged cryptographic token identified from the electronic database, the destruction operation destroying the destruction quantity of the pegged cryptographic token from being traded via the blockchain network between the blockchain node computers as the reserveless decentralized market exchange;

performing a creation operation that creates the creation quantity of the different pegged cryptographic token identified from the electronic database, the creation operation creating and depositing new ones of the different pegged cryptographic token being traded via the blockchain network between the blockchain node computers as the reserveless decentralized market exchange;

performing a conversion operation that converts the conversion quantity of the pegged cryptographic token into the different pegged cryptographic token identified from the electronic database; and increasing the rate of generation of the data records in the blockchain data layer in response to at least one of the destruction operation, the creation operation, and the conversion operation;

wherein the increasing of the rate of generation of the data records in the blockchain data layer maintains a stability of a value of the pegged cryptographic token traded via the blockchain network between the blockchain node computers as the reserveless decentralized market exchange.

2. The memory device of claim 1, wherein the operations further comprise inferring a demand for the pegged cryptographic token traded in the reserveless decentralized market exchange based on the rate of generation of the data records in the blockchain data layer.

3. The memory device of claim 1, wherein the operations further comprise logging the destruction operation in the blockchain data layer.

4. The memory device of claim 1, wherein the operations further comprise logging the creation operation in the blockchain data layer.

5. The memory device of claim 1, wherein the operations further comprise logging the conversion operation in the blockchain data layer.

6. The memory device of claim 1, wherein the operations further comprise logging token identifiers associated with the creation operation in the blockchain data layer, the token identifiers uniquely identifying the new ones of the different pegged cryptographic token created and deposited into the reserveless decentralized market exchange.

* * * * *